United States Patent
Lin et al.

(10) Patent No.: US 12,032,224 B2
(45) Date of Patent: Jul. 9, 2024

(54) OPTICAL ELEMENT DRIVING MECHANISM

(71) Applicant: TDK TAIWAN CORP., Taoyuan (TW)

(72) Inventors: Sin-Hong Lin, Taoyuan (TW);
Yung-Ping Yang, Taoyuan (TW);
Wen-Yen Huang, Taoyuan (TW);
Yu-Cheng Lin, Taoyuan (TW);
Kun-Shih Lin, Taoyuan (TW);
Chao-Chang Hu, Taoyuan (TW);
Yung-Hsien Yeh, Taoyuan (TW);
Mao-Kuo Hsu, Taoyuan (TW);
Chih-Wei Weng, Taoyuan (TW);
Ching-Chieh Huang, Taoyuan (TW);
Chih-Shiang Wu, Taoyuan (TW);
Chun-Chia Liao, Taoyuan (TW);
Chia-Yu Chang, Taoyuan (TW);
Hung-Ping Chen, Taoyuan (TW);
Wei-Zhong Luo, Taoyuan (TW);
Wen-Chang Lin, Taoyuan (TW);
Shou-Jen Liu, Taoyuan (TW);
Shao-Chung Chang, Taoyuan (TW);
Chen-Hsin Huang, Taoyuan (TW);
Meng-Ting Lin, Taoyuan (TW);
Yen-Cheng Chen, Taoyuan (TW);
I-Mei Huang, Taoyuan (TW); Yun-Fei Wang, Taoyuan (TW); Wei-Jhe Shen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/173,425

(22) Filed: Feb. 23, 2023

(65) Prior Publication Data
US 2023/0204901 A1    Jun. 29, 2023

Related U.S. Application Data

(63) Continuation of application No. 17/067,553, filed on Oct. 9, 2020, now Pat. No. 11,619,800.
(Continued)

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
None
See application file for complete search history.

(56) References Cited

U.S. PATENT DOCUMENTS

| 2008/0024590 A1 | 1/2008 | Nakajima |
| 2018/0213131 A1 | 7/2018 | Liu et al. |

(Continued)

FOREIGN PATENT DOCUMENTS

| CN | 105593758 A | 5/2016 |
| EP | 3115819 A1 | 1/2017 |

(Continued)

OTHER PUBLICATIONS

Chinese office action dated Apr. 19, 2023 for the corresponding Application No. 202011075428.4; pp. 1-6.

(Continued)

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical element driving mechanism is provided and includes a fixed assembly, a movable assembly, a driving assembly and a circuit assembly. The movable assembly is
(Continued)

configured to connect an optical element, the movable assembly is movable relative to the fixed assembly, and the optical element has an optical axis. The driving assembly is configured to drive the movable assembly to move relative to the fixed assembly. The circuit assembly includes a plurality of circuits and is affixed to the fixed assembly.

21 Claims, 72 Drawing Sheets

Related U.S. Application Data

(60) Provisional application No. 62/912,743, filed on Oct. 9, 2019, provisional application No. 62/925,958, filed on Oct. 25, 2019, provisional application No. 62/935,926, filed on Nov. 15, 2019, provisional application No. 63/041,459, filed on Jun. 19, 2020.

(56) References Cited

U.S. PATENT DOCUMENTS

2018/0335603 A1  11/2018  Hu et al.
2019/0018222 A1   1/2019  Weng et al.

FOREIGN PATENT DOCUMENTS

| EP | 3165956 A1 | 5/2017 |
| EP | 3739370 A1 | 11/2020 |
| JP | 2011085682 A | 4/2011 |
| JP | 2017021268 A | 1/2017 |
| KR | 20150142196 A | 12/2015 |
| WO | WO-2019/139284 A1 | 7/2019 |

OTHER PUBLICATIONS

European Search Report dated Feb. 26, 2021 in EP Applciation No. 20200996.5, 15 pages.

OPTICAL ELEMENT DRIVING MECHANISM

CROSS REFERENCE TO RELATED APPLICATIONS

This application is a Continuation of application Ser. No. 17/067,553, filed on Oct. 9, 2020, which claims the benefit of U.S. Provisional Application No. 62/912,743, filed Oct. 9, 2019, 62/925,958, filed Oct. 25, 2019, 62/935,926, filed Nov. 15, 2019 and 63/041,459, filed Jun. 19, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism with a positioning structure for positioning a circuit board.

Description of the Related Art

As technology has developed, many of today's electronic devices (such as smartphones) have a camera or video functionality. Using the camera modules disposed on electronic devices, users can operate their electronic devices to capture photographs and record video.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module that can perform autofocus, optical image stabilization and achieve miniaturization is a topic nowadays that needs to be discussed and solved.

BRIEF SUMMARY OF THE DISCLOSURE

One objective of the present disclosure is to provide an optical element driving mechanism to solve the problems outlined above.

According to some embodiments of the disclosure, an optical element driving mechanism is provided and includes a fixed assembly, a movable assembly, a driving assembly and a circuit assembly. The movable assembly is configured to connect an optical element, the movable assembly is movable relative to the fixed assembly, and the optical element has an optical axis. The driving assembly is configured to drive the movable assembly to move relative to the fixed assembly. The circuit assembly includes a plurality of circuits and is affixed to the fixed assembly.

According to some embodiments, the fixed assembly includes a base, the base has a first side wall, the optical element driving mechanism further includes a positioning structure which is disposed on the first side wall, and the circuit assembly is positioned on the first side wall by the positioning structure.

According to some embodiments, when viewed along the optical axis, at least a part of the circuit assembly overlaps the positioning structure, and the positioning structure overlaps a bottom wall of the base.

According to some embodiments, the movable assembly has a winding structure extending in a first direction perpendicular to the optical axis, the first side wall has a recess, and the winding structure is located in the recess, wherein when viewed in a second direction perpendicular to the optical axis, the winding structure overlaps at least a part of the first side wall.

According to some embodiments, the first side wall has a first protruding portion that protrudes toward a light-exiting end of the optical element driving mechanism, the circuit assembly includes a second protruding portion, and the first protruding portion supports the second protruding portion.

According to some embodiments, when viewed in a first direction perpendicular to the optical axis, the first protruding portion overlaps at least a part of the second protruding portion.

According to some embodiments, the movable assembly has a winding structure extending along the optical axis, the first side wall has a recess, and when viewed in a first direction perpendicular to the optical axis, the winding structure overlaps the recess.

According to some embodiments, the base has a bottom wall connected to the first side wall, and the base further has a groove which is formed from the bottom wall along the optical axis.

According to some embodiments, when viewed along the optical axis, the winding structure overlaps at least a part of the groove, wherein when viewed in the first direction, the recess does not overlap the groove.

According to some embodiments, when viewed in a second direction perpendicular to the optical axis, the winding structure does not overlap the first side wall, and the first direction is perpendicular to the second direction.

According to some embodiments, the movable assembly has a slot structure configured to be engaged with an engaging portion of the optical element, the slot structure has a first surface and a second surface, when viewed along the optical axis, the first surface partially overlaps the second surface, and a size of the engaging portion is smaller than a size of the first surface.

According to some embodiments, when the engaging portion is engaged with the slot structure, the first surface partially overlaps the engaging portion, and the second surface partially overlaps the engaging portion.

According to some embodiments, the slot structure has a third surface and a fourth surface, the third surface is connected to the first surface, the fourth surface is connected to the second surface, and a distance between the engaging portion and the third surface is different from a distance between the engaging portion and the fourth surface.

According to some embodiments, the distance between the engaging portion and the third surface is greater than the distance between the engaging portion and the fourth surface.

According to some embodiments, the optical element driving mechanism further includes a circuit assembly protruding from the base and electrically connected to the circuit assembly, wherein when viewed in a first direction perpendicular to the optical axis, the shortest distance between the circuit member and the circuit assembly in the second direction is less than the shortest distance between the circuit member and the base in the second direction, wherein the first direction is perpendicular to the second direction.

According to some embodiments, the circuit member has a first side surface and a second side surface, the first side surface does not face the circuit assembly, the second side surface faces the circuit assembly, and the first side surface and the second side surface face in opposite directions.

According to some embodiments, the circuit assembly has an electrical connecting element, and the circuit member has a third side surface which faces the electrical connecting element.

According to some embodiments, the optical element driving mechanism further includes a first elastic member connected to the fixed assembly and the movable assembly, the first elastic member includes four separate spring sheets, and when viewed along the optical axis, these spring sheets are rotationally symmetrical.

According to some embodiments, each of the spring sheets includes a fixed connecting portion which is fixedly connected to the movable assembly by an adhesive element, the fixed connecting portion has a first notch, and the movable assembly has an accommodating groove corresponding to the first notch, wherein when viewed along the optical axis, the accommodating groove is exposed from the first notch, and the adhesive element is disposed in the accommodating groove and the first notch.

According to some embodiments, the fixed connecting portion further includes a second notch and a pressed area, the second notch is located between the first notch and the pressed area, and the second notch is configured to accommodate at least a part of the adhesive element, so as to prevent the adhesive element from entering the pressed area.

The present disclosure provides an optical element driving mechanism, which has a base, a circuit assembly and at least one positioning structure. The positioning structure is disposed on the first side wall of the base, and the circuit assembly is positioned on the first side wall by the positioning structure. Therefore, based on the structural design of the present disclosure, the circuit assembly can be accurately positioned on the base, and can also be more stably affixed to the base.

Furthermore, in some embodiments, the optical element driving mechanism further includes four separate spring sheets. Each spring sheet includes a fixed connection part, which is affixed to the lens holder by an adhesive element. The fixed connecting portion has a first notch, a second notch, and a pressed area. The second notch is located between the first notch and the pressed area, and the second notch is configured to accommodate at least a part of the adhesive element, thereby preventing the adhesive element from entering the pressed area.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE

Embodiments

Figure 1:
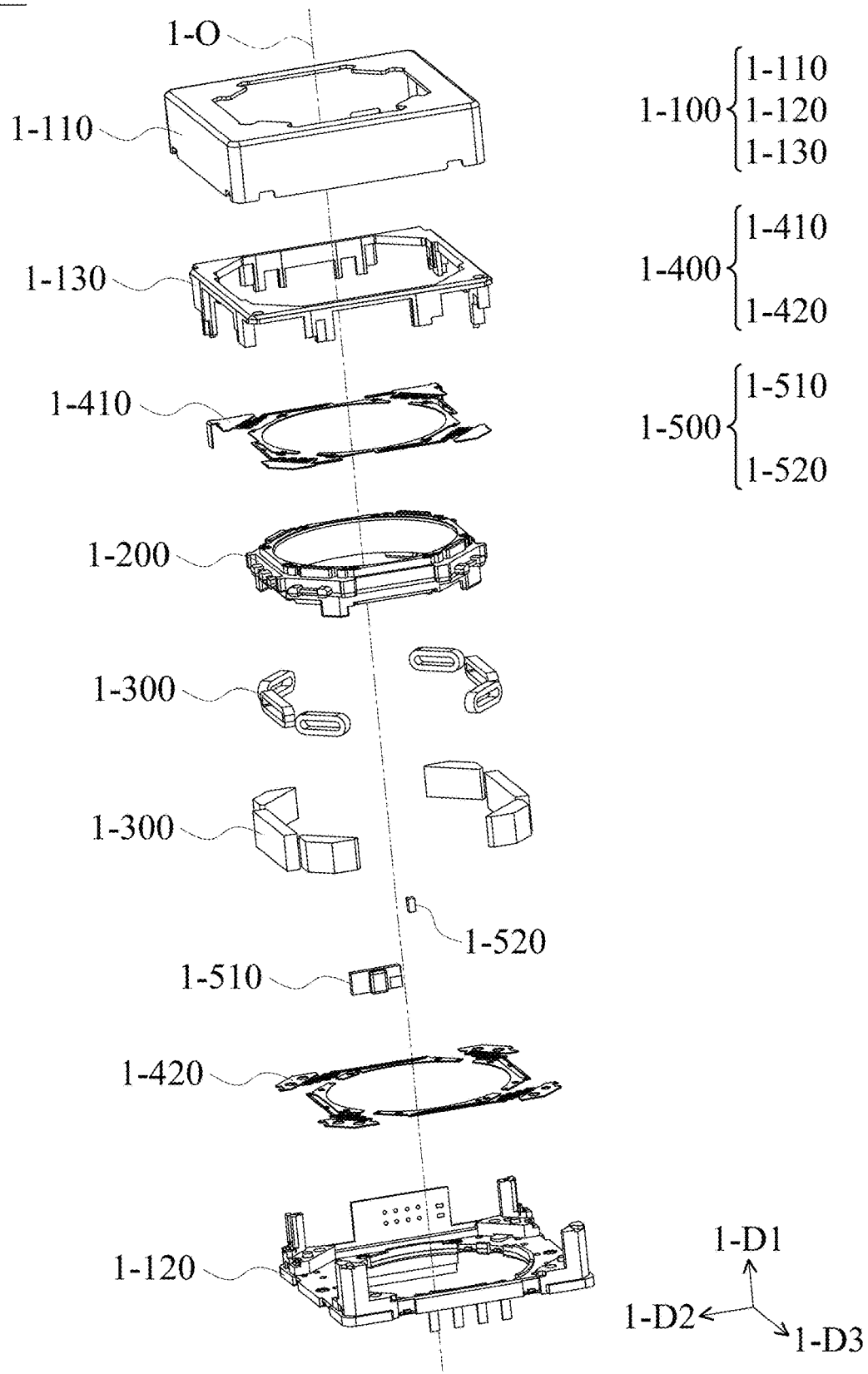
FIG. 1 is an exploded view of a haptic feedback mechanism, according to some embodiments of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

The First Embodiment Group

Firstly, referring to FIG. 1, FIG. 1 is an exploded view of a haptic feedback mechanism 1-10, according to some embodiments of the present disclosure. As shown in FIG. 1, the haptic feedback mechanism 1-10 mainly includes a fixed portion 1-100, a movable portion 1-200, a driving assembly 1-300, a supporting assembly 1-400, and a sensing assembly 1-500. In some embodiments, the fixed portion 1-100 is fixed to an electronic device (not shown). For example, the electronic device may be a mobile phone, a camera, or a gaming device, etc. The fixed portion 1-100 may include a cover 1-110 and a bottom 1-120. The movable portion 1-200, the driving assembly 1-300, the supporting assembly 1-400, and the sensing assembly 1-500 are positioned between the cover 1-110 and the bottom 1-120. In some embodiments, the haptic feedback mechanism 1-10 may be connected to other modules (not shown) of the electronic device, such as a control module or a sensing module, etc., via the bottom 1-120.

In some embodiments of the present disclosure, the movable portion 1-200 may move relative to the fixed portion 1-100 in the first direction 1-D1. In some embodiments, the movable portion 1-200 may include a holder for holding an optical element (e.g. a lens, etc.) (not shown). The optical element may be disposed in the center of the holder of the movable portion 1-200. The optical element may have a lens that has an optical axis 1-O passing through the center of the lens. The optical axis 1-O is parallel to the first direction 1-D1.

As shown in FIG. 1, in some embodiments of the present disclosure, the supporting assembly 1-400 may include an upper resilient element 1-410 and a lower resilient element 1-420. The upper resilient element 1-410 and the lower resilient element 1-420 may be spring sheets or other suitable resilient materials. The movable portion 1-200 is movably connected to the fixed portion 1-100 via the supporting assembly 1-400. For example, the movable portion 1-200 may move relative to the fixed portion 1-100 by the resilient deformations of the upper resilient element 1-410 and the lower resilient element 1-420.

In some embodiments of the present disclosure, the sensing assembly 1-500 includes a position sensing element 1-510 and an inertia sensing element 1-520. The position sensing element 1-510 may be used for sensing the position of the movable portion 1-200 relative to the fixed portion 1-100. The position sensing elements 1-510 may be, for example, a Hall sensor, a MR sensor, a fluxgate, an optical position sensor, an optical encoder, or the like. The position sensing assembly 1-510 detects the amount of displacement of the movable portion 1-200. In some embodiments where the movable portion 1-200 includes an optical element, the position sensing assembly 1-510 may also detect the amount of displacement of the optical element. The inertia sensing element 1-520 may be used for sensing an inertial state of the haptic feedback mechanism 1-10. The inertia sensing element 1-520 may be, for example, an accelerometer, a gyroscope, or the like, in order to detect the inertial state of the haptic feedback mechanism 1-10, such as the vibration state of the haptic feedback mechanism 1-10. In some embodiments, the position sensing element 1-510 and the inertia sensing element 1-520 may be fixedly disposed at the bottom 1-120 of the fixed portion 1-100. The position sensing element 1-510 and the inertia sensing element 1-520 may be electrically connected to a control module on the exterior of the haptic feedback mechanism 1-10 (e.g. the control assembly 1-600 in FIG. 3 and FIG. 4) via the bottom 1-120.

It should be noted that, in some embodiments, the electronic device that is connected to the haptic feedback mechanism 1-10 may have a need for an inertia sensing element itself, for example, for sensing the orientation of the electronic device, etc. In such cases, the inertial sensing element 1-520 in the haptic feedback mechanism 1-10 may also be used for sensing the inertial state of the electronic device. In the embodiments shown in FIG. 1, the inertia sensing element 1-520 may be disposed inside the fixed potion 1-100 of the haptic feedback mechanism 1-10. In some other embodiments, the inertia sensing element 1-520 may be disposed outside the haptic feedback mechanism 1-10. By sharing a common inertial sensing element 1-520 with the electronic device, the space and cost for adding an extra inertia sensing element is reduced.

Figure 2:
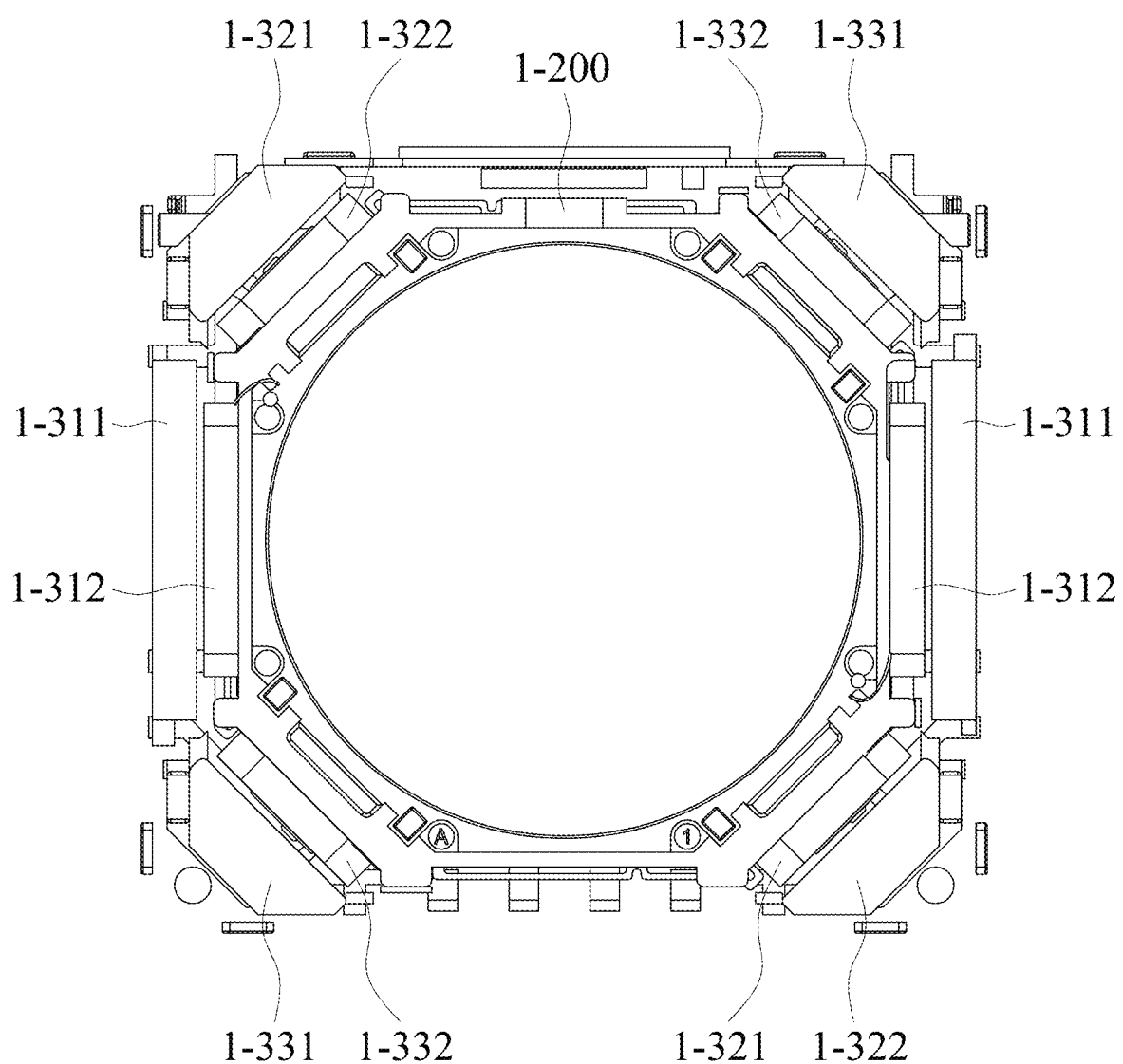
FIG. 2 is a top view of a movable portion and the driving assembly, according to some embodiments of the present disclosure.

Next, referring to FIG. 1 and FIG. 2, in some embodiments of the present disclosure, the driving assembly 1-300 may include multiple driving units. By disposing the driving units in different directions, the movable portion 1-200 may move in corresponding directions relative to the fixed portion 1-100. FIG. 2 is a top view of a movable portion 1-200 and the driving assembly 1-300, according to some embodiments of the present disclosure. In the embodiments shown in FIG. 2, the driving assembly 1-300 includes a first dimension driving unit 1-310, a second dimension driving unit 1-320, and a third dimension driving unit 1-330. The first dimension driving unit 1-310 includes two first magnetic elements 1-311 disposed on two opposite sides of the movable portion 1-200 and two corresponding first coils 1-312. The second dimension driving unit 1-320 includes two second magnetic elements 1-321 disposed on two opposite corners of the movable portion 1-200 and two corresponding second coils 1-322. The third dimension driving unit 1-330 includes two third magnetic elements 1-331 disposed on two other opposite corners of the movable portion 1-200 and two corresponding third coils 1-332. In some embodiments of the present disclosure, the first dimension driving unit 1-310 drives the movable portion 1-200 to move in a first dimension relative to the fixed portion 1-100, i.e. translating along the first direction 1-D1. The second dimension driving unit 1-320 drives the movable portion 1-200 to move in a second dimension relative to the fixed portion 1-100, i.e. rotating about the second direction 1-D2. The third dimension driving unit 1-330 drives the movable portion 1-200 to move in a third dimension relative to the fixed portion 1-100, i.e. rotating about the third direction 1-D3.

In some embodiments of the present disclosure, any two of the first direction 1-D1, the second direction 1-D2, and the third direction 1-D3 are not parallel to each other. Furthermore, in some embodiments, any two of the first direction 1-D1, the second direction 1-D2, and the third direction 1-D3 are perpendicular to each other. Thus, any two of the first dimension, the second dimension, and the third dimension are different from each other.

In the embodiments shown in FIG. 2, the first magnetic element 1-311, the second magnetic element 1-321, and the third magnetic element 1-331 are connected to the fixed portion 1-100, and the corresponding first coil 1-312, the second coil 1-322, and the third coil 1-332 are connected to the movable portion 1-200. By providing an electrical current to the coils that interact with the magnetic fields of the magnetic elements, an electromagnetic force is generated to drive the movable portion 1-200 to move in the first dimension, the second dimension, and/or the third dimension. In such cases, since the weight of the coils are lighter than those of the magnetic elements, in the embodiments where the movable portion 1-200 holds an optical elements, the weight of the movable portion 1-200 is reduced, which is advantageous for performing auto focusing (AF) or optical image stabilization (OIS). It should be noted that in some other embodiments, the first magnetic element 1-311, the second magnetic element 1-321, and the third magnetic element 1-331 are connected to the movable portion 1-200, and the corresponding first coil 1-312, the second coil 1-322, and the third coil 1-332 are connected to the fixed portion 1-100. In such cases, the weight of the movable portion 1-200 is increased, which is advantageous for improving the effect of haptic feedback. Also, since the coils are fixed to the fixed portion 1-100, the complicity of winding the coils is reduced.

In many current electronic devices, multiple different modes of haptic feedback (e.g. vibration) are needed. For example, when the electronic device performs different functions, the user may receive the related experiences or sensations by feeling different modes of vibration. In some embodiments of the present disclosure, the haptic feedback mechanism 1-10 may include a first feedback mode, a second feedback mode, a third feedback mode, and a fourth feedback mode. In the first feedback mode, the driving assembly 1-300 drives the movable portion 1-200 to move in the first dimension, generating a first feedback force to the electronic device. Similarly, in the second feedback mode, the driving assembly 1-300 drives the movable portion 1-200 to move in the second dimension, generating a second feedback force to the electronic device. In the third feedback mode, the driving assembly 1-300 drives the movable portion 1-200 to move in the third dimension, generating a third feedback force to the electronic device. In the fourth feedback mode, the driving assembly 1-300 drives the movable portion 1-200 to move in at least two of the first dimension, the second dimension, and the third dimension, generating a fourth feedback force to the electronic device. For example, in the fourth feedback mode, the second dimension driving unit 1-320 and the third dimension driving unit 1-330 of the driving assembly 1-300 may be activated simultaneously, driving the movable portion 1-200 to move in the second dimension and the third dimension at the same time. Since the first feedback force, the second feedback force, the third feedback force, and the fourth feedback force are in different dimensions, the user may receive haptic feedbacks that are clearly distinctive when using the electronic device, obtaining good user experiences.

It should be noted that, as shown in FIG. 1, the fixed portion 1-100 includes a protective assembly 1-130 for limiting the range of movement of the movable portion 1-200 relative to the fixed portion 1-100. As a result, the movable portion 1-200 would not collide with the fixed portion 1-100 during movements (i.e. in the first feedback mode, the second feedback mode, the third feedback mode, and the fourth feedback mode), so that undesirable frictions and damages may be prevented.

Figure 3:
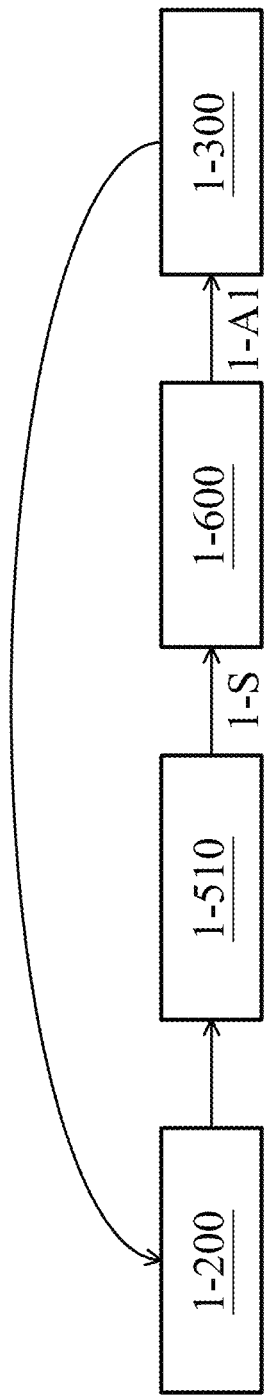
FIG. 3 is a block diagram of the operation of the position sensing element, according to some embodiments of the present disclosure.
Figure 4:
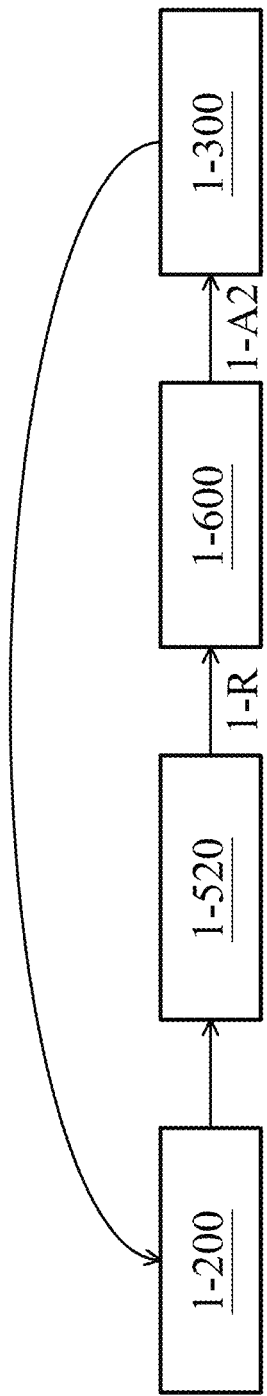
FIG. 4 is a block diagram of the operation of the inertia sensing element, according to some embodiments of the present disclosure.

Next, referring to FIG. 3 and FIG. 4, FIG. 3 is a block diagram of the operation of the position sensing element 1-510, according to some embodiments of the present disclosure. FIG. 4 is a block diagram of the operation of the inertia sensing element 1-520, according to some embodiments of the present disclosure. In some embodiments, the driving assembly 1-300 of the haptic feedback mechanism 1-10 may be connected to a control assembly 1-600. The position sensing element 1-510 and the inertia sensing element 1-520 of the sensing assembly 1-500 may also be connected to the control assembly 1-600. As shown in FIG. 3, the position sensing element 1-510 may sense the movement of the movable portion 1-200 and output a sensing signal 1-S to the control assembly 1-600. The control assembly 1-600 outputs a first driving signal 1-A1 to the driving assembly 1-300 based on the sensing signal 1-S. The driving assembly 1-300 then drives the movable portion 1-200 to move relative to the fixed portion 1-100 based on the first driving signal 1-A1. In some embodiments of the present disclosure, the position sensing element 1-510 is mainly used for controlling functions of auto focusing or optical image stabilization, so that the haptic feedback mechanism 1-10 that holds an optical element may achieve the desirable optical effects by moving the movable portion 1-200.

As shown in FIG. 4, the inertial sensing element 1-520 may sense the inertial state (e.g. the amplitude of the vibration, etc.) of the movable portion 1-200, and output a resonance frequency information 1-R, which records the resonance frequencies of the movable portion 1-200, to the control assembly 1-600. The control assembly 1-600 may output a second driving signal 1-A2 to the driving assembly 1-300 based on the resonance frequency information 1-R. The driving assembly 1-300 then drives the movable portion 1-200 to move relative to the fixed portion 1-100 based on the second driving signal 1-A2. In some embodiments of the present disclosure, by the coordination of the inertia sensing element 1-520, the control assembly 1-600, and the driving assembly 1-300, the movable portion 1-200 is driven to move in the first feedback mode, the second feedback mode, the third feedback mode, and the fourth feedback mode. In some embodiments, the second driving signal 1-A2 that is output by the control assembly 1-600 is periodical. For example, the second driving signal 1-A2 may be a sine wave.

Furthermore, the control assembly 1-600 may adjust the output second driving signal 1-A2 based on the resonance frequency information 1-R, when haptic feedbacks are needed by the electronic device. When the second driving signal 1-A2 is substantially equal to the resonance frequency of the movable portion 1-200, the resonance condition of the movable portion 1-200 is met and vibrations are generated, improving the effect of haptic feedbacks. In other words, when the driving assembly 1-300 receives the first driving signal 1-A1, that is not in the resonance frequency of the movable portion 1-200, from the control assembly 1-600, the movable portion 1-200 may be driven to perform auto focusing or optical image stabilization. When the driving assembly 1-300 receives the second driving signal 1-A2, that is substantially equal to the resonance frequency of the movable portion 1-200, from the control assembly 1-600, the movable portion 1-200 may be switched in to a feedback mode and vibrate, generating feedback forces, thereby achieving haptic feedbacks. In detail, the driving signal that is output by the driving assembly 1-300 has a certain frequency bandwidth. When the driving signal is substantially equal to the resonance frequency of the movable portion 1-200, the movable portion 1-200 would oscillate at a significantly higher amplitude, creating the haptic feedback effect. On the other hand, when the driving signal is of frequencies within the bandwidth that is other than the resonance frequency, the movable portion 1-200 would be driven to perform auto focusing or optical image stabilization.

It is worth noted that whether the movable portion 1-200 is in the first feedback mode, the second feedback mode, the third feedback mode, or the fourth feedback mode, the second driving signal 1-A2 output by the control assembly 1-600 may be substantially equal to the same resonance frequency of the movable portion 1-200. In some embodiments of the present disclosure, by inputting the second driving signals 1-A2 with the same frequency into different coils (e.g. the first coil 1-312, the second 1-322, or the third coil 1-332), different modes of feedback may be activated without complicated calculations of the second driving signal 1-A2 by the control assembly 1-600.

In summary, the haptic feedback mechanism 1-10 of the present disclosure may add the function of haptic feedback to the existing mechanisms that may perform auto focusing or optical image stabilization by inputting a signal that is substantially equal to the resonance frequency of the movable portion 1-200 to the driving assembly 1-300 that is disposed in different directions (e.g. the first dimension driving unit 1-310, the second dimension driving unit 1-320, and the third dimension driving unit 1-330). Thus, the required internal space of the electronic device is reduced, which is advantageous for the miniaturization of the electronic device.

The Second Embodiment Group

Figure 5:
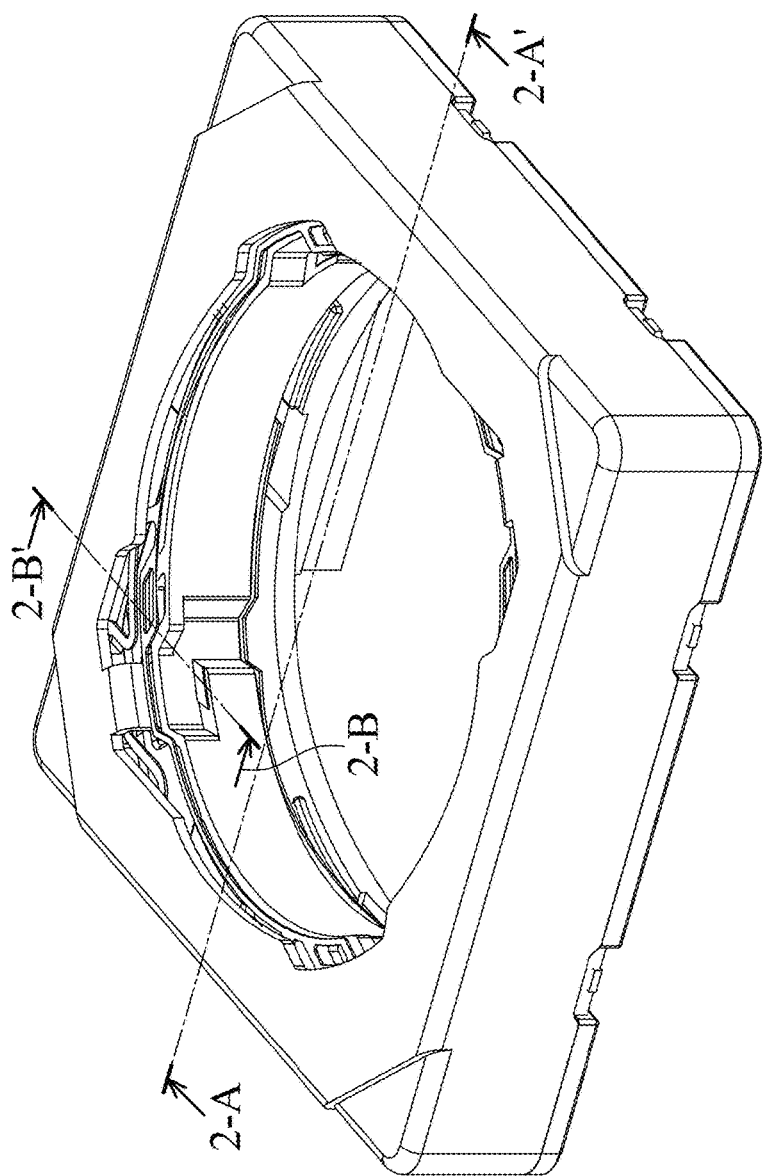
FIG. 5 is a schematic diagram of an optical element driving mechanism 2-100 according to an embodiment of the present disclosure.
Figure 6:
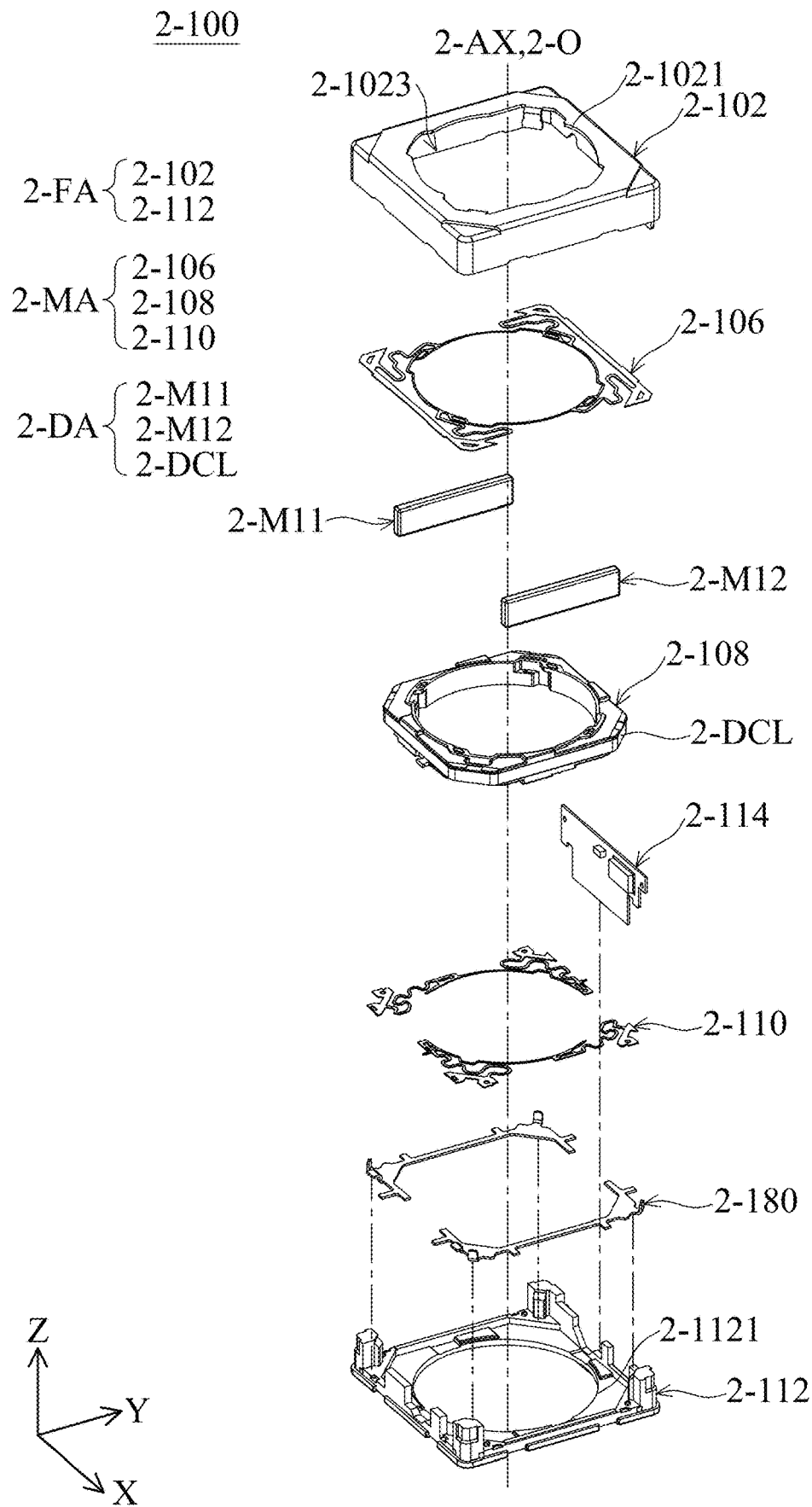
FIG. 6 is an exploded diagram of the optical element driving mechanism 2-100 according to an embodiment of the present disclosure.
Figure 7:
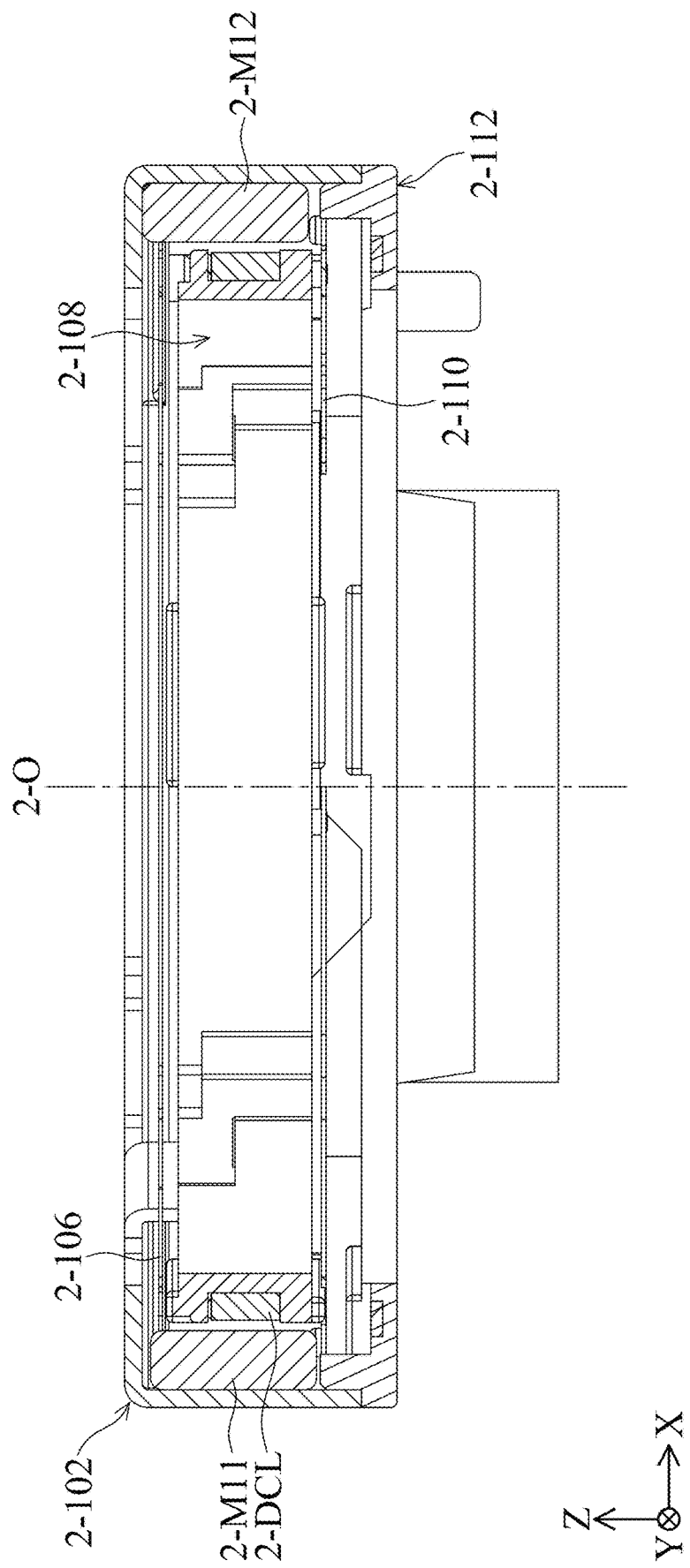
FIG. 7 is a cross-sectional view of the optical element driving mechanism 2-100 along line 2-A-2-A' in FIG. 5 according to an embodiment of the present disclosure.

Please refer to FIG. 5 to FIG. 7. FIG. 5 is a schematic diagram of an optical element driving mechanism 2-100 according to an embodiment of the present disclosure. FIG. 6 is an exploded diagram of the optical element driving mechanism 2-100 according to an embodiment of the present disclosure, and FIG. 7 is a cross-sectional view of the optical element driving mechanism 2-100 along line 2-A-2-A' in FIG. 5 according to an embodiment of the present disclosure. The optical element driving mechanism 2-100 can be an optical camera module configured to hold an optical element. The optical element driving mechanism 2-100 can be installed in various electronic devices or portable electronic devices, such as a smartphone, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

In the present embodiment, the optical element driving mechanism 2-100 can include a fixed assembly 2-FA, a movable assembly 2-MA, and a driving assembly 2-DA. The movable assembly 2-MA is movably connected to the fixed assembly 2-FA, and the movable assembly 2-MA is configured to hold the optical element (not shown in the figures). The driving assembly 2-DA is configured to drive the movable assembly 2-MA to move relative to the fixed assembly 2-FA.

In this embodiment, as shown in FIG. 6, the fixed assembly 2-FA includes a casing 2-102, and a base 2-112. The movable assembly 2-MA includes a lens holder 2-108 and the aforementioned optical element, and the lens holder 2-108 is configured to hold the optical element. A main axis 2-AX can be defined by the fixed assembly 2-FA, and an optical axis 2-O can be defined by the optical element. The main axis 2-AX may, for example, overlap the optical axis 2-O, but it is not limited thereto.

As shown in FIG. 6, the casing 2-102 has a hollow structure, and a casing opening 2-1021 is formed thereon, and a base opening 2-1121 is formed on the base 2-112. The center of the casing opening 2-1021 corresponds to the optical axis 2-O of the optical element, and the base opening 2-1121 corresponds to a photosensitive element (not shown) disposed under the base 2-112. The external light can enter the casing 2-102 from the casing opening 2-1021 to be received by the photosensitive element after passing through the optical element and the base opening 2-1121 so as to generate a digital image signal.

Furthermore, the casing 2-102 is disposed on the base 2-112 and may have an accommodating space 2-1023 is configured to accommodate the movable assembly 2-MA (including the aforementioned optical element and the lens holder 2-108) and the driving assembly 2-DA.

The movable assembly 2-MA may further include a first elastic member 2-106 and a second elastic member 2-110. The outer portion (the outer ring portion) of the first elastic member 2-106 is affixed to the base 2-112, the outer portion (the outer ring portion) of the second elastic member 2-110 is affixed to the base 2-112, and the inner portions (the inner ring portions) of the first elastic member 2-106 and the second elastic member 2-110 are respectively connected to the upper and lower sides of the lens holder 2-108, so that the lens holder 2-108 can be suspended in the accommodating space 2-1023.

In this embodiment, the driving assembly 2-DA may include a first magnet 2-M11, a second magnet 2-M12, and a driving coil 2-DCL. The driving coil 2-DCL is disposed on the lens holder 2-108, and the first magnet 2-M11 and the second magnet 2-M12 are disposed on the inner wall surface of the casing 2-102 and respectively corresponding to the driving coil 2-DCL.

In this embodiment, the driving coil 2-DCL may be wound coils and be disposed on the lens holder 2-108, and a winding axis of the driving coil 2-DCL may be parallel to the optical axis 2-O. When the driving coil 2-DCL is provided with electricity, the driving coil 2-DCL acts with the first magnet 2-M11 and the second magnet 2-M12 to generate an electromagnetic force, so as to drive the lens holder 2-108 and the held optical element to move relative to the base 2-112 along the optical axis 2-O (the Z-axis).

Furthermore, the optical element driving mechanism 2-100 of the present disclosure further includes a circuit assembly 2-114 and a circuit member 2-180 configured to be electrically connected to the driving assembly 2-DA. The circuit assembly 2-114 may be a circuit board having a plurality of circuits and configured to be electrically connected to an external circuit, such as a main circuit board of an external electronic device, so that the driving assembly 2-DA can operate according to the signal of the external electronic device.

Furthermore, in this embodiment, the circuit member 2-180 includes a plurality of circuits which are disposed inside the base 2-112. For example, the base 2-112 is made of plastic material, and the circuit member 2-180 is formed in the base 2-112 by the molded interconnect device (MID) technology.

Figure 8:
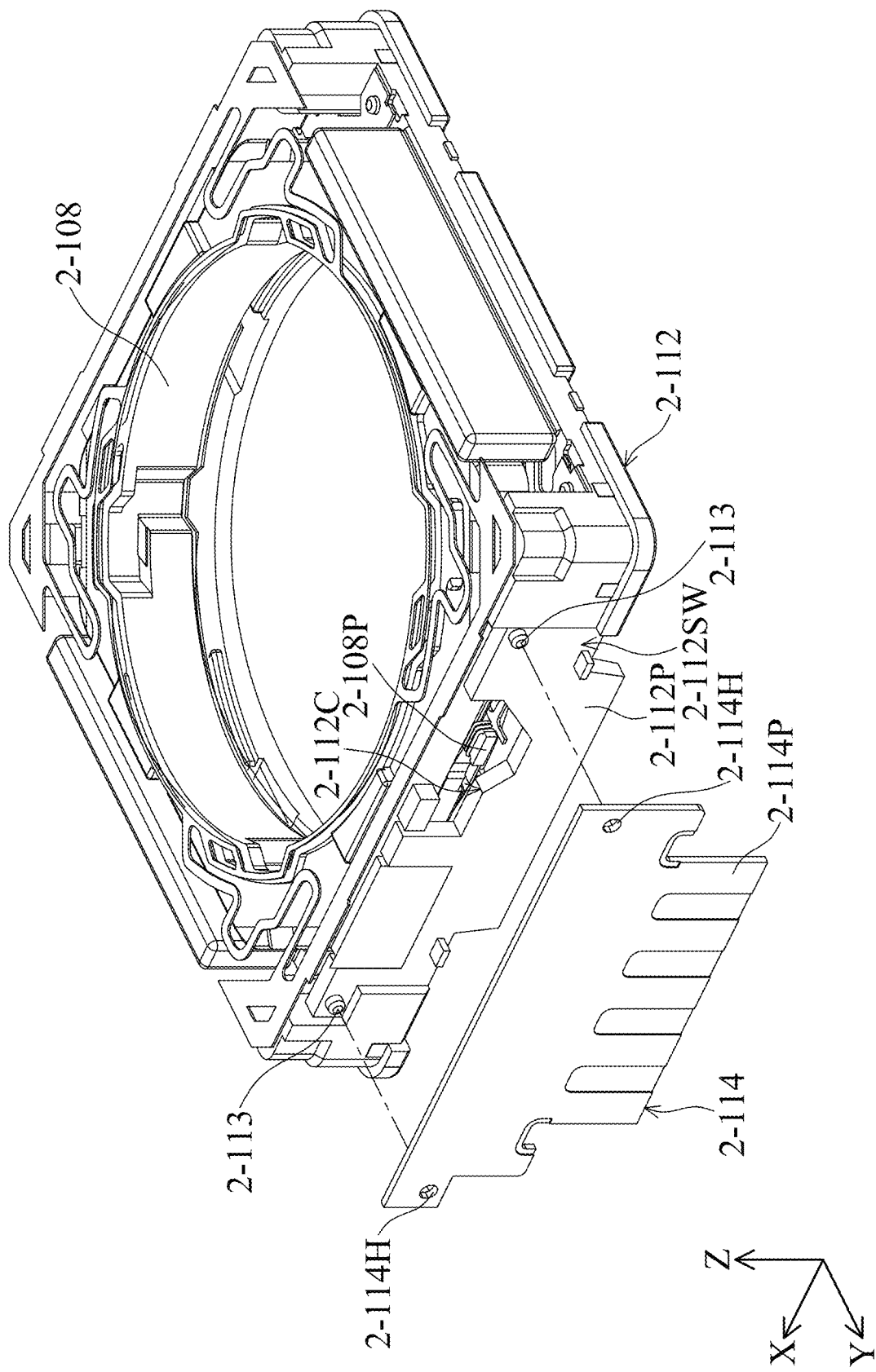
FIG. 8 is a perspective view of the optical element driving mechanism 2-100 in another view according to an embodiment of the present disclosure.

Please refer to FIG. 6 to FIG. 8. FIG. 8 is a perspective view of the optical element driving mechanism 2-100 in another view according to an embodiment of the present disclosure. As shown in FIG. 8, the base 2-112 has a first side wall 2-112SW, and the optical element driving mechanism 2-100 in this embodiment has at least one positioning structure 2-113 which is disposed on the first side wall 2-112SW. The circuit assembly 2-114 is positioned on the first side wall 2-112SW by the positioning structure 2-113.

Specifically, two protruding positioning structures 2-113 are disposed on the first side wall 2-112SW, two through holes 2-114H are formed on the circuit assembly 2-114 correspondingly, and the two through holes 2-114H are sleeved in the second positioning structures 2-113, so that the circuit assembly 2-114 is affixed to the base 2-112 of the fixed assembly 2-FA. In addition, the positioning structures 2-113 can be integrally formed on the first side wall 2-112SW.

Figure 9:
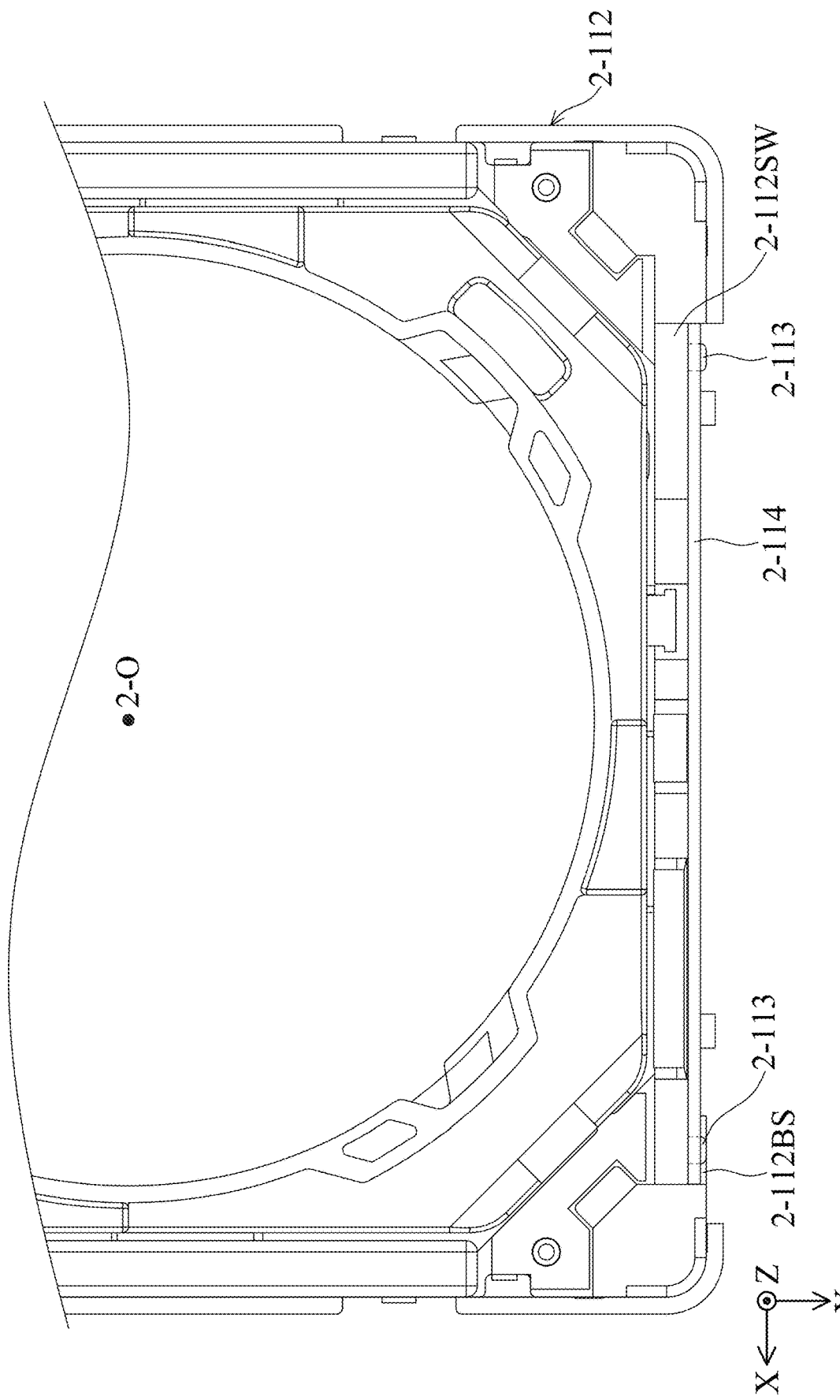
FIG. 9 is a top view of a partial structure of the optical element driving mechanism 2-100 according to an embodiment of the present disclosure.

Please refer to FIG. 9, which is a top view of a partial structure of the optical element driving mechanism 2-100 according to an embodiment of the present disclosure. In this embodiment, when viewed along the optical axis 2-O, at least a part of the circuit assembly 2-114 overlaps the two positioning structures 2-113, and the left positioning structure 2-113 overlaps a bottom wall 2-112BS of the base 2-112.

Based on the above structural design, the circuit assembly 2-114 can be stably affixed to the base 2-112, and the purpose of miniaturization can be achieved.

Figure 10:
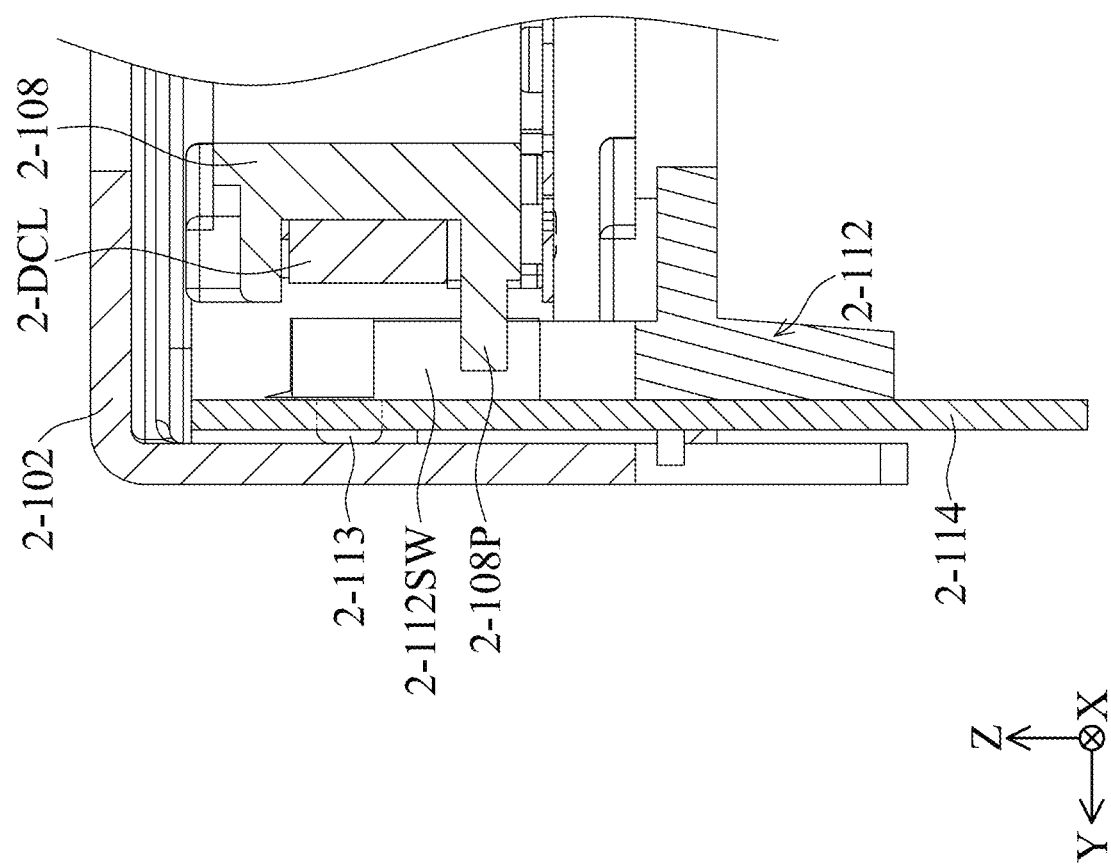
FIG. 10 is a cross-sectional view of the optical element driving mechanism 2-100 along the line 2-B-2-B' in FIG. 5 according to an embodiment of the present disclosure.

Please refer to FIG. 8 and FIG. 10, and FIG. 10 is a cross-sectional view of the optical element driving mechanism 2-100 along the line 2-B-2-B' in FIG. 5 according to an embodiment of the present disclosure. In this embodiment, as shown in FIG. 8, the lens holder 2-108 of the movable assembly 2-MA has a winding structure 2-108P, and the winding structure 2-108P extends in a first direction (the Y-axis) perpendicular to the optical axis 2-O.

In addition, the first side wall 2-112SW has a recess 2-112C, and the winding structure 2-108P is located in the recess 2-112C (FIG. 8). As shown in FIG. 10, when viewed in a second direction (the X-axis) perpendicular to the optical axis 2-O, the winding structure 2-108P overlaps at least a part of the first side wall 2-112SW. Based on the above structural design, when the lens holder 2-108 is impacted and moves in the Y-axis, the lens holder 2-108 does not collide with the first side wall 2-112SW and cause damage.

Figure 11:
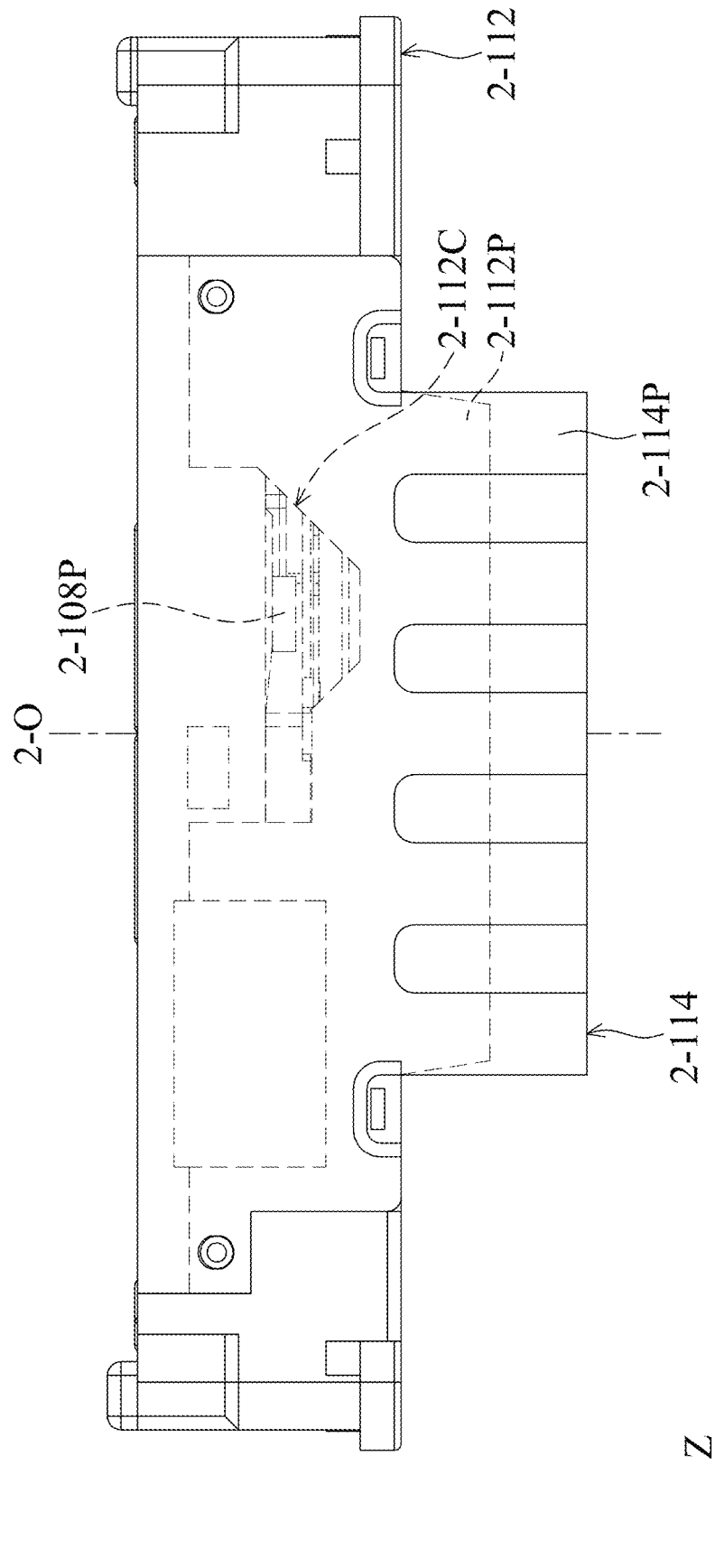
FIG. 11 is a rear view of a partial structure of the optical element driving mechanism 2-100 according to an embodiment of the present disclosure.

Please refer to FIG. 8 and FIG. 11. FIG. 11 is a rear view of a partial structure of the optical element driving mechanism 2-100 according to an embodiment of the present disclosure. In this embodiment, the first side wall 2-112SW has a first protruding portion 2-112P that protrudes toward a light-exiting end of the optical element driving mechanism 2-100. The light-exiting end can be a light receiving end below the optical element driving mechanism 2-100 in FIG. 7.

The circuit assembly 2-114 is a flexible circuit board and includes a second protruding portion 2-114P, and when the circuit assembly 2-114 is affixed to the first side wall 2-112SW, the first protruding portion 2-112P can support the second protruding portion 2-114P. As shown in FIG. 11, when viewed in the first direction (the Y-axis), the first protruding portion 2-112P overlaps at least a part of the second protruding portion 2-114P.

Figure 12:
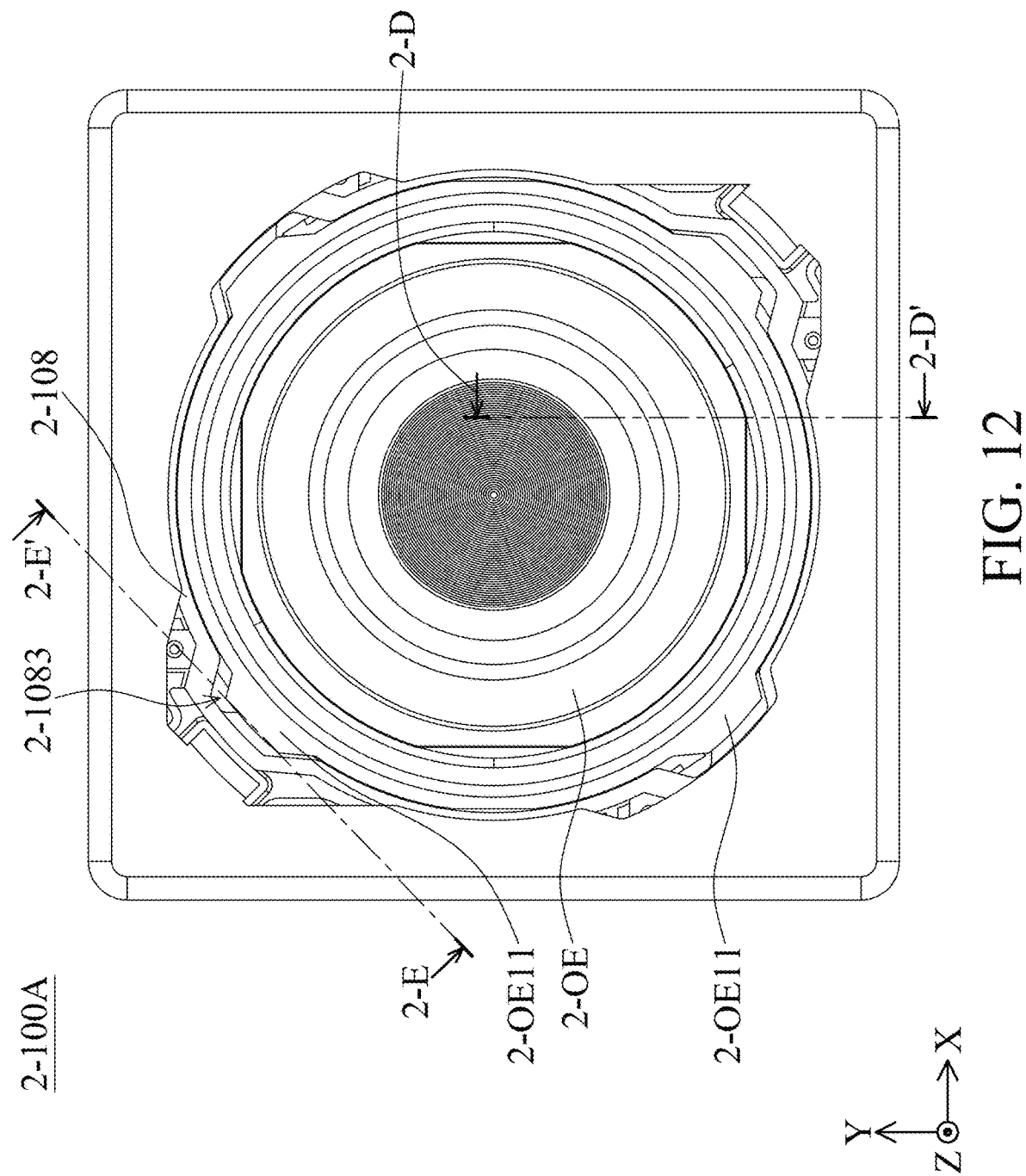
FIG. 12 is a top view of an optical element driving mechanism 2-100A according to another embodiment of the present disclosure.
Figure 13:
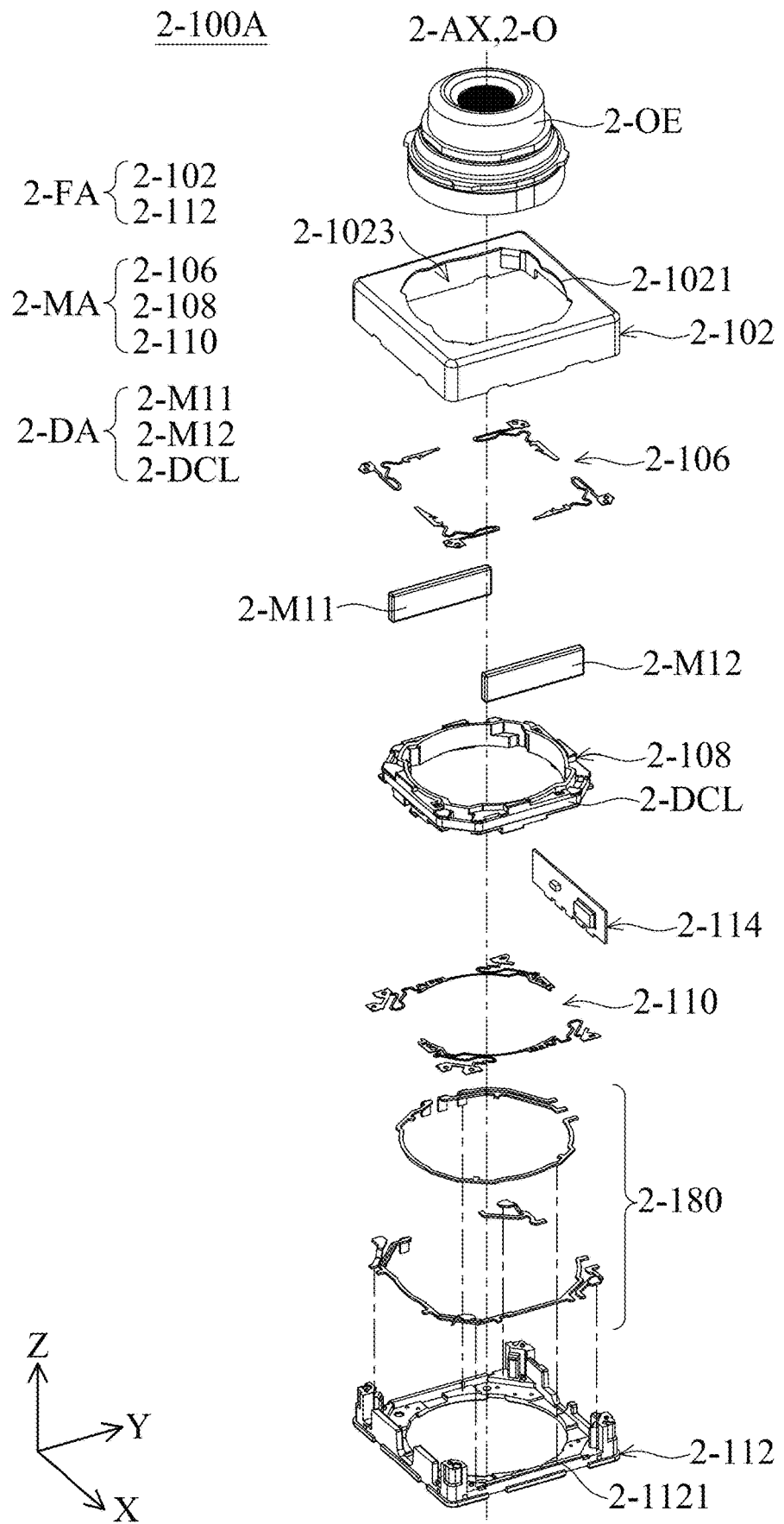
FIG. 13 is an exploded diagram of the optical element driving mechanism 2-100A according to another embodiment of the present disclosure.
Figure 14:
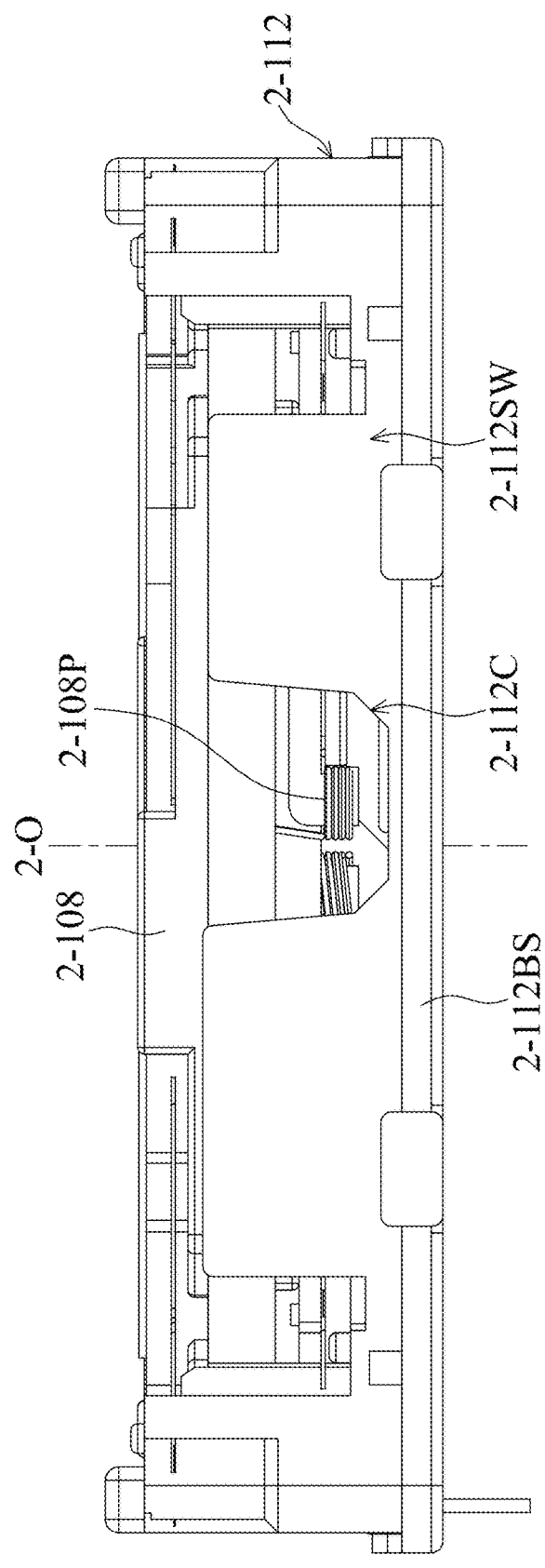
FIG. 14 is a front view of the optical element driving mechanism 2-100A after removing the casing 2-102 according to another embodiment of the present disclosure.

Please refer to FIG. 12 to FIG. 14. FIG. 12 is a top view of an optical element driving mechanism 2-100A according to another embodiment of the present disclosure, FIG. 13 is an exploded diagram of the optical element driving mechanism 2-100A according to another embodiment of the present disclosure, and FIG. 14 is a front view of the optical element driving mechanism 2-100A after removing the casing 2-102 according to another embodiment of the present disclosure. The optical element driving mechanism 2-100A in this embodiment is similar to the optical element driving mechanism 2-100 and has the movable assembly 2-MA, the fixed assembly 2-FA, and the driving assembly 2-DA. The lens holder 2-108 in the movable assembly 2-MA can hold an optical element 2-OE, and the elements with the same reference number have the same or similar structure and function, so they are not be repeated herein.

As shown in FIG. 14, the winding structure 2-108P of the lens holder 2-108 in this embodiment extends along the optical axis 2-O (the Z-axis), and the first side wall 2-112SW also has a recess 2-112C. When viewed in the first direction (the Y-axis), the winding structure 2-108P overlaps the recess 2-112C.

Figure 15:
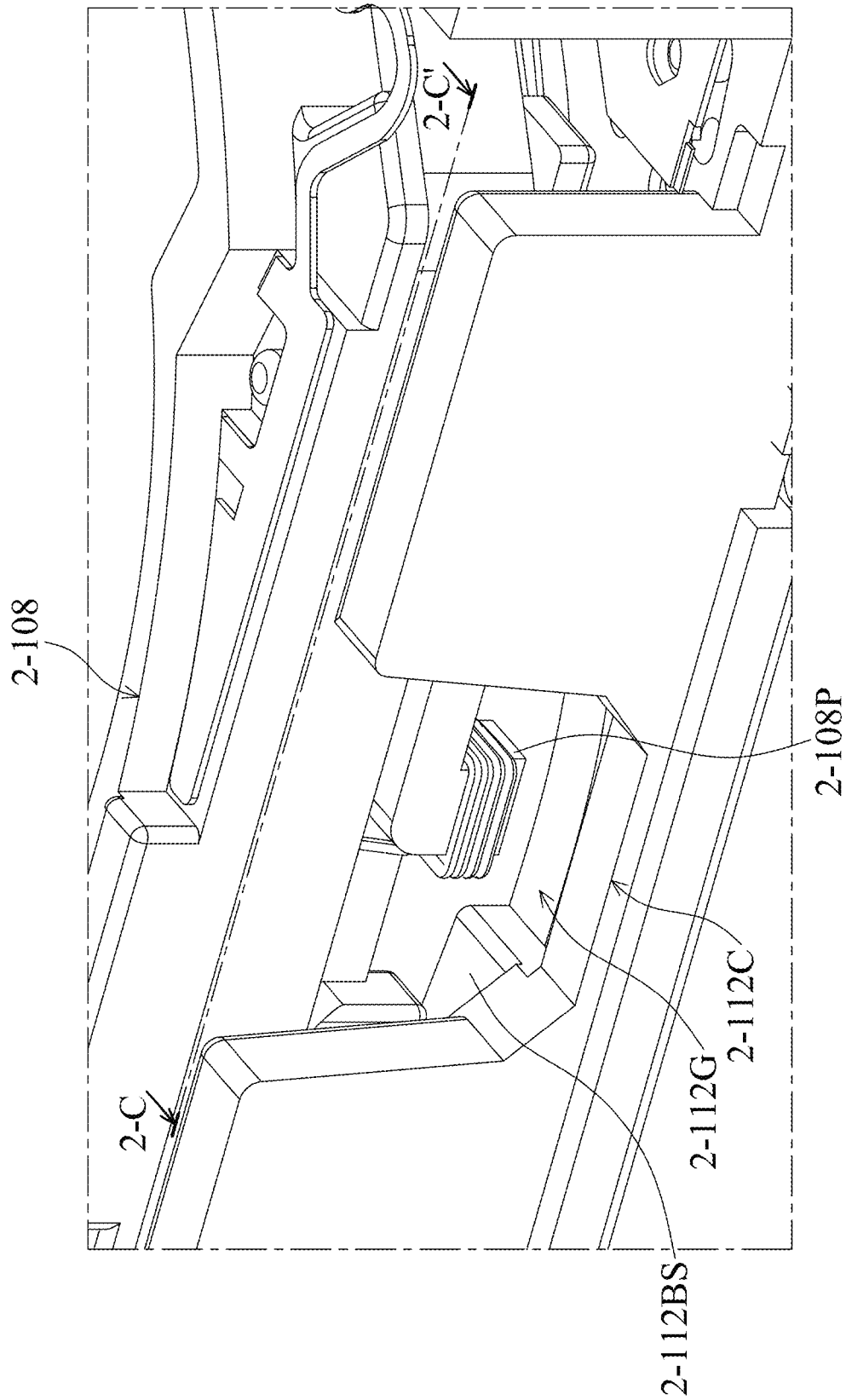
FIG. 15 is a perspective view of a partial structure of the optical element driving mechanism 2-100A after the casing 2-102 is removed according to another embodiment of the present disclosure.

Next, please refer to FIG. 14 and FIG. 15. FIG. 15 is a perspective view of a partial structure of the optical element driving mechanism 2-100A after the casing 2-102 is removed according to another embodiment of the present disclosure. As shown in FIG. 14, the bottom wall 2-112B S of the base 2-112 is connected to the first side wall 2-112SW, and as shown in FIG. 15, the base 2-112 may further have a groove 2-112G, which is formed from the bottom wall 2-112BS along the optical axis 2-O.

Based on the above structural design, when the lens holder 2-108 moves along the optical axis 2-O, the winding structure 2-108P of the lens holder 2-108 does not collide with the bottom wall 2-112B S and cause damage.

Figure 16:
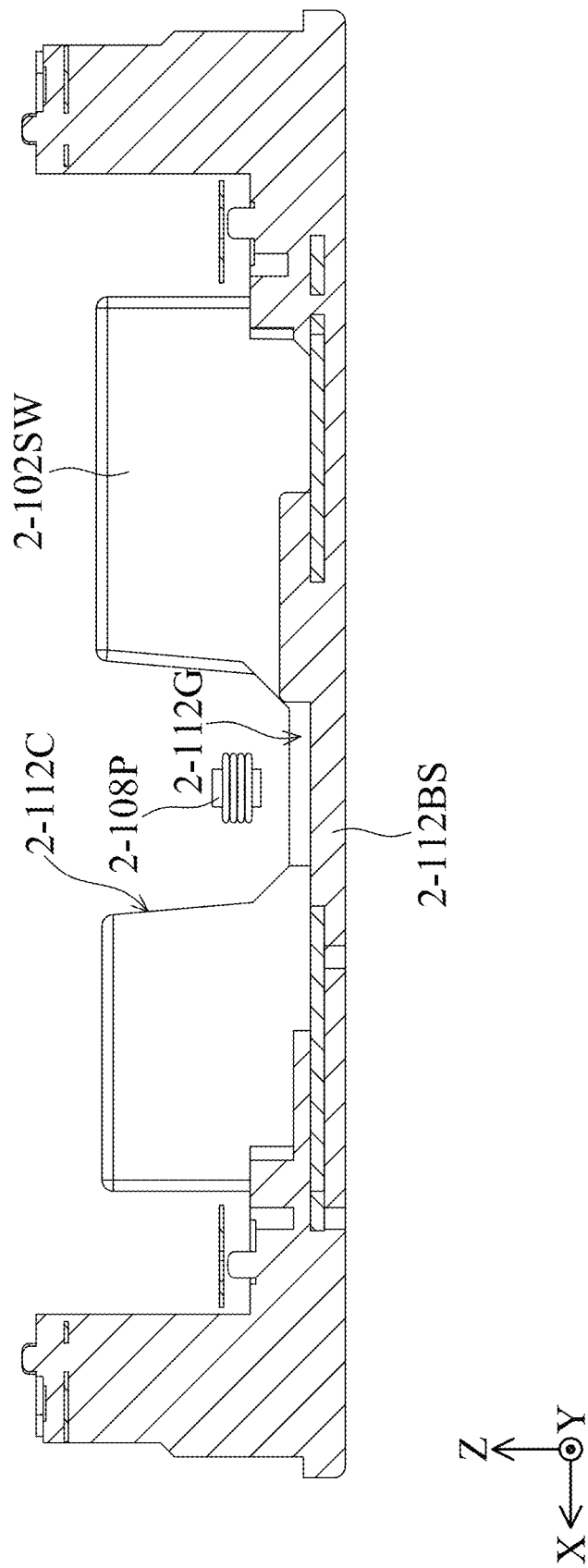
FIG. 16 is a cross-sectional view of the optical element driving mechanism 2-100A along line 2-C-2-C' in FIG. 15 according to an embodiment of the present disclosure.

Please refer to FIG. 16, which is a cross-sectional view of the optical element driving mechanism 2-100A along line 2-C-2-C' in FIG. 15 according to an embodiment of the present disclosure. As shown in FIG. 16, when viewed in the first direction (the Y-axis), the recess 2-112C does not overlap the groove 2-112G. Based on the above structural design, the base 2-112 can have sufficient structural strength, and the problem of the winding structure 2-108P colliding with the base 2-112 when moving in the Y-axis and/or the Z-axis can be avoided.

Figure 17:
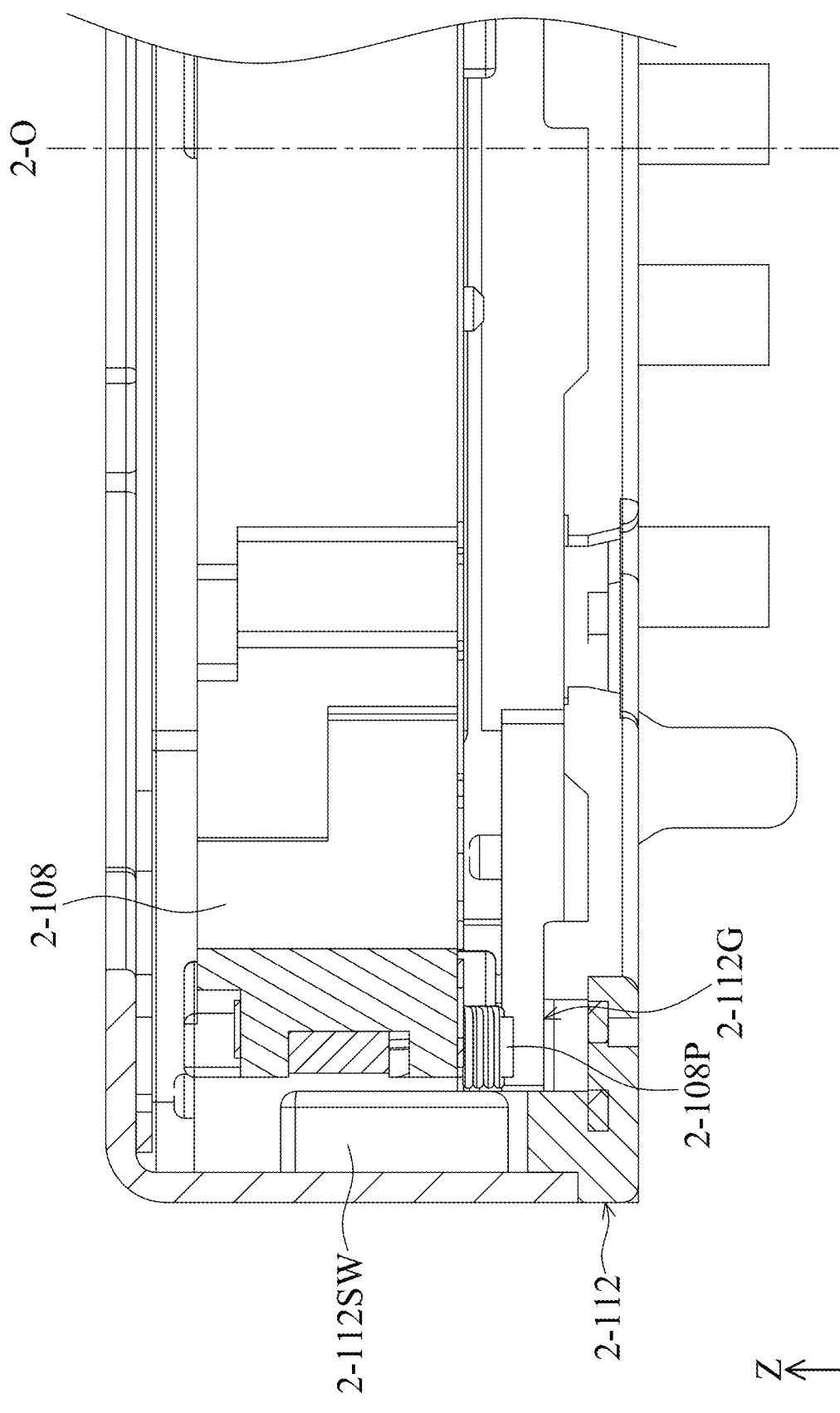
FIG. 17 is a cross-sectional view of the optical element driving mechanism 2-100A along the line 2-D-2-D' in FIG. 12 according to an embodiment of the present disclosure.

In addition, please refer to FIG. 17, which is a cross-sectional view of the optical element driving mechanism 2-100A along the line 2-D-2-D' in FIG. 12 according to an embodiment of the present disclosure. As shown in FIG. 17, when viewed in the second direction (the X-axis), the winding structure 2-108P does not overlap the first side wall 2-112SW, and the first direction is perpendicular to the second direction.

In addition, as shown in FIG. 17, when viewed along the optical axis 2-O, the winding structure 2-108P overlaps at least a part of the groove 2-112G. Specifically, the projection of the winding structure 2-108P along the optical axis 2-O completely falls on the groove 2-112G.

Figure 18:
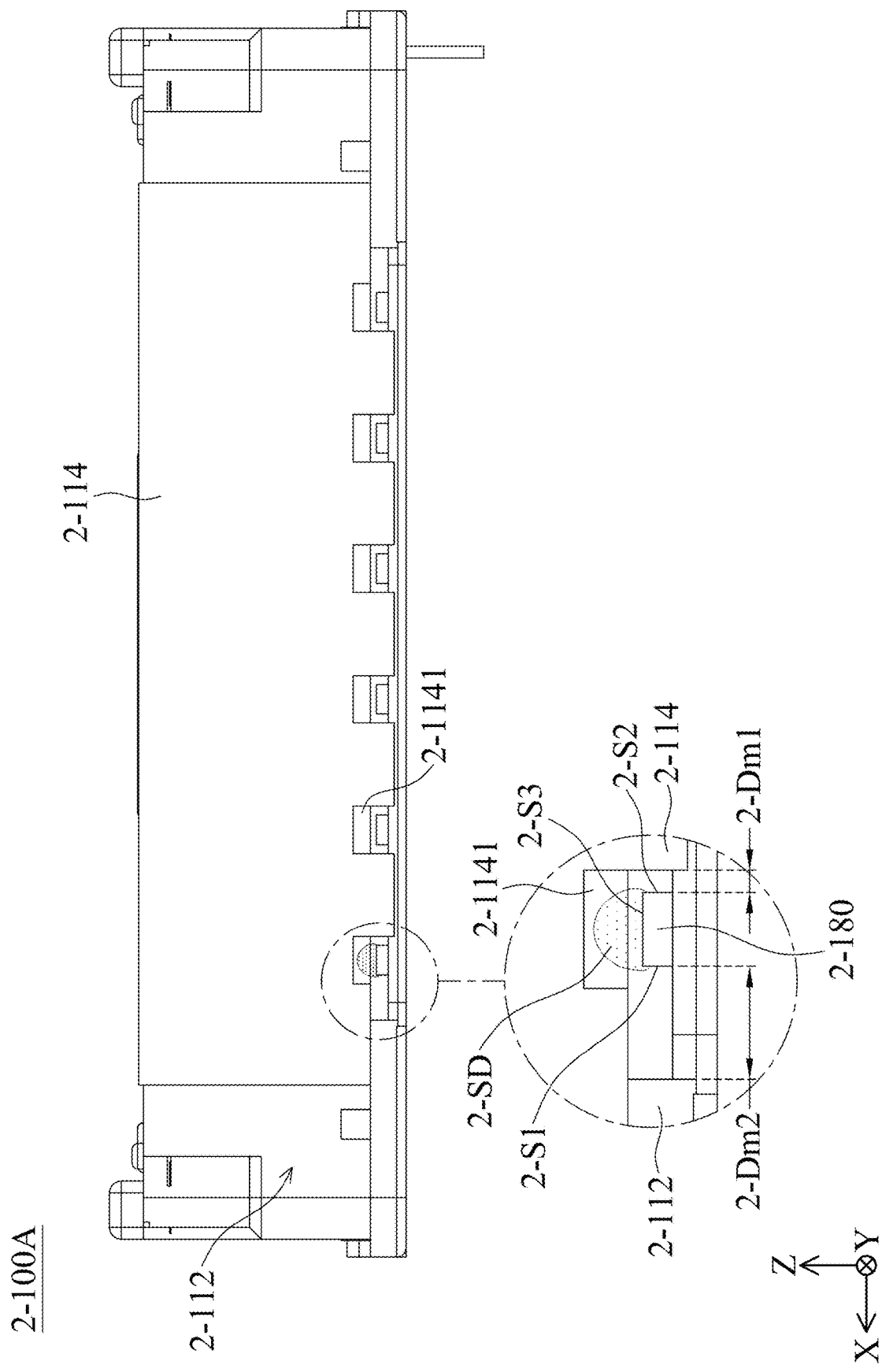
FIG. 18 is a rear view of the optical element driving mechanism 2-100A after the casing 2-102 is removed according to another embodiment of the present disclosure.

Please refer to FIG. 18, which is a rear view of the optical element driving mechanism 2-100A after the casing 2-102 is removed according to another embodiment of the present disclosure. In this embodiment, the circuit member 2-180 protrudes from the base 2-112 and is electrically connected to the circuit assembly 2-114. When viewed in the first direction (the Y-axis), the shortest distance 2-Dm1 between the circuit member 2-180 and the circuit assembly 2-114 in the second direction (the X-axis) is smaller than the shortest distance 2-Dm2 between the circuit member 2-180 and the base 2-112 in the second direction.

As shown in FIG. 18, the circuit member 2-180 has a first side surface 2-S1 and a second side surface 2-S2. The first side surface 2-S1 does not face the circuit assembly 2-114, the second side surface 2-S2 faces the circuit assembly 2-114, and the first side surface 2-S1 and the second side surface 2-S2 face in opposite directions.

As shown in FIG. 18, the circuit assembly 2-114 has a plurality of electrical connecting elements 2-1141 (such as soldering pads), and the circuit member 2-180 may have a third side surface 2-S3, which faces the electrical connecting element 2-1141. The circuit member 2-180 can be electrically connected to the corresponding electrical connecting element 2-1141 by solder 2-SD, and the solder 2-SD is, for example, disposed between the third side surface 2-S3 and the electrical connecting element 2-1141.

Figure 19:
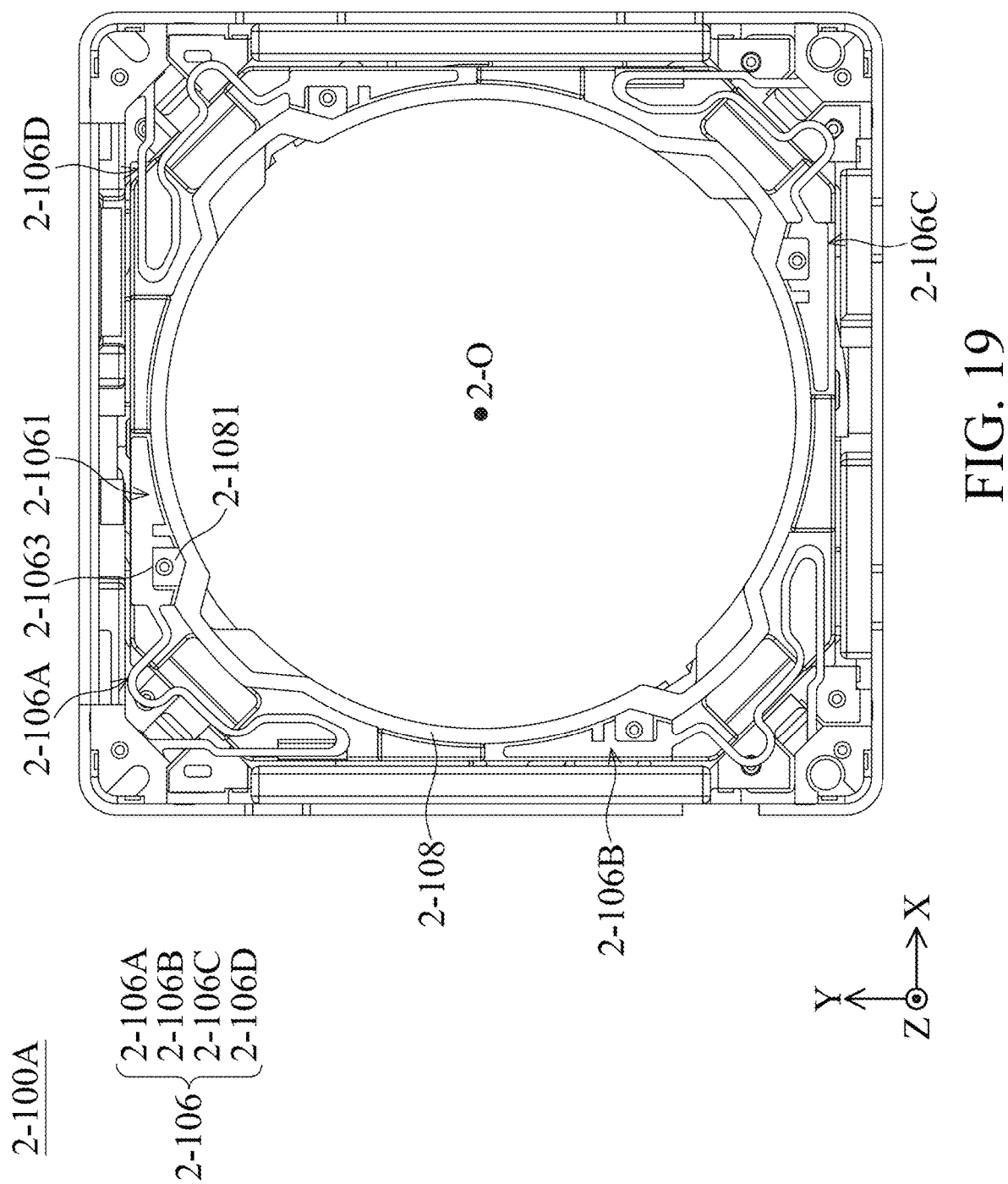
FIG. 19 is a top view of the optical element driving mechanism 2-100A after the casing 2-102 is removed according to another embodiment of the present disclosure.

Next, please refer to FIG. 19, which is a top view of the optical element driving mechanism 2-100A after the casing 2-102 is removed according to another embodiment of the present disclosure. As shown in FIG. 19, the first elastic member 2-106 includes four separate spring sheets 2-106A to 2-106D, and when viewed along the optical axis 2-O, these spring sheets 2-106A to 2-106D are rotationally symmetrical.

Figure 20:
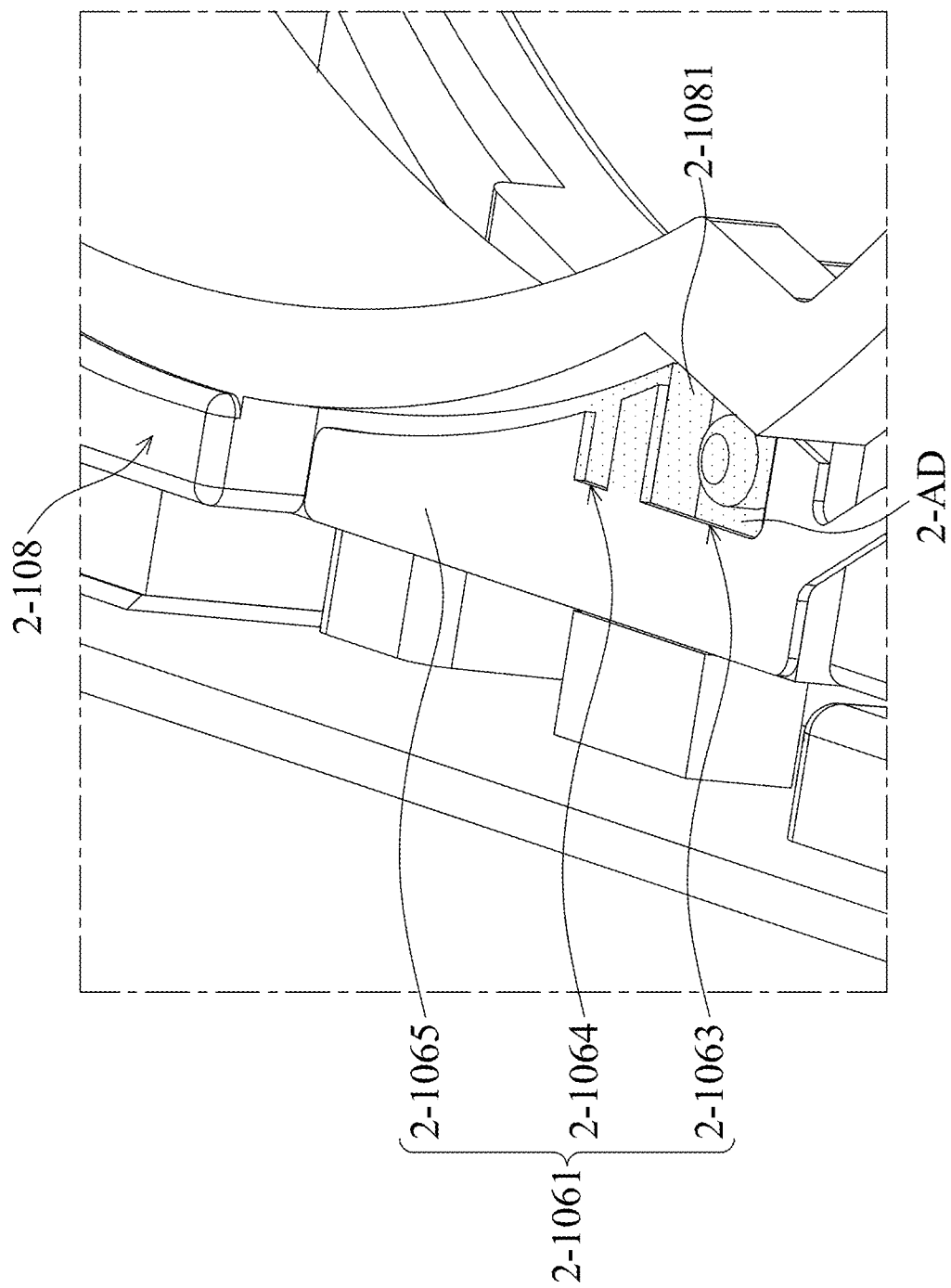
FIG. 20 is a perspective view of a partial structure of the optical element driving mechanism 2-100A according to another embodiment of the present disclosure.

Please refer to FIG. 19 and FIG. 20. FIG. 20 is a perspective view of a partial structure of the optical element driving mechanism 2-100A according to another embodiment of the present disclosure. As shown in FIG. 20, the spring sheet 2-106A includes a fixed connecting portion 2-1061, which can be fixedly connected to the lens holder 2-108 of the movable assembly 2-MA by an adhesive element 2-AD. The fixed connecting portion 2-1061 has a first notch 2-1063, and the lens holder 2-108 of the movable assembly 2-MA has an accommodating groove 2-1081 corresponding to the first notch 2-1063. When viewed along the optical axis 2-O, the accommodating groove 2-1081 is exposed from the first notch 2-1063, and the adhesive element 2-AD is disposed in the accommodating groove 2-1081 and the first notch 2-1063.

Furthermore, the fixed connecting portion 2-1061 may further include a second notch 2-1064 and a pressed area 2-1065. The second notch 2-1064 is located between the first notch 2-1063 and the pressed area 2-1065, and the second notch 2-1064 is configured to accommodate at least a part of the adhesive element 2-AD, so as to prevent the adhesive element 2-AD from entering the pressed area 2-1065.

Specifically, when the spring sheet 2-106A is installed on the lens holder 2-108, the pressed area 2-1065 of the spring sheet 2-106A is pressed by a pressing member (not shown in the figures), and then the adhesive element 2-AD is disposed in the first notch 2-1063. After a period of time, the adhesive element 2-AD can fix the fixed connecting portion 2-1061 of the spring sheet 2-106A to the lens holder 2-108, and finally the pressing member is separated from the pressed area 2-1065.

Figure 21:
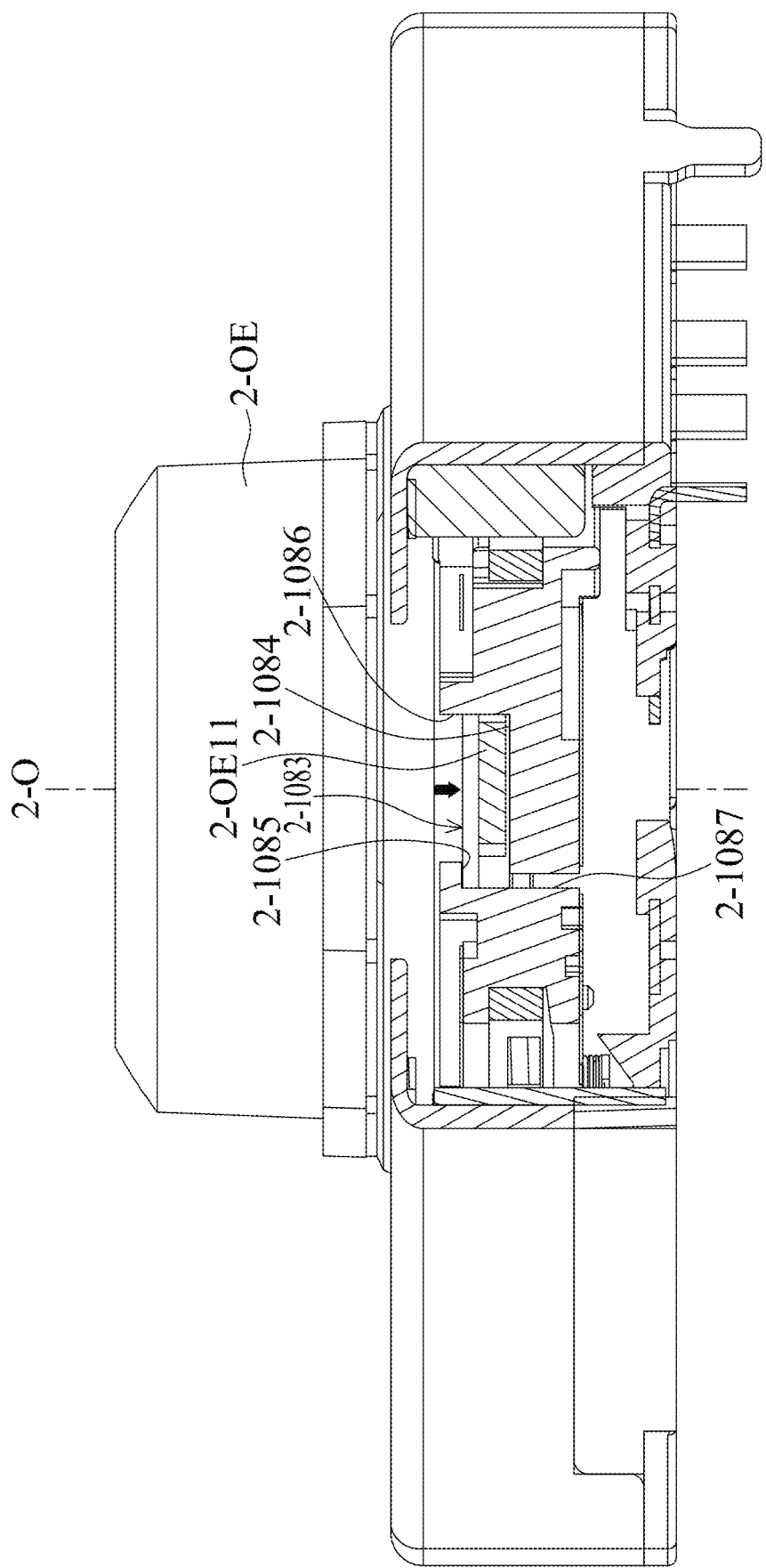
FIG. 21 is a cross-sectional view of the optical element driving mechanism 2-100A along line 2-E-2-E' in FIG. 12 according to another embodiment of the present disclosure.

Please refer to FIG. 12 and FIG. 21. FIG. 21 is a cross-sectional view of the optical element driving mechanism 2-100A along line 2-E-2-E' in FIG. 12 according to another embodiment of the present disclosure. The lens holder 2-108 of the movable assembly 2-MA has a slot structure 2-1083 configured to be engaged with an engaging portion 2-OE11 of the optical element 2-OE. The slot structure 2-1083 has a first surface 2-1084 and a second surface 2-1085. When viewed along the optical axis 2-O, the first surface 2-1084 partially overlaps the second surface 2-1085, and the size of the engaging portion 2-OE11 is smaller than the size of the first surface 2-1084.

Figure 22:
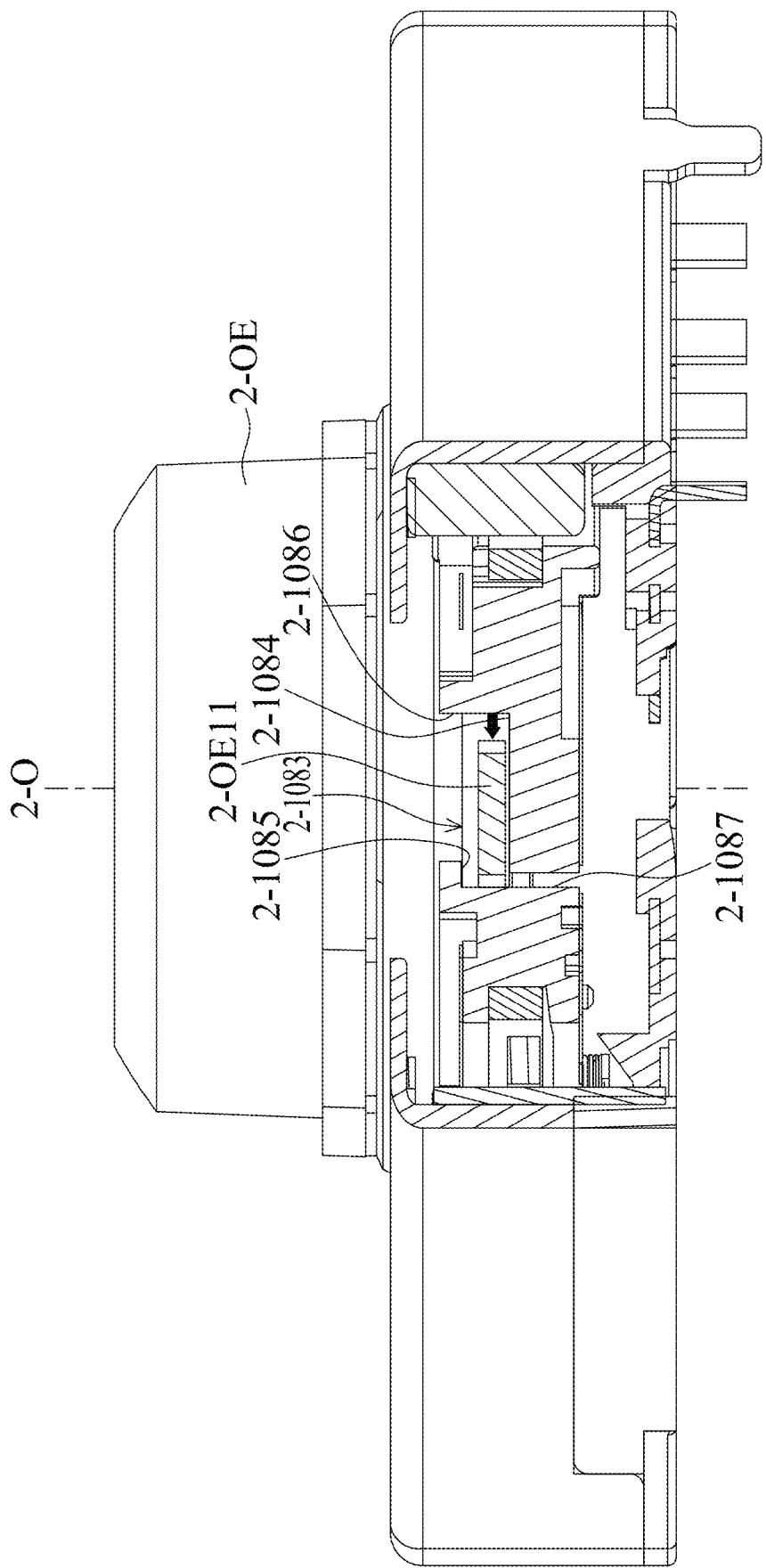
FIG. 22 is a cross-sectional view showing that the engaging portion 2-OE11 is engaged with the slot structure 2-1083 according to another embodiment of the present disclosure.

Please refer to FIG. 21 and FIG. 22. FIG. 22 is a cross-sectional view showing that the engaging portion 2-OE11 is engaged with the slot structure 2-1083 according to another embodiment of the present disclosure. When the engaging portion 2-OE11 moves from the position shown in FIG. 21 to the position shown in FIG. 22, the engaging portion 2-OE11 can be engaged with the slot structure 2-1083. At this time, the first surface 2-1084 partially overlaps the engaging portion 2-OE11, and the second surface 2-1085 partially overlaps the engaging portion 2-OE11.

In addition, the slot structure 2-1083 has a third surface 2-1086 and a fourth surface 2-1087. The third surface 2-1086 is connected to the first surface 2-1084, the fourth surface 2-1087 is connected to the second surface 2-1085, and a distance between the engaging portion 2-OE11 and the third surface 2-1086 is different from a distance between the engaging portion 2-OE11 and the fourth surface 2-1087. Specifically, as shown in FIG. 22, the distance between the engaging portion 2-OE11 and the third surface 2-1086 (for example, greater than zero) is greater than the distance between the engaging portion 2-OE11 and the fourth surface 2-1087 (for example, equal to zero).

The present disclosure provides an optical element driving mechanism 2-100, which has a base 2-112, a circuit assembly 2-114 and at least one positioning structure 2-113. The positioning structure 2-113 is disposed on the first side wall 2-112SW of the base 2-112, and the circuit assembly 2-114 is positioned on the first side wall 2-112SW by the positioning structure 2-113. Therefore, based on the structural design of the present disclosure, the circuit assembly 2-114 can be accurately positioned on the base 2-112, and can also be more stably affixed to the base 2-112.

Furthermore, in some embodiments, the optical element driving mechanism 2-100 further includes four separate spring sheets 2-106A to 2-106D. Each spring sheet includes a fixed connection part 2-1061, which is affixed to the lens holder 2-108 by an adhesive element 2-AD. The fixed connecting portion 2-1061 has a first notch 2-1063, a second notch 2-1064, and a pressed area 2-1065. The second notch 2-1064 is located between the first notch 2-1063 and the pressed area 2-1065, and the second notch 2-1064 is configured to accommodate at least a part of the adhesive element 2-AD, thereby preventing the adhesive element 2-AD from entering the pressed area 2-1065.

The Third Embodiment Group

Figure 23:
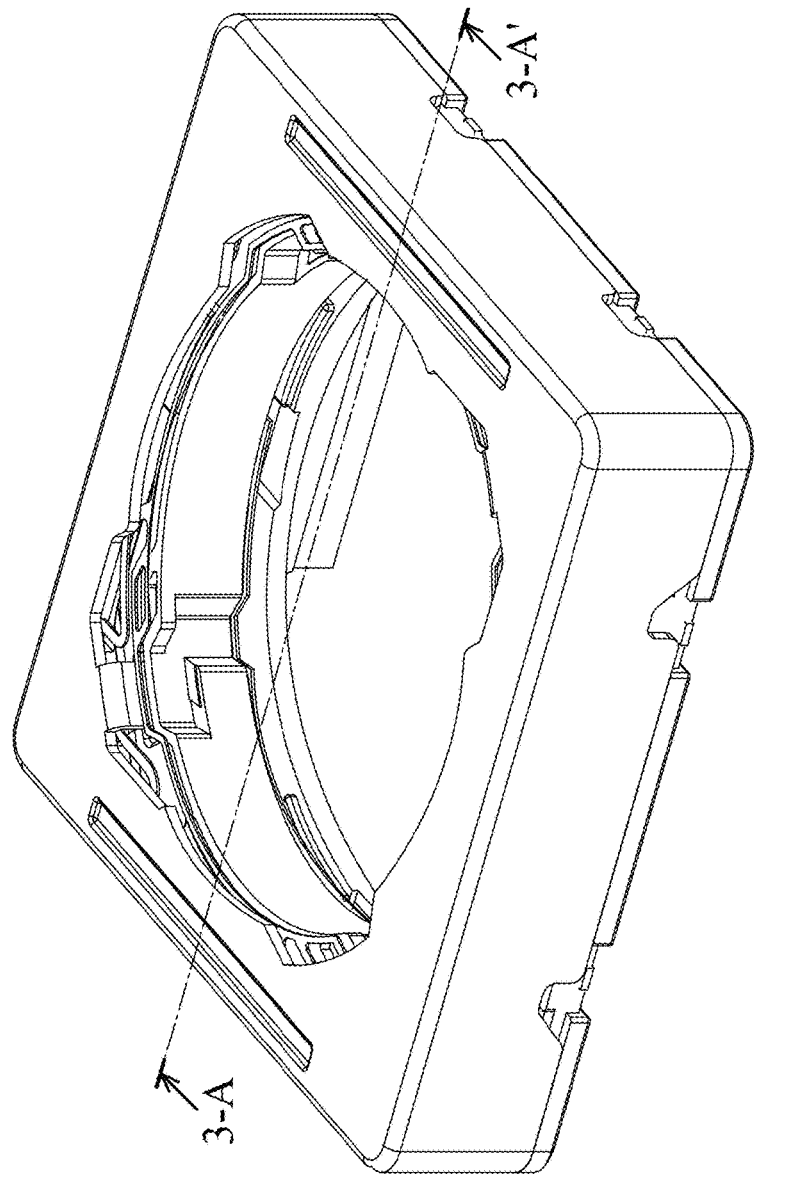
FIG. 23 is a schematic diagram of an optical element driving mechanism 3-100 according to an embodiment of the present disclosure.
Figure 24:
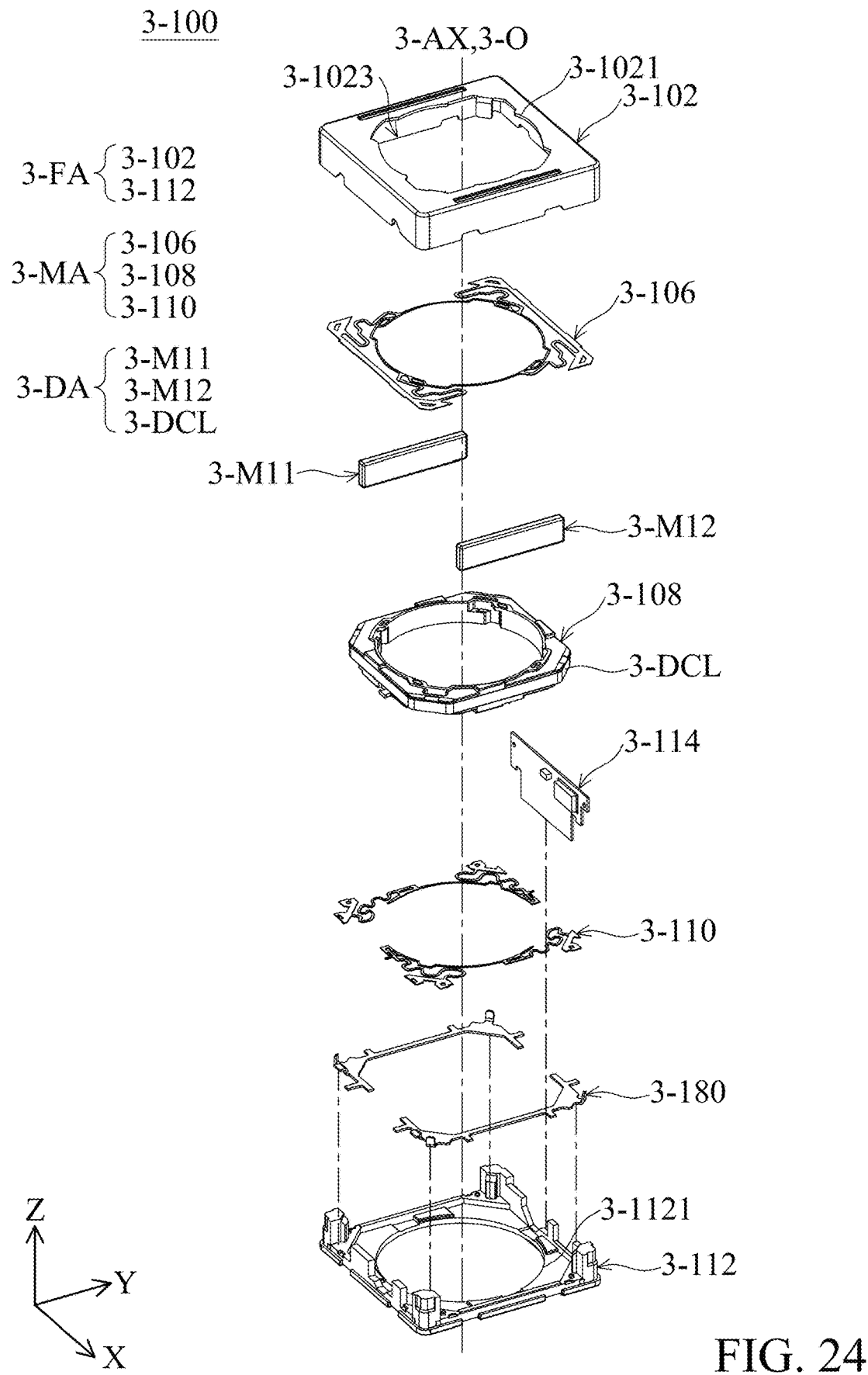
FIG. 24 is an exploded diagram of the optical element driving mechanism 3-100 according to an embodiment of the present disclosure.
Figure 25:
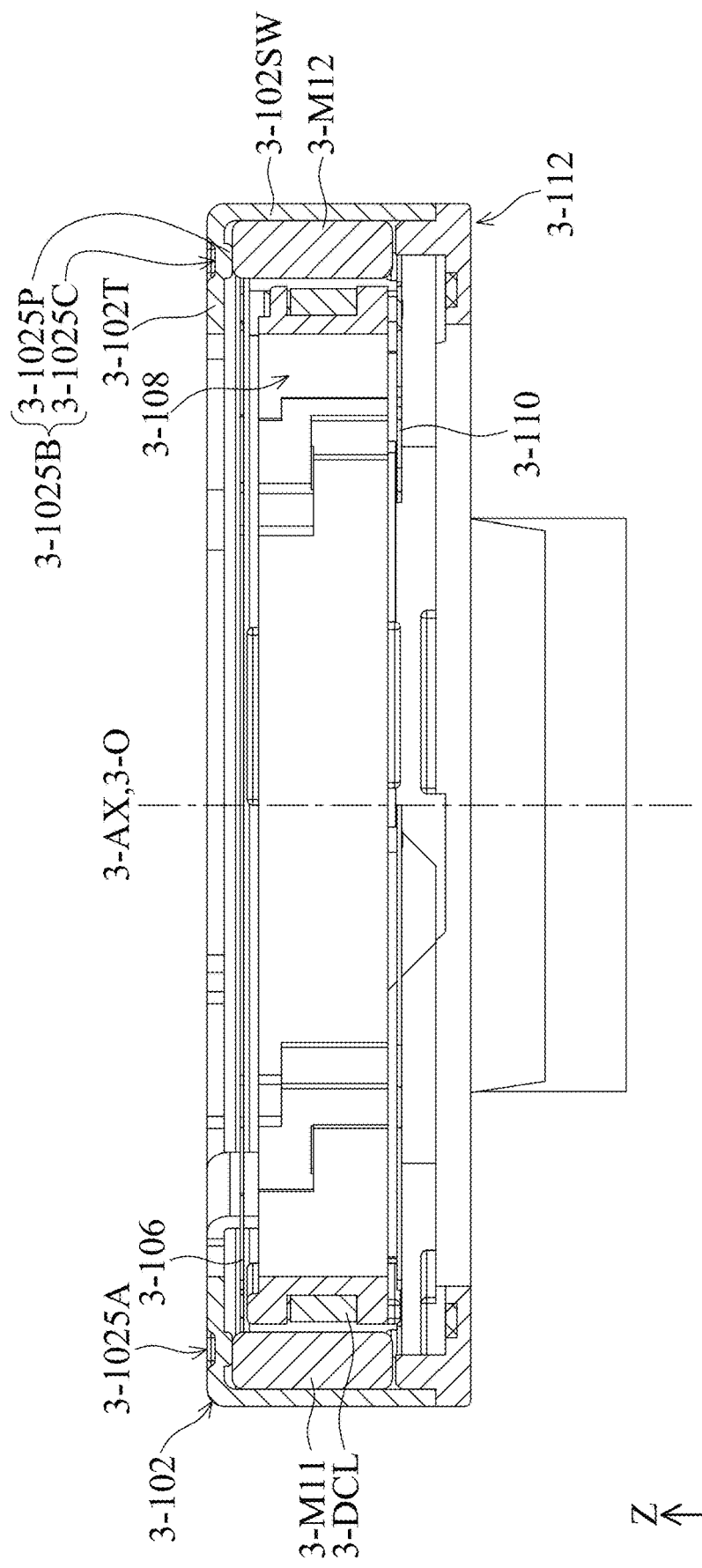
FIG. 25 is a cross-sectional view of the optical element driving mechanism 3-100 along line 3-A-3-A' in FIG. 23 according to an embodiment of the present disclosure.

Please refer to FIG. 23 to FIG. 25. FIG. 23 is a schematic diagram of an optical element driving mechanism 3-100 according to an embodiment of the present disclosure. FIG. 24 is an exploded diagram of the optical element driving mechanism 3-100 according to an embodiment of the present disclosure, and FIG. 25 is a cross-sectional view of the optical element driving mechanism 3-100 along line 3-A-3-A' in FIG. 23 according to an embodiment of the present disclosure. The optical element driving mechanism 3-100 can be an optical camera module configured to hold an optical element. The optical element driving mechanism 3-100 can be installed in various electronic devices or portable electronic devices, such as a smartphone, for allowing a user to perform the image capturing function. In this embodiment, the optical element driving mechanism 3-100 can be a voice coil motor (VCM) with an auto-focusing (AF) function, but it is not limited thereto. In other embodiments, the optical element driving mechanism 3-100 can also perform the functions of auto-focusing and optical image stabilization (OIS).

In the present embodiment, the optical element driving mechanism 3-100 can include a fixed assembly 3-FA, a movable assembly 3-MA, and a driving assembly 3-DA. The movable assembly 3-MA is movably connected to the fixed assembly 3-FA, and the movable assembly 3-MA is configured to hold the optical element (not shown in the figures). The driving assembly 3-DA is configured to drive the movable assembly 3-MA to move relative to the fixed assembly 3-FA.

In this embodiment, as shown in FIG. 24, the fixed assembly 3-FA includes a casing 3-102 and a base 3-112. The movable assembly 3-MA includes a lens holder 3-108 and the aforementioned optical element, and the lens holder 3-108 is configured to hold the optical element. A main axis 3-AX can be defined by the fixed assembly 3-FA, and an optical axis 3-O can be defined by the optical element. The main axis 3-AX may, for example, overlap the optical axis 3-O, but it is not limited thereto. The casing 3-102 and the base 3-112 are arranged along the main axis 3-AX.

As shown in FIG. 24, the casing 3-102 has a hollow structure, and a casing opening 3-1021 is formed thereon, and a base opening 3-1121 is formed on the base 3-112. The center of the casing opening 3-1021 corresponds to the optical axis 3-O of the optical element, and the base opening 3-1121 corresponds to a photosensitive element (not shown) disposed under the base 3-112. The external light can enter the casing 3-102 from the casing opening 3-1021 to be received by the photosensitive element after passing through the optical element and the base opening 3-1121 so as to generate a digital image signal.

Furthermore, the casing 3-102 is disposed on the base 3-112 and may have an accommodating space 3-1023 is configured to accommodate the movable assembly 3-MA (including the aforementioned optical element and the lens holder 3-108) and the driving assembly 3-DA.

The movable assembly 3-MA may further include a first elastic member 3-106 and a second elastic member 3-110. The outer portion (the outer ring portion) of the first elastic member 3-106 is affixed to the base 3-112, the outer portion (the outer ring portion) of the second elastic member 3-110 is affixed to the base 3-112, and the inner portions (the inner ring portions) of the first elastic member 3-106 and the second elastic member 3-110 are respectively connected to the upper and lower sides of the lens holder 3-108, so that the lens holder 3-108 can be suspended in the accommodating space 3-1023.

In this embodiment, the driving assembly 3-DA may include a first magnet 3-M11, a second magnet 3-M12, and a driving coil 3-DCL. The driving coil 3-DCL is disposed on the lens holder 3-108, and the first magnet 3-M11 and the second magnet 3-M12 are disposed on the inner wall surface of the casing 3-102 and respectively corresponding to the driving coil 3-DCL.

In this embodiment, the driving coil 3-DCL may be wound coils and be disposed on the lens holder 3-108, and a winding axis of the driving coil 3-DCL may be parallel to the optical axis 3-O. When the driving coil 3-DCL is provided with electricity, the driving coil 3-DCL acts with the first magnet 3-M11 and the second magnet 3-M12 to generate an electromagnetic force, so as to drive the lens holder 3-108 and the held optical element to move relative to the base 3-112 along the optical axis 3-O (the Z-axis).

Furthermore, the optical element driving mechanism 3-100 of the present disclosure further includes a circuit assembly 3-114 and a circuit member 3-180 electrically connected to the driving assembly 3-DA. The circuit assembly 3-114 may be a circuit board configured to be electrically connected to an external circuit, such as a main circuit board of an external electronic device, so that the driving assembly 3-DA can operate according to the signal of the external electronic device.

Furthermore, in this embodiment, the circuit member 3-180 is disposed inside the base 3-112. For example, the base 3-112 is made of plastic material, and the circuit member 3-180 is formed in the base 3-112 by the molded interconnect device (MID) technology.

Figure 26:
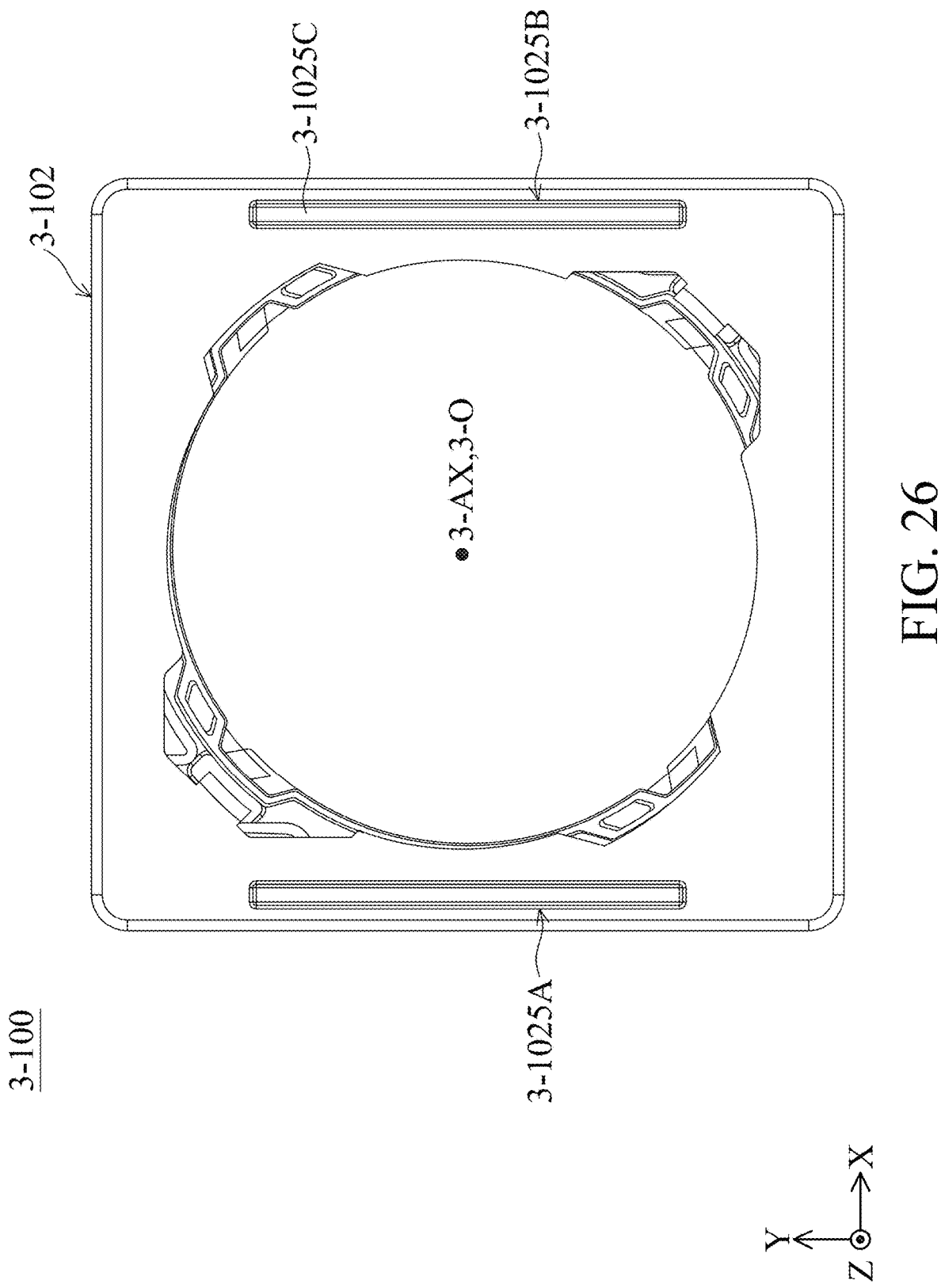
FIG. 26 is a top view of an optical element driving mechanism 3-100 according to an embodiment of the present disclosure.

Please refer to FIG. 24 to FIG. 26. FIG. 26 is a top view of an optical element driving mechanism 3-100 according to an embodiment of the present disclosure. As shown in the figures, the casing 3-102 may further have a plurality of positioning structures 3-1025A, 3-1025B. These positioning structures 3-1025A, 3-1025B protrude toward the base 3-112, and the driving magnets (the first magnet 3-M11 and the second magnet 3-M12) are respectively fixed on the positioning structures 3-1025A, 3-1025B. These positioning structures are used to improve the assembly accuracy of the optical element driving mechanism 3-100.

In this embodiment, the positioning structure 3-1025A and the positioning structure 3-1025B each have a long-strip shaped convex portion 3-1025P, and when viewed along the main axis 3-AX, as shown in FIG. 26, these positioning structures extend in a first direction (for example, the Y-axis), which is perpendicular to the main axis 3-AX. Based on this structural design, the contact area of the driving magnets can be increased, the overall mechanical structure can be strengthened, and the positioning accuracy can be improved at the same time.

As shown in FIG. 25, the casing 3-102 has a top wall 3-102T and a long-strip shaped concave portion 3-1025C, the long-strip shaped concave portion 3-1025C corresponds to the long-strip shaped convex portion 3-1025P, and the long-strip shaped concave portion 3-1025C and the long-strip shaped convex portion 3-1025P are located on opposite sides of the top wall 3-102T. In this embodiment, the positioning structures 3-1025A and 3-1025B can be made by metal processing techniques such as stamping, but are not limited thereto.

The casing 3-102 also has a side wall 3-102SW, the top wall 3-102T and the side wall 3-102SW are not parallel to each other, and the shortest distance between the positioning structure 3-1025B and the side wall 3-102SW is greater than zero. Based on this structural design, the positioning accuracy of the driving magnet can be improved.

In addition, when viewed along the main axis 3-AX, the shortest distance between the long-strip shaped concave portion 3-1025C and the side wall 3-102SW is greater than zero. It is worth noting that the long-strip shaped concave portion 3-1025C of the present disclosure can be used to accommodate a part of the adhesive, so that the optical element driving mechanism 3-100 and a protective sheet (or other elements) are connected to each other through the adhesive. The long-strip shaped concave portion 3-1025C can restrict the flow direction of the adhesive and increase the contact area to enhance the mechanical strength after bonding.

In addition, because the long-strip shaped concave portion 3-1025C is formed on the casing 3-102, the closure of the protective sheet and the casing 3-102 after bonding can be further improved so as to prevent foreign objects from entering.

Figure 27:
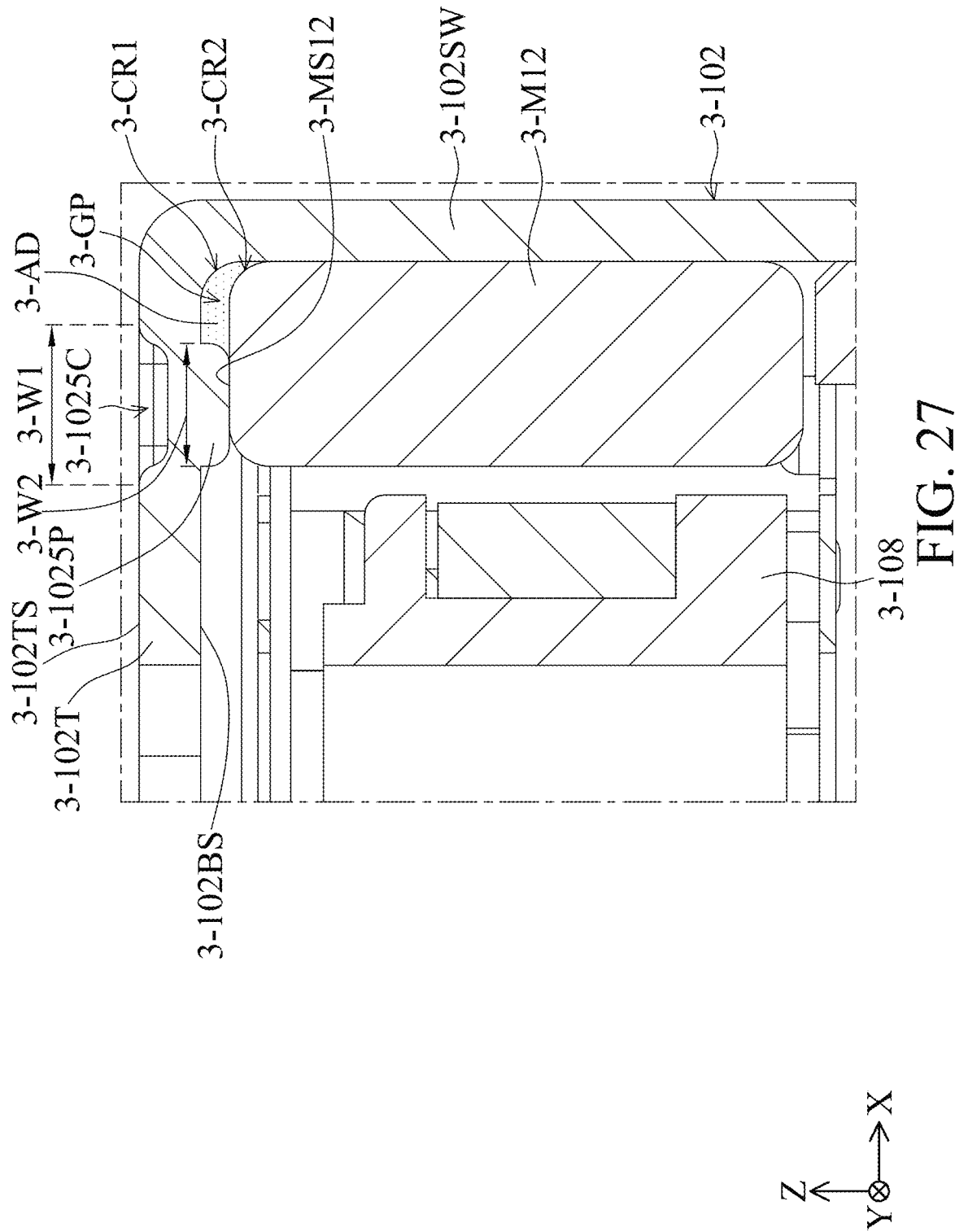
FIG. 27 is an enlarged diagram of FIG. 25 according to an embodiment of the present disclosure.

Please refer to FIG. 27, which is an enlarged diagram of FIG. 25 according to an embodiment of the present disclosure. When viewed in the first direction (the Y-axis), the maximum width 3-W1 of the long-strip shaped concave portion 3-1025C in a second direction (the X-axis) is greater than the maximum width 3-W2 of the long-strip shaped convex portion 3-1025P of the positioning structure 3-1025B in the second direction, but it is not limited thereto. For example, in other embodiments, the maximum width 3-W1 may be smaller than the maximum width 3-W2. The first direction is perpendicular to the second direction. When the aforementioned protective sheet (not shown in the figures) is disposed on the casing 3-102, only a top surface 3-102TS of the top wall 3-102T is in contact with the external protective sheet. Therefore, the long-strip shaped concave portion 3-1025C can increase the contact area to improve the bonding strength.

The top wall 3-102T has a bottom surface 3-102BS, and the long-strip shaped convex portion 3-1025P of the positioning structure 3-1025B protrudes from the bottom surface 3-102B S. Based on this structural design, the driving magnet does not need to contact the corner of the casing 3-102, so as to avoid the problem of being disposed at the corner and affecting the assembly accuracy. In addition, there is a gap 3-GP between the driving magnet (the second magnet 3-M12) and the bottom surface 3-102BS. The optical element driving mechanism 3-100 may further include an adhesive element 3-AD disposed in the gap 3-GP and configured to adhere to the driving magnet (for example, the second magnet 3-M12), the side wall 3-102SW, the bottom surface 3-102B S, and the long-strip shaped convex portion 3-1025P so that the second magnet 3-M12 is affixed to the positioning structure 3-1025B and the inner wall of the casing 3-102. Based on this structural design, the bonding result of the driving magnet can be greatly improved, and the mechanical strength can be enhanced.

Furthermore, the casing 3-102 has a first corner 3-CR1, the driving magnet (the second magnet 3-M12) has a second corner 3-CR2, the top wall 3-102T is connected to the side wall 3-102SW via the first corner 3-CR1, and the second corner 3-CR2 bends in the same direction as the first corner 3-CR1. The curvature of the first corner 3-CR1 is different from the curvature of the second corner 3-CR2. For example, the curvature of the first corner 3-CR1 is greater than the curvature of the second corner 3-CR2, but it is not limited thereto.

The curvature of the first corner 3-CR1 and the curvature of the second corner 3-CR2 are for different requirements. For example, in order to make the casing 3-102 have a stronger mechanical strength, the first corner 3-CR1 may have a larger curvature. In contrast, for the purpose of miniaturization, the second corner 3-CR2 of the driving magnet has a smaller curvature, so that miniaturization can be achieved and the mechanical strength can be improved at the same time.

In this embodiment, when viewed in the main axis 3-AX, the first corner 3-CR1 overlaps the second corner 3-CR2. In addition, the second magnet 3-M12 also has a contact surface 3-MS12, the contact surface 3-MS12 faces the bottom surface 3-102BS of the top wall 3-102T, and the contact surface 3-MS12 is connected to the second corner 3-CR2 and contacts the positioning structure 3-1025B.

The contact surface 3-MS12 does not directly contact the bottom surface 3-102BS, the shortest distance between the side wall 3-102SW and the driving magnet (the second magnet 3-M12) is less than the shortest distance between the driving magnet (the second magnet 3-M12) and the bottom surface 3-102BS, and the shortest distance between the side wall 3-102SW and the positioning structure 3-1025B is greater than the shortest distance between the driving magnet (the second magnet 3-M12) and the bottom surface 3-102BS.

It should be noted that the first magnet 3-M11 and the positioning structure 3-1025A are symmetrical to the second magnet 3-M12 and the positioning structure 3-1025B, so that the connection manner and structure of the first magnet 3-M11 and the positioning structure 3-1025A are omitted herein.

Figure 28:
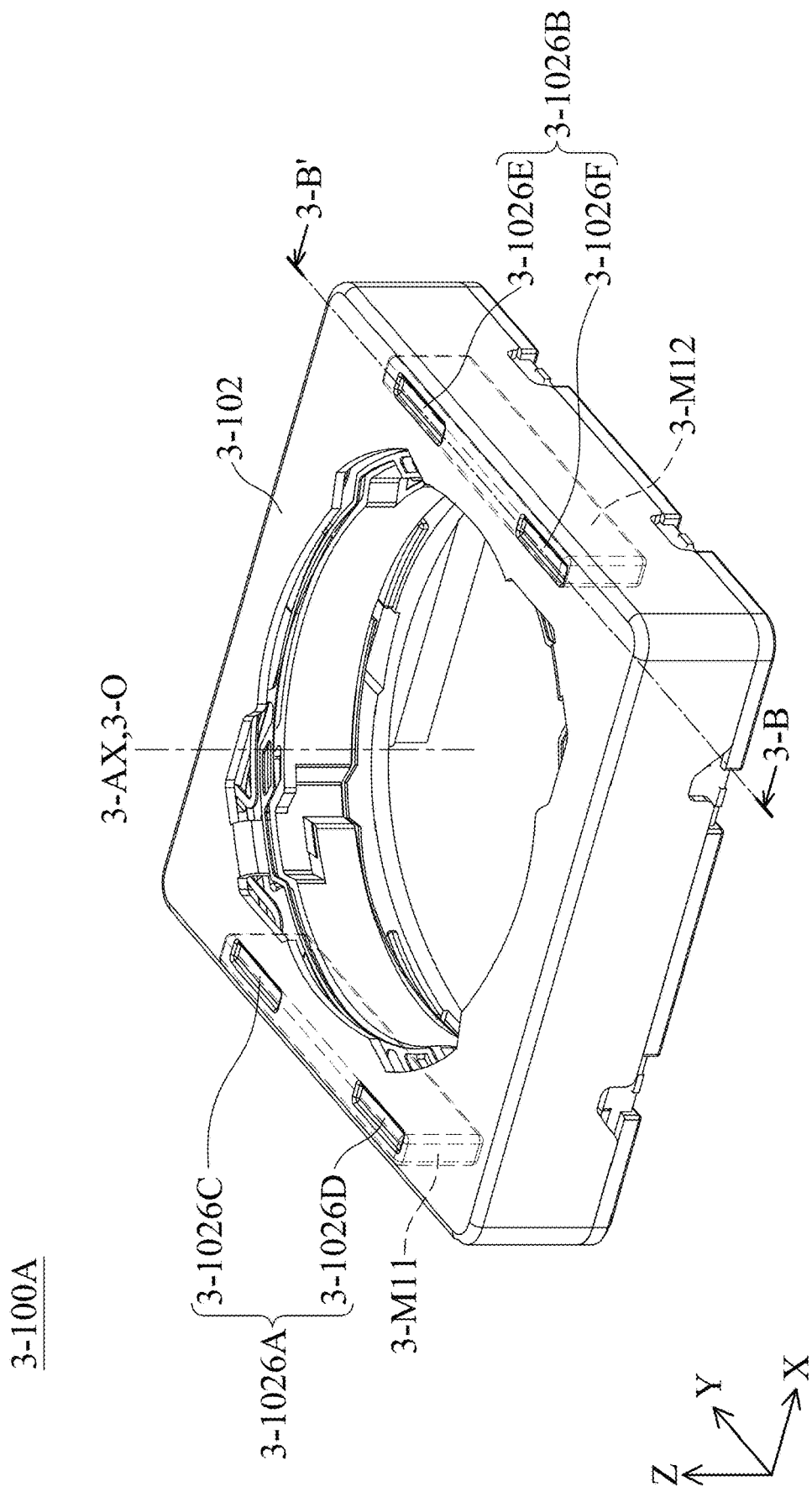
FIG. 28 is a perspective diagram of an optical element driving mechanism 3-100A according to another embodiment of the present disclosure.
Figure 29:
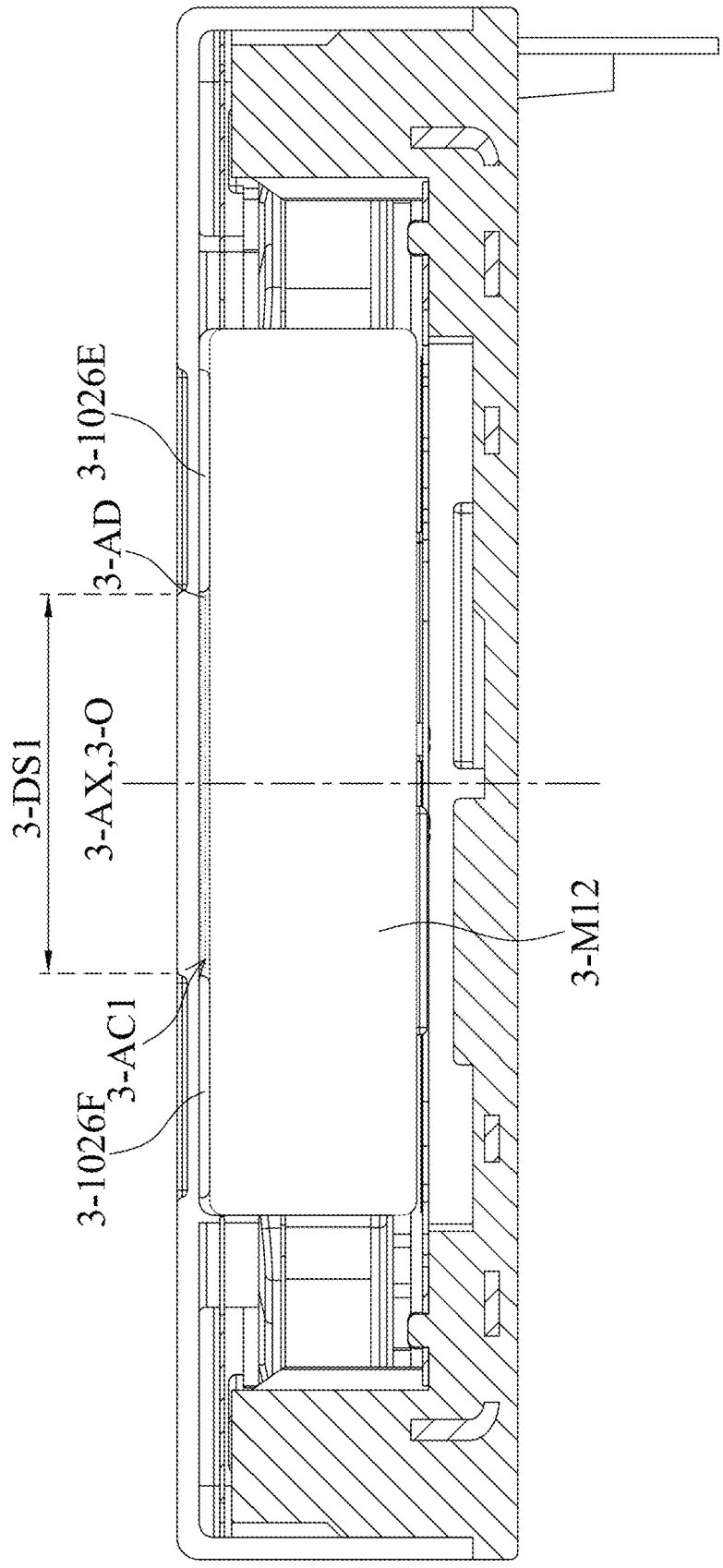
FIG. 29 is a cross-sectional view of the optical element driving mechanism 3-100A along the line 3-B-3-B' in FIG. 28 according to another embodiment of the present disclosure.

Please refer to FIG. 28 and FIG. 29. FIG. 28 is a perspective diagram of an optical element driving mechanism 3-100A according to another embodiment of the present disclosure, and FIG. 29 is a cross-sectional view of the optical element driving mechanism 3-100A along the line 3-B-3-B' in FIG. 28 according to another embodiment of the present disclosure. In this embodiment, two positioning structures 3-1026A and 3-1026B are provided, and each positioning structure may have at least two convex portions. Specifically, the positioning structure 3-1026A includes a convex portion 3-1026C and a convex portion 3-1026D, and the positioning structure 3-1026B includes a convex portion 3-1026E and a convex portion 3-1026F.

The convex portion 3-1026C and the convex portion 3-1026D are arranged in the first direction (the Y-axis) perpendicular to the optical axis 3-O, and the convex portion 3-1026E and the convex portion 3-1026F are also arranged in the first direction. The first magnet 3-M11 is affixed to the convex portion 3-1026C and the convex portion 3-1026D, and the second magnet 3-M12 is affixed to the convex portion 3-1026E and the convex portion 3-1026F.

When viewed in the main axis 3-AX, each convex portion may substantially have a rectangular structure, and there is a distance 3-DS1 (FIG. 29) between the convex portion 3-1026E and the convex portion 3-1026F in the first direction (the Y-axis), and the distance 3-DS1 is greater than zero.

In addition, as shown in FIG. 29, the convex portion 3-1026E, the convex portion 3-1026F, the casing 3-102 and the second magnet 3-M12 can form an accommodating space 3-AC1, and the accommodating space 3-AC1 can be used to accommodate the adhesive element 3-AD. Based on the design of the positioning structures of this embodiment, the contact area of the adhesive element 3-AD for contacting the driving magnet and the casing 3-102 can be further increased, thereby increasing the strength of the connection between the driving magnets and the casing 3-102.

Figure 30:
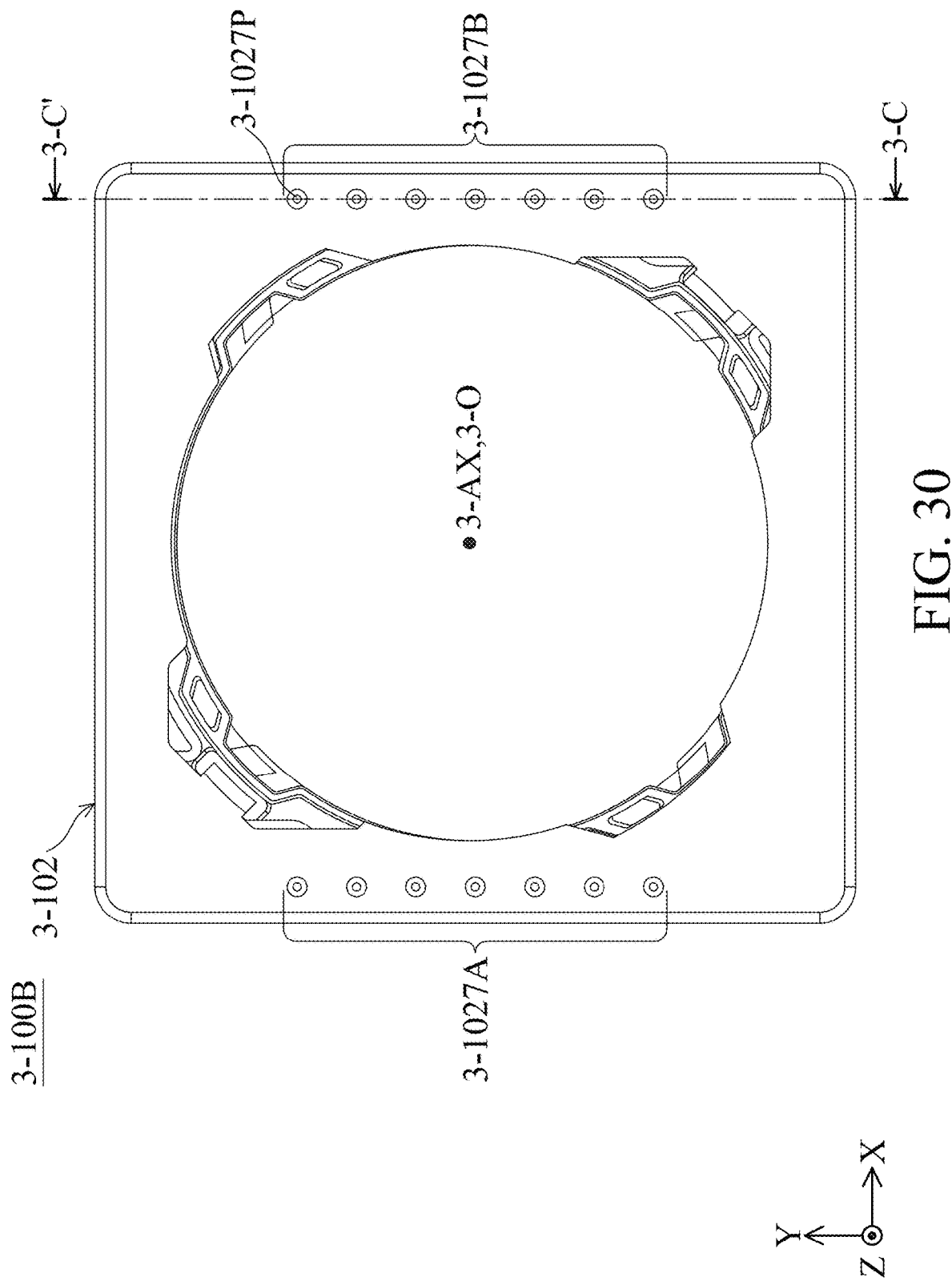
FIG. 30 is a top view of an optical element driving mechanism 3-100B according to another embodiment of the present disclosure.
Figure 31:
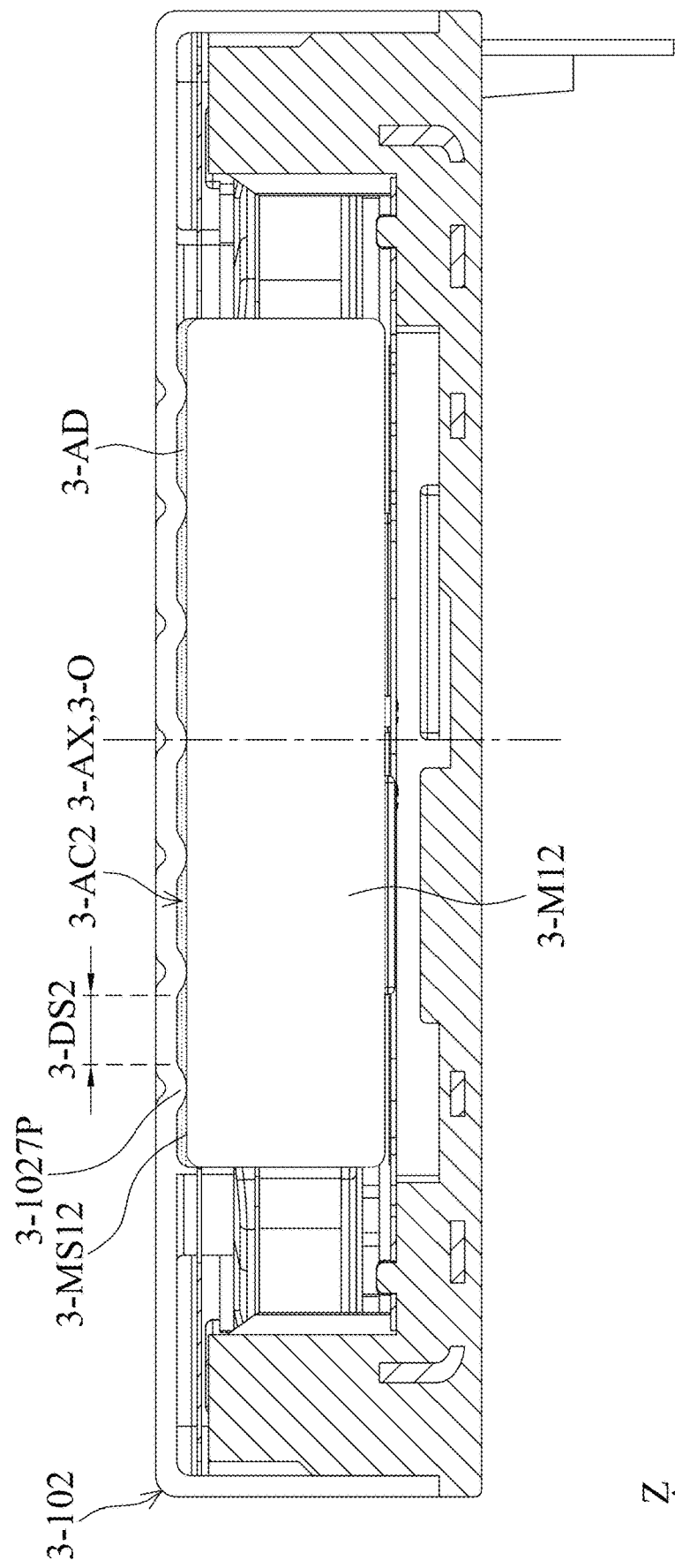
FIG. 31 is a cross-sectional view of the optical element driving mechanism 3-100B along the line 3-C-3-C' in FIG. 30 according to another embodiment of the present disclosure.

Please refer to FIG. 30 and FIG. 31. FIG. 30 is a top view of an optical element driving mechanism 3-100B according to another embodiment of the present disclosure, and FIG. 31 is a cross-sectional view of the optical element driving mechanism 3-100B along the line 3-C-3-C' in FIG. 30 according to another embodiment of the present disclosure. In this embodiment, positioning structures 3-1027A and 3-1027B are provided, and each positioning structure may have a plurality of convex portions 3-1027P arranged in the first direction. When viewed in the main axis 3-AX, each convex portion 3-1027 has a circular structure.

In addition, as shown in FIG. 31, when viewed in the second direction (the X-axis), the convex portion 3-1027P has a semicircular structure, a spacing 3-DS2 is between two adjacent convex portions 3-1027P, and the spacing 3-DS2 is greater than or equal to zero. The contact surface 3-MS12 of the second magnet 3-M12 is in contact with the plurality of convex portions 3-1027P, and a plurality of accommodation spaces 3-AC2 are formed between the second magnet 3-M12 and the plurality of convex portions 3-1027P for accommodating the adhesive element 3-AD.

Based on the design of the positioning structure of this embodiment, the adhesive area can be increased, and positioning can be more accurate by multiple contact points, so that the connection strength between the driving magnet and the casing 3-102 can be further increased.

The present disclosure provides an optical element driving mechanism, and one or more positioning structures can be formed on the casing 3-102 of the optical element driving mechanism, so that the driving magnet can be positioned on the inner wall surface of the casing 3-102 by the positioning structure directly. In some embodiments, the positioning structure may have a long-strip shaped convex portion, a rectangular structure or a circular structure, and the positioning structures are arranged in the first direction. The driving magnet is directly in contact with the corresponding positioning structure, and the adhesive element 3-AD is disposed between the driving magnet and the positioning structure, so that the driving magnet is affixed to the casing 3-102.

Based on the structural design of the present disclosure, the driving magnet can directly contact and be positioned on the casing 3-102, so that the connection strength between the driving magnet and the casing 3-102 can be increased, and the problem of the driving magnet detaching from the casing 3-102 due to impact can be avoided.

The Fourth Embodiment Group

Figure 32:
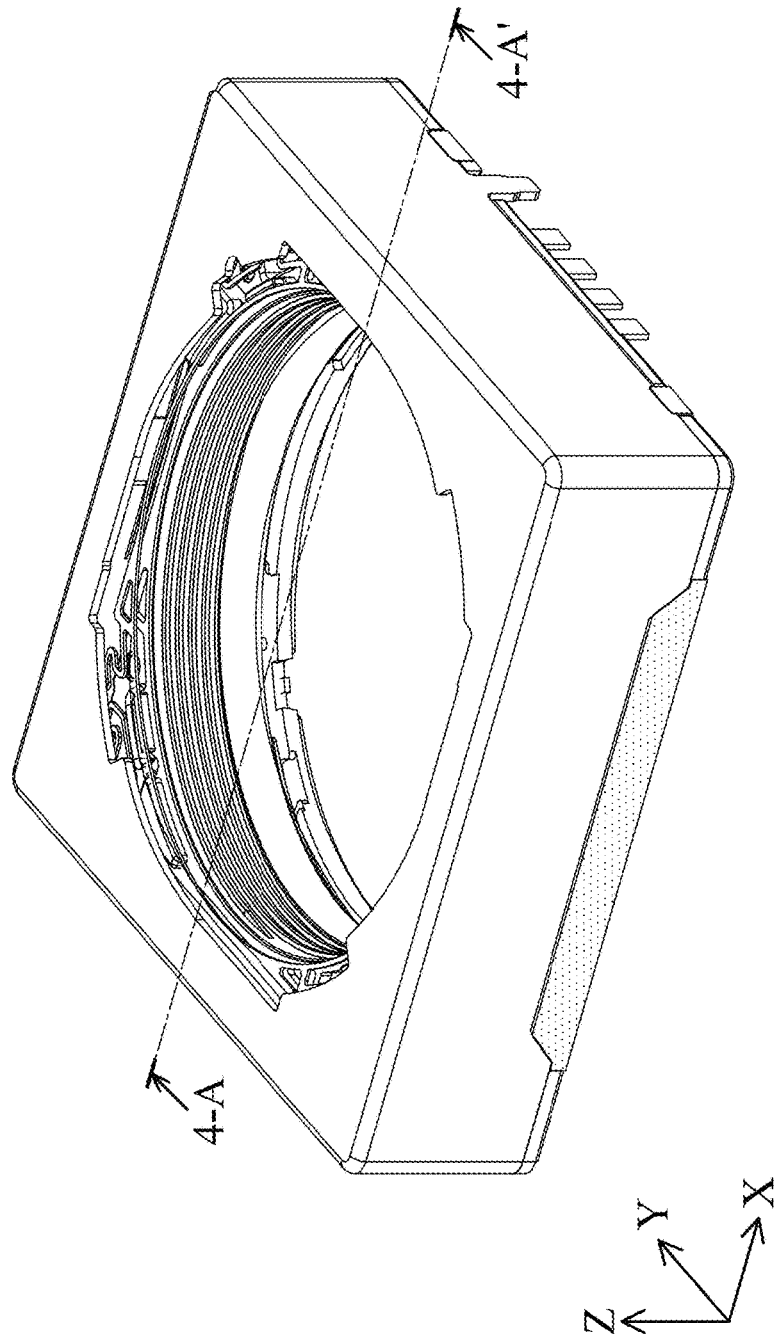
FIG. 32 is a schematic diagram of an optical element driving mechanism 4-100 according to an embodiment of the present disclosure.
Figure 33:
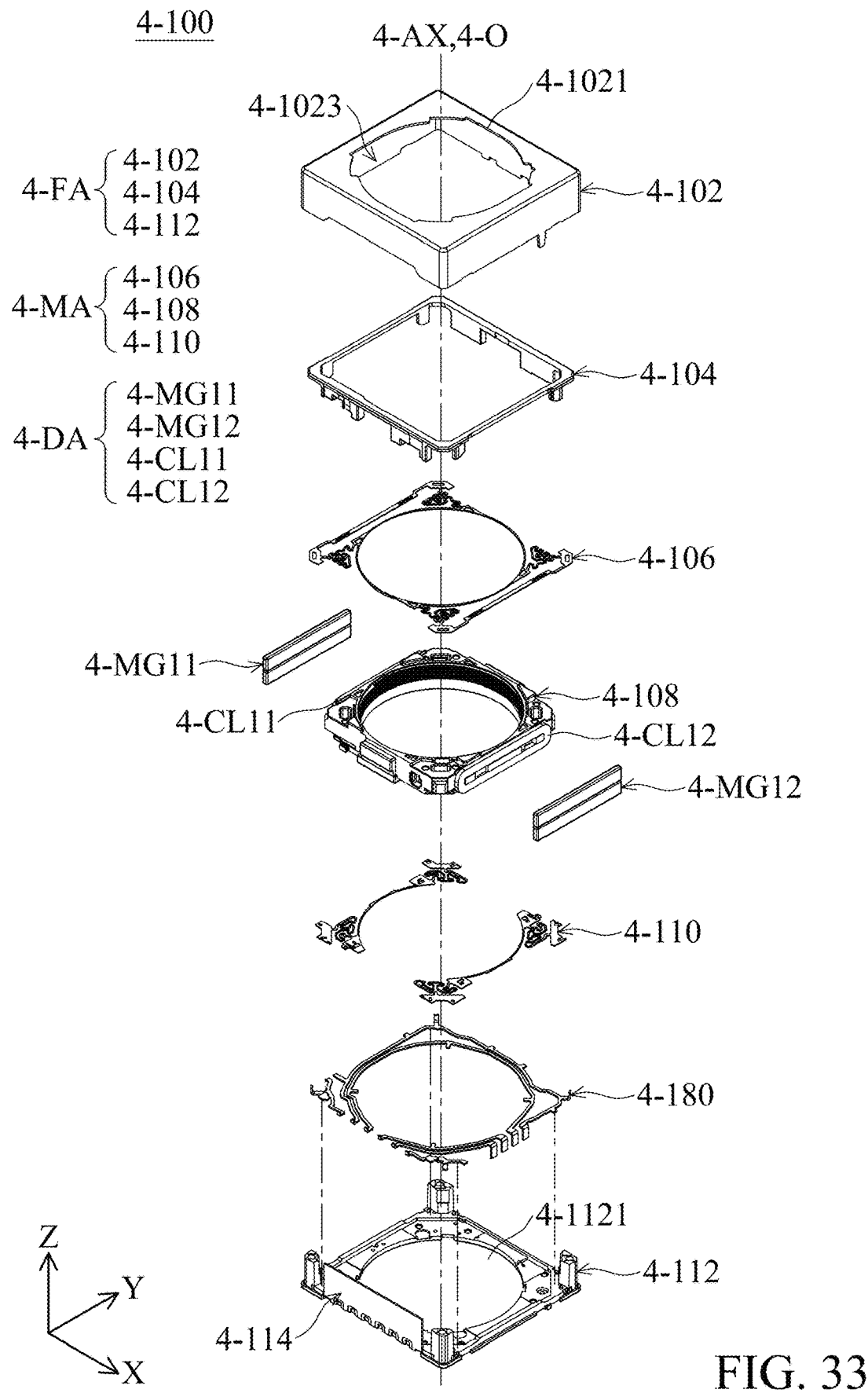
FIG. 33 is an exploded diagram of the optical element driving mechanism 4-100 according to an embodiment of the present disclosure.
Figure 34:
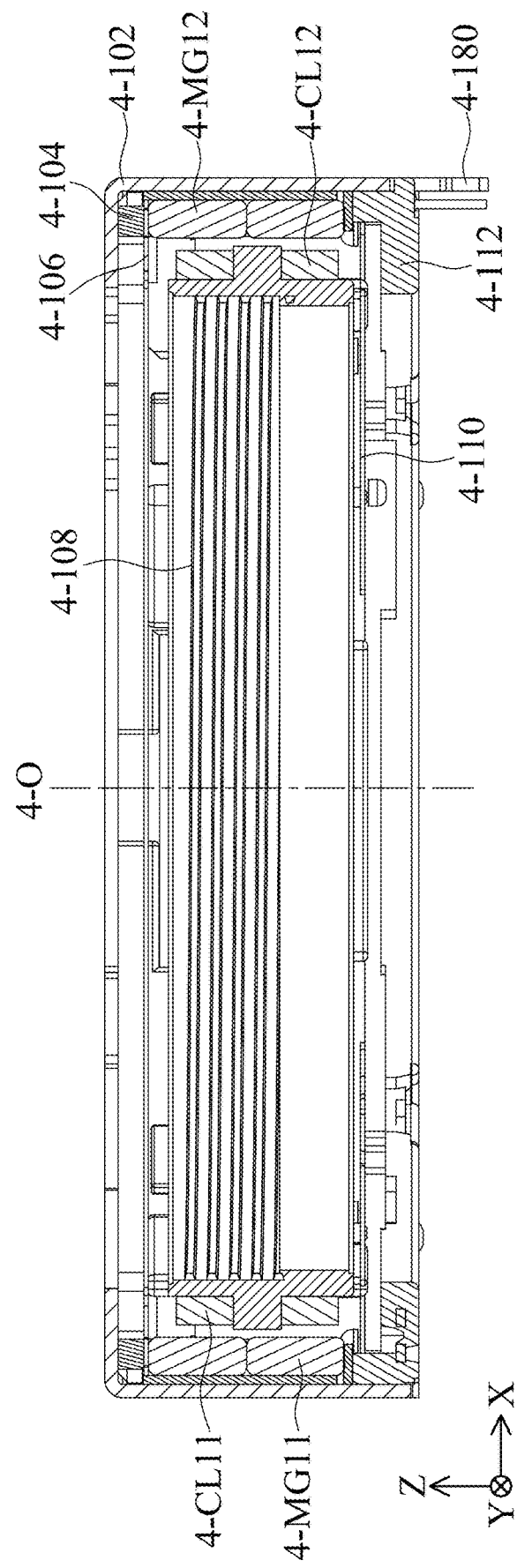
FIG. 34 is a cross-sectional view of the optical element driving mechanism 4-100 along line 4-A-4-A' in FIG. 32 according to an embodiment of the present disclosure.

Please refer to FIG. 32 to FIG. 34. FIG. 32 is a schematic diagram of an optical element driving mechanism 4-100 according to an embodiment of the present disclosure. FIG. 33 is an exploded diagram of the optical element driving mechanism 4-100 according to an embodiment of the present disclosure, and FIG. 34 is a cross-sectional view of the optical element driving mechanism 4-100 along line 4-A-4-A' in FIG. 34 according to an embodiment of the present disclosure. The optical element driving mechanism 4-100 can be an optical camera module configured to hold an optical element. The optical element driving mechanism 4-100 can be installed in various electronic devices or portable electronic devices, such as a smartphone, for allowing a user to perform the image capturing function. In this embodiment, the optical element driving mechanism 4-100 can be a voice coil motor (VCM) with an auto-focusing (AF) function, but it is not limited thereto. In other embodiments, the optical element driving mechanism 4-100 can also perform the functions of auto-focusing and optical image stabilization (OIS).

In the present embodiment, the optical element driving mechanism 4-100 can include a fixed assembly 4-FA, a movable assembly 4-MA, and a driving assembly 4-DA. The movable assembly 4-MA is movably connected to the fixed assembly 4-FA, and the movable assembly 4-MA is configured to hold the optical element (not shown in the figures). The driving assembly 4-DA is configured to drive the movable assembly 4-MA to move relative to the fixed assembly 4-FA.

In this embodiment, as shown in FIG. 33, the fixed assembly 4-FA includes a casing 4-102, a frame 4-104 and a base 4-112. The movable assembly 4-MA includes a lens holder 4-108 and the aforementioned optical element, and the lens holder 4-108 is configured to hold the optical element. A main axis 4-AX can be defined by the fixed assembly 4-FA, and an optical axis 4-O can be defined by the optical element. The main axis 4-AX may, for example, overlap the optical axis 4-O, but it is not limited thereto.

As shown in FIG. 33, the casing 4-102 has a hollow structure, and a casing opening 4-1021 is formed thereon, and a base opening 4-1121 is formed on the base 4-112. The center of the casing opening 4-1021 corresponds to the optical axis 4-O of the optical element, and the base opening 4-1121 corresponds to a photosensitive element (not shown) disposed under the base 4-112. The external light can enter the casing 4-102 from the casing opening 4-1021 to be received by the photosensitive element after passing through the optical element and the base opening 4-1121 so as to generate a digital image signal.

Furthermore, the casing 4-102 is disposed on the base 4-112 and may have an accommodating space 4-1023 is configured to accommodate the movable assembly 4-MA (including the aforementioned optical element and the lens holder 4-108) and the driving assembly 4-DA. The frame 4-104 is fixed to the casing 4-102 and disposed in the accommodating space 4-1023.

The movable assembly 4-MA may further include a first elastic member 4-106 and a second elastic member 4-110. The outer portion (the outer ring portion) of the first elastic member 4-106 is fixed to the frame 4-104, the outer portion (the outer ring portion) of the second elastic member 4-110 is fixed to the base 4-112, and the inner portions (the inner ring portions) of the first elastic member 4-106 and the second elastic member 4-110 are respectively connected to the upper and lower sides of the lens holder 4-108, so that the lens holder 4-108 can be suspended in the accommodating space 4-1023.

In this embodiment, the driving assembly 4-DA may include a first magnet 4-MG11, a second magnet 4-MG12, a first coil 4-CL11 and a second coil 4-CL12. The first coil 4-CL11 and the second coil 4-CL12 are disposed on the lens holder 4-108, and the first magnet 4-MG11 and the second magnet 4-MG12 are disposed on the inner wall surface of the casing 4-102 and respectively corresponding to the first coil 4-CL11 and the second coil 4-CL12.

In this embodiment, the first coil 4-CL11 and the second coil 4-CL12 may be wound coils (oval coil) and be disposed on opposite sides of the lens holder 4-108. When the first coil 4-CL11 and the second coil 4-CL12 are provided with electricity, the first coil 4-CL11 and the second coil 4-CL12 respectively act with the first magnet 4-MG11 and the second magnet 4-MG12 to generate an electromagnetic force, so as to drive the lens holder 4-108 and the held optical element to move relative to the base 4-112 along the optical axis 4-O (the Z-axis).

Furthermore, the optical element driving mechanism 4-100 of the present disclosure further includes a circuit assembly 4-114 and a circuit member 4-180 configured to be electrically connected to the driving assembly 4-DA. The circuit assembly 4-114 may be a circuit board configured to be electrically connected to an external circuit, such as a main circuit board of an external electronic device, so that the driving assembly 4-DA can operate according to the signal of the external electronic device.

Furthermore, in this embodiment, the circuit member 4-180 is disposed inside the base 4-112. For example, the base 4-112 is made of plastic material, and the circuit member 4-180 is formed in the base 4-112 by the molded interconnect device (MID) technology.

As shown in FIG. 34, in this embodiment, the first coil 4-CL11 and the second coil 4-CL12 are disposed on the lens holder 4-108 of the movable assembly 4-MA, and the first magnet 4-MG11 (the first magnetic element) and the second magnet 4-MG12 (the second magnetic element) are disposed on the inner wall surface of the casing 4-102 of the fixed assembly 4-FA. However, in other embodiments, the positions of the aforementioned coils and magnets can be interchanged.

Figure 35:
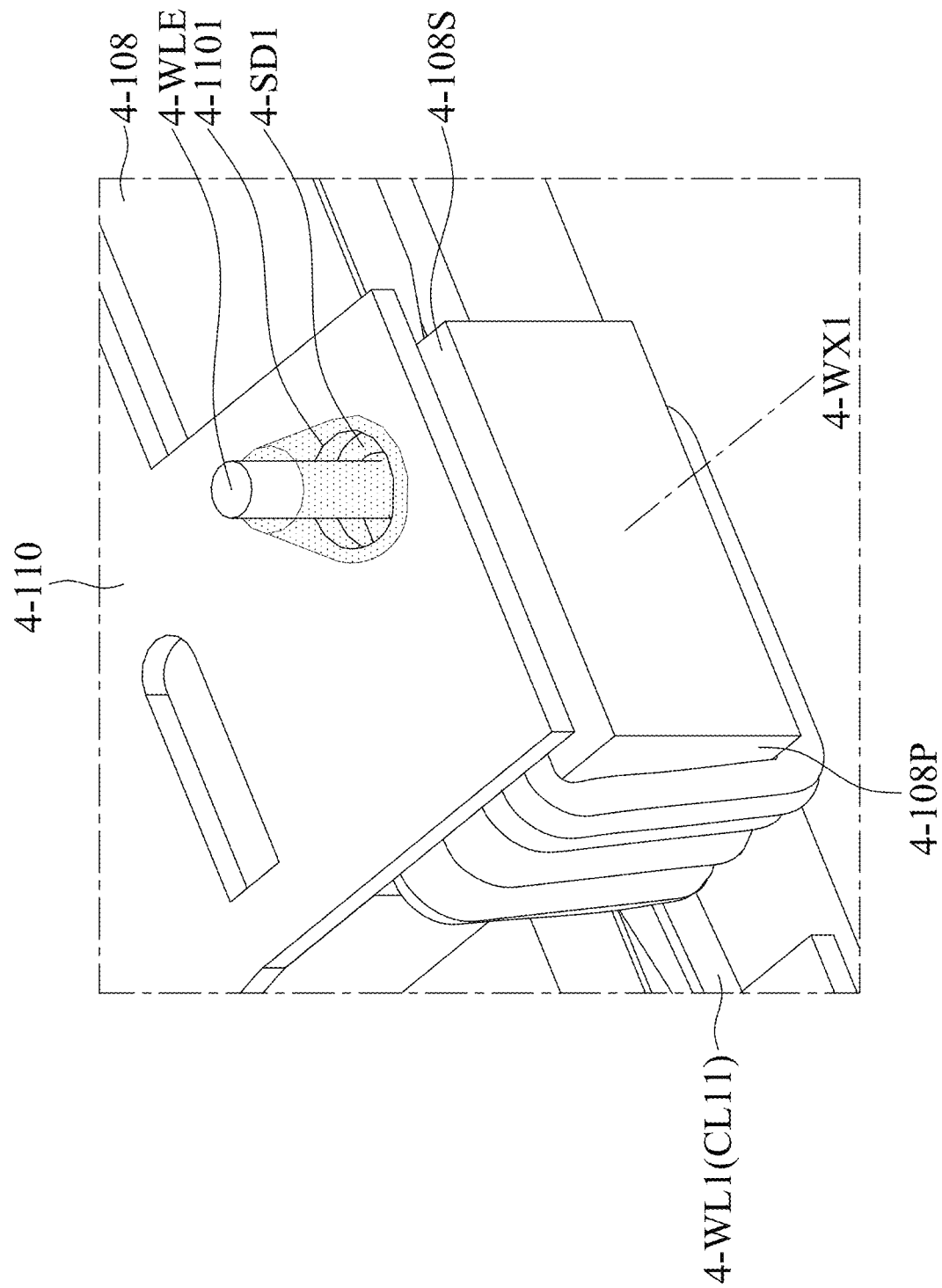
FIG. 35 is a schematic diagram of a partial structure of the lens holder 4-108 and the second elastic member 4-110 according to an embodiment of the present disclosure.

Please refer to FIG. 35, which is a schematic diagram of a partial structure of the lens holder 4-108 and the second elastic member 4-110 according to an embodiment of the present disclosure. As shown in FIG. 35, the lens holder 4-108 has a winding column 4-108P (the winding structure), the driving coil (for example, the first coil 4-CL11) is disposed on the lens holder 4-108 and has a leading wire 4-WL1, the leading wire 4-WL1 is wound on the winding column 4-108P around a winding axis 4-WX1, and the winding axis 4-WX1 is perpendicular to the optical axis 4-O.

The winding column 4-108P has a surface 4-108S, and a wire end 4-WLE of the leading wire 4-WL1 extends from the surface 4-108S in a direction that is not parallel to the surface 4-108S. For example, as shown in FIG. 35, the wire end 4-WLE extends from the surface 4-108S and is perpendicular to the surface 4-108S.

As shown in FIG. 33 and FIG. 35, the second elastic member 4-110 extends along a direction that is perpendicular to the optical axis 4-O, for example, along the XY plane. The second elastic member 4-110 is connected to the lens holder 4-108 and has an opening 4-1101, and the wire end 4-WLE of the leading wire 4-WL1 passes through the opening 4-1101.

Figure 36:
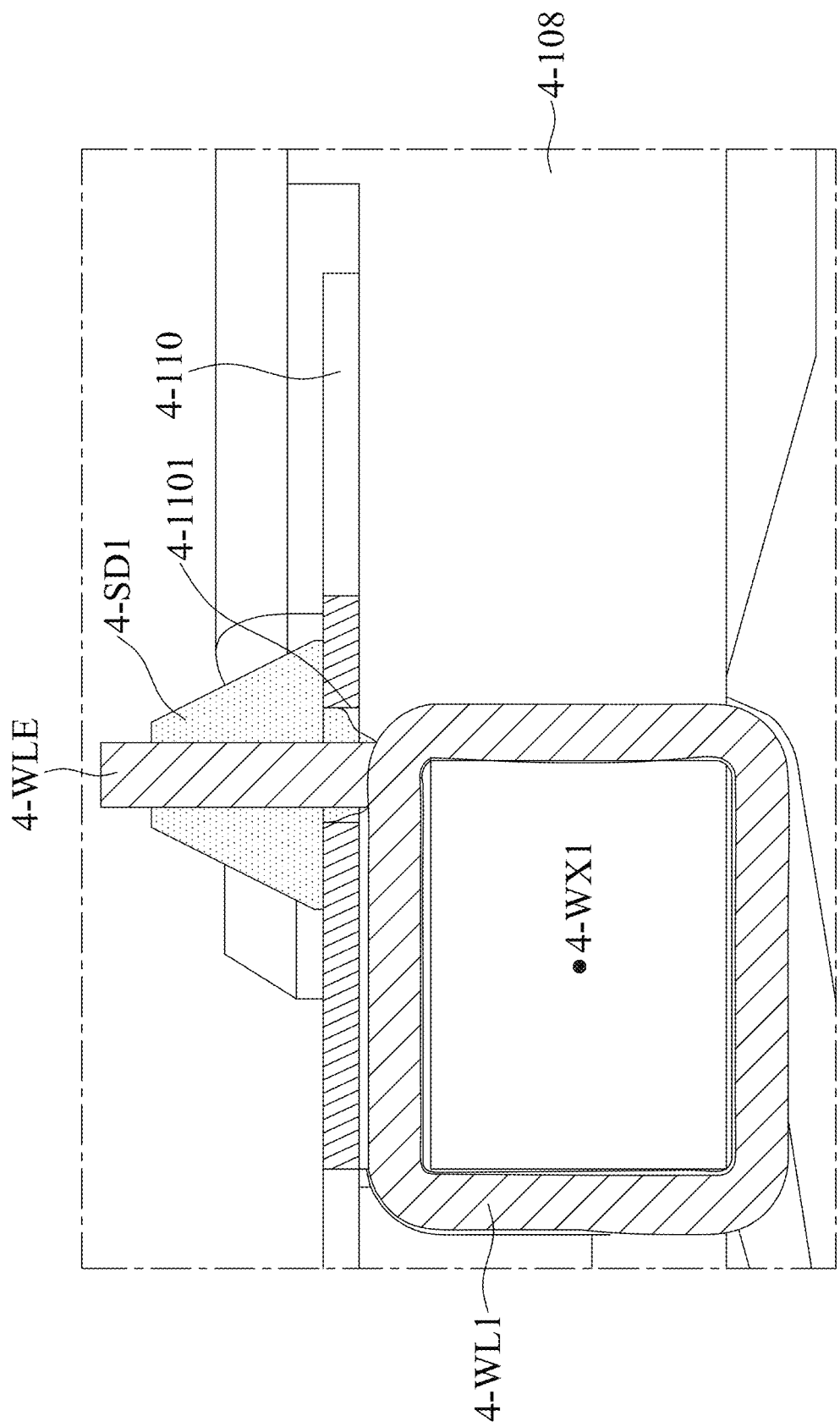
FIG. 36 is a cross-sectional view of the lens holder 4-108 and the second elastic member 4-110 along the winding axis 4-WX1 according to an embodiment of the present disclosure.

Furthermore, please refer to FIG. 35 and FIG. 36 at the same time. FIG. 36 is a cross-sectional view of the lens holder 4-108 and the second elastic member 4-110 along the winding axis 4-WX1 according to an embodiment of the present disclosure. As shown in the figures, the optical element driving mechanism 4-100 may further include an electrical connecting element 4-SD1, such as solder. The electrical connecting element 4-SD1 is configured to be connected to the wire end 4-WLE and the second elastic member 4-110, so that the leading wire 4-WL1 is electrically connected to the second elastic member 4-110. In this embodiment, the first elastic member 4-106 and the second elastic member 4-110 may be referred to as conductive elements.

In this embodiment, a portion of the wire end 4-WLE is exposed from the electrical connecting element 4-SD1, and the electrical connecting element 4-SD1 does not completely fill the opening 4-1101, but it is not limited thereto. In other embodiments, the electrical connecting element 4-SD1 can completely cover the wire end 4-WLE and/or fill the opening 4-1101 to increase the connection strength between the wire end 4-WLE and the second elastic member 4-110.

Figure 37:
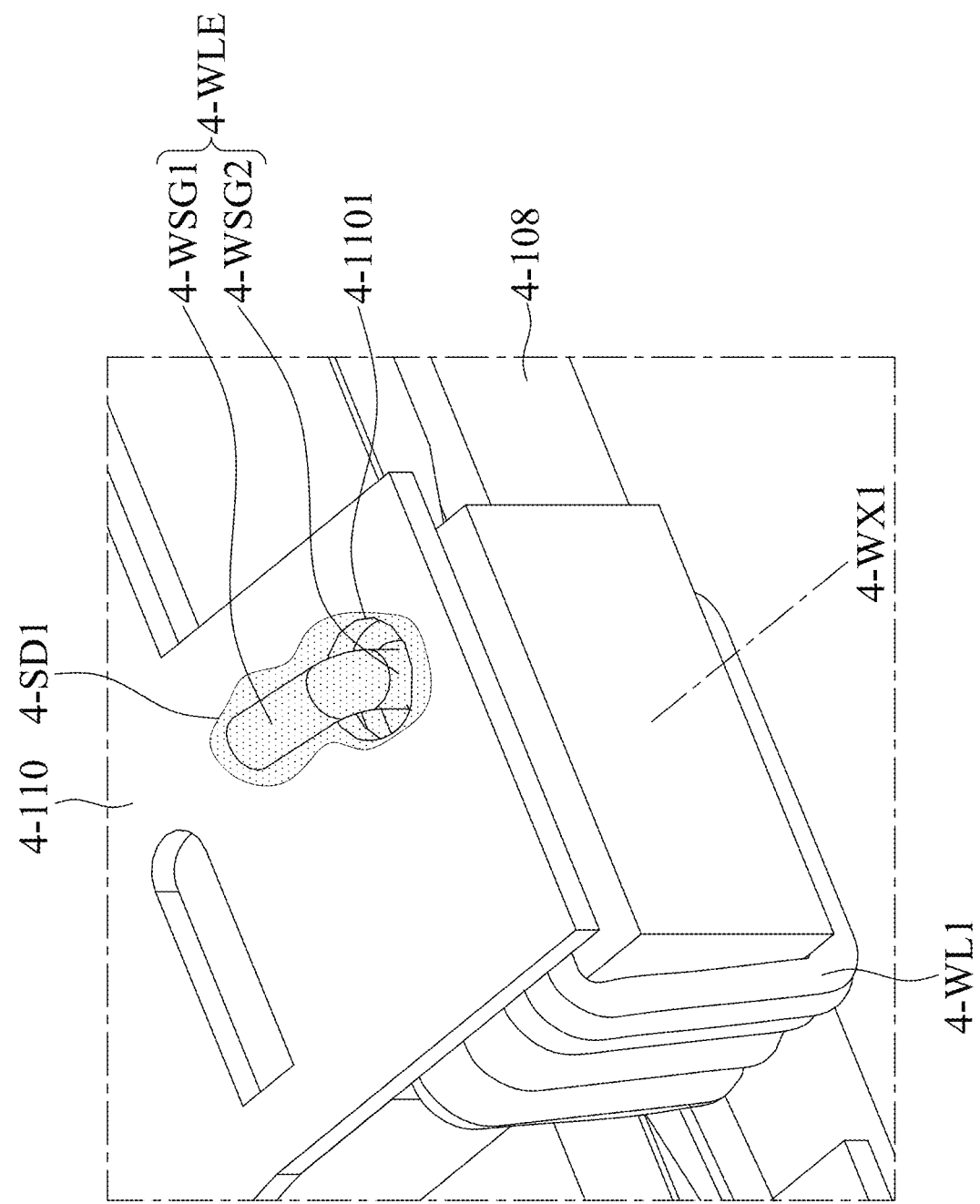
FIG. 37 is a perspective view of a partial structure of the lens holder 4-108 and the second elastic member 4-110 according to another embodiment of the present disclosure.
Figure 38:
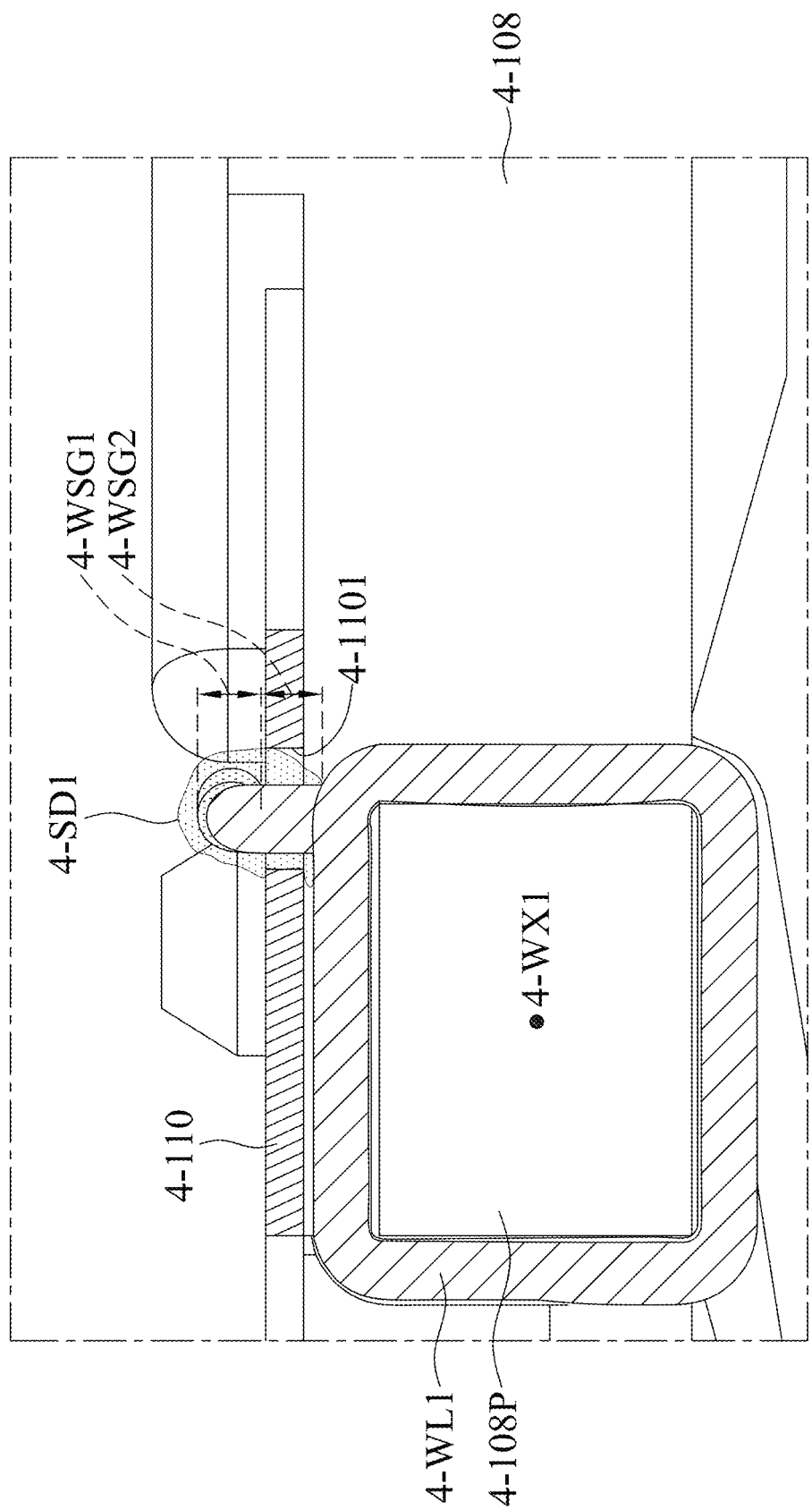
FIG. 38 is a cross-sectional view of the lens holder 4-108 and the second elastic member 4-110 when viewed along the winding axis 4-WX1 according to another embodiment of the present disclosure.

Please refer to FIG. 37 and FIG. 38. FIG. 37 is a perspective view of a partial structure of the lens holder 4-108 and the second elastic member 4-110 according to another embodiment of the present disclosure, and FIG. 38 is a cross-sectional view of the lens holder 4-108 and the second elastic member 4-110 when viewed along the winding axis 4-WX1 according to another embodiment of the present disclosure. In this embodiment, the wire end 4-WLE has a first end portion 4-WSG1 and a second end portion 4-WSG2, and the first end portion 4-WSG1 and the second end portion 4-WSG2 extend in different directions.

As shown in FIG. 38, when viewed along the winding axis 4-WX1, the second elastic member 4-110 (the conductive element) overlaps at least a portion of the second end portion 4-WSG2, and the second elastic member 4-110 (the conductive element) does not overlap the first end portion 4-WSG1. Furthermore, in this embodiment, the electrical connecting element 4-SD1 completely covers the wire end 4-WLE, and at least a portion of the electrical connecting element 4-SD1 is located between the first end portion 4-WSG1 and the second elastic member 4-110 (the conductive element).

Specifically, at least a portion of the electrical connecting element 4-SD1 is located in the opening 4-1101, and the electrical connecting element 4-SD1 may partially occupy the opening 4-1101 or completely fill the opening 4-1101. In addition, in other embodiments, a portion of the electrical connecting element 4-SD1 may be disposed between the leading wire 4-WL1 which is wound on the winding column 4-108P and the second elastic member 4-110 to increase the connection strength between the leading wire 4-WL1 and the second elastic member 4-110.

Figure 39:
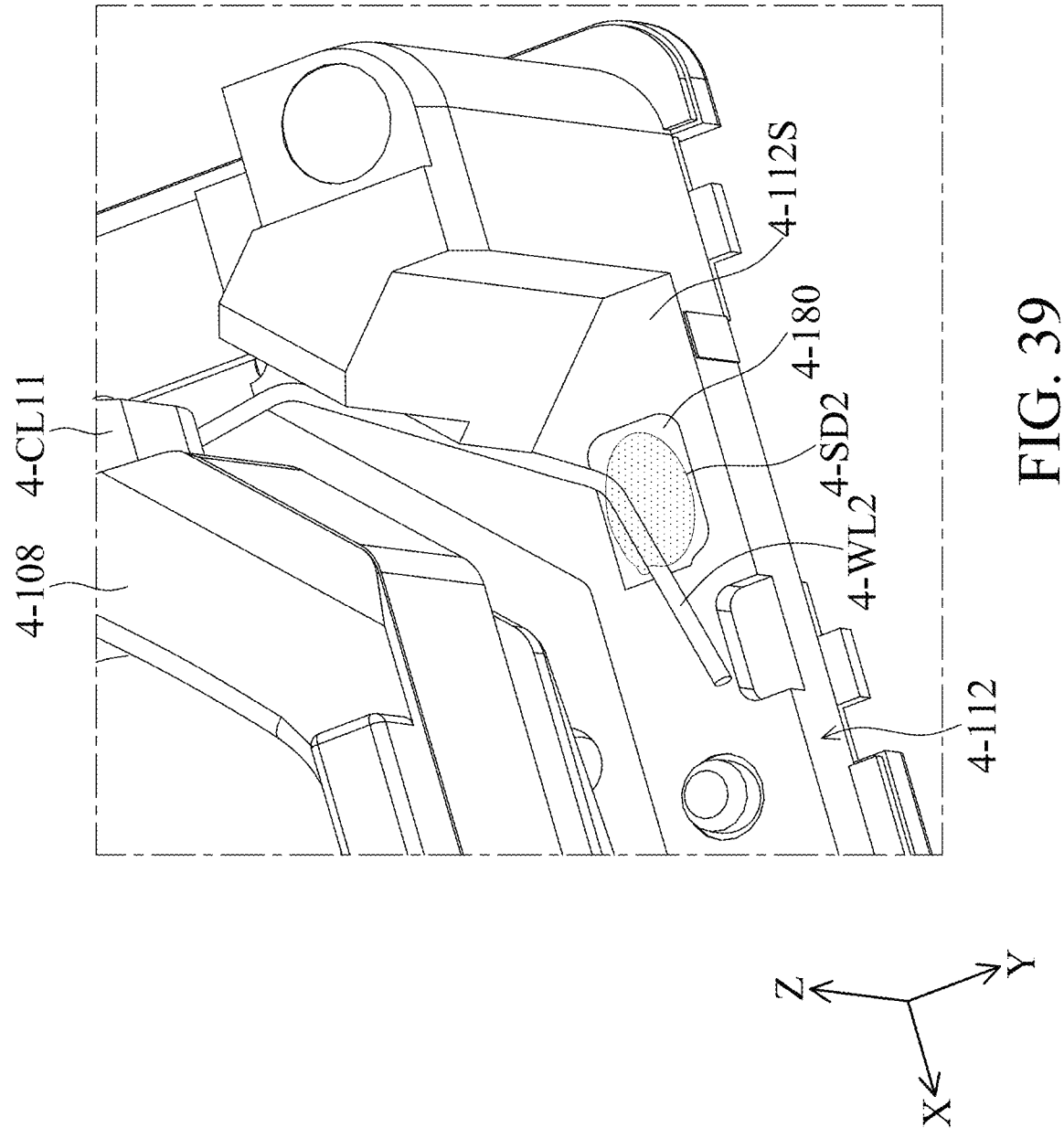
FIG. 39 is a perspective view of a partial structure of the optical element driving mechanism 4-100 according to another embodiment of the present disclosure.

Please refer to FIG. 39, which is a perspective view of a partial structure of the optical element driving mechanism 4-100 according to another embodiment of the present disclosure. As shown in FIG. 39, a portion of the circuit member 4-180 is disposed in the base 4-112, the first coil 4-CL11 (the driving coil) is disposed on the lens holder 4-108 of the movable assembly 4-MA and has a leading wire 4-WL2, and the leading wire 4-WL2 is connected to the circuit member 4-180 by an electrical connecting element 4-SD2.

In addition, the base 4-112 has a top surface 4-112S, a portion of the circuit member 4-180 is exposed from the base 4-112, and the exposed portion of the circuit member 4-180 is substantially aligned with the top surface 4-112S (in the Z-axis), but it is not limited thereto. Therefore, the leading wire 4-WL2 can be smoothly disposed on the top surface 4-112S and the exposed circuit member 4-180, thereby avoiding the problem of breaking of the leading wire 4-WL2.

Figure 40:
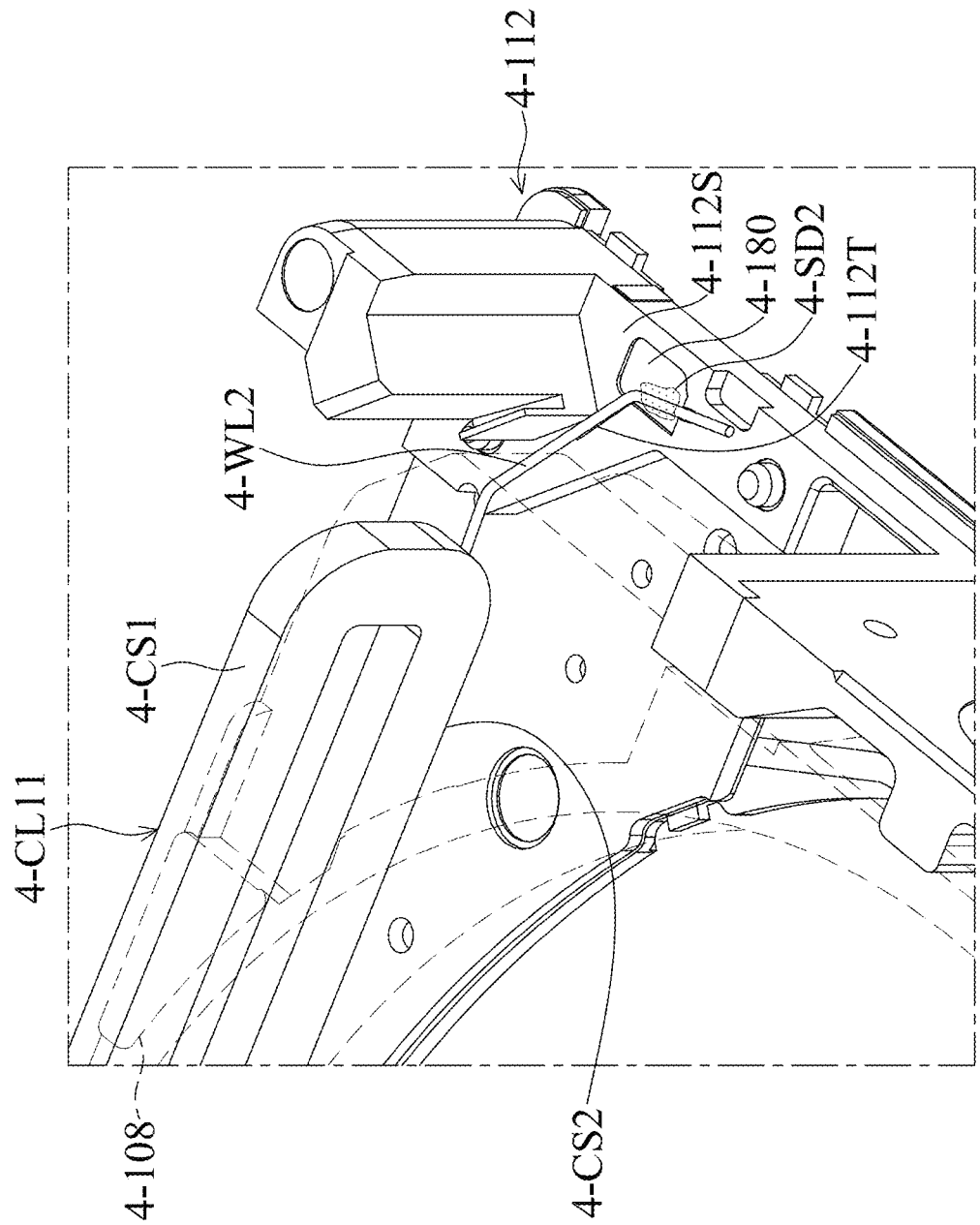
FIG. 40 is a partial structural diagram of the optical element driving mechanism 4-100 according to another embodiment of the present disclosure.

Please refer to FIG. 40, which is a partial structural diagram of the optical element driving mechanism 4-100 according to another embodiment of the present disclosure. In this embodiment, a guiding groove 4-112T is formed on the base 4-112. The guiding groove 4-112T is configured to guide the leading wire 4-WL2 to extend to the circuit member 4-180 to increase assembly accuracy. Specifically, the guiding groove 4-112T extends in a direction that is perpendicular to the optical axis 4-O, for example, in a direction on the XY plane.

In this embodiment, the first coil 4-CL11 (the driving coil) has a first side 4-CS1 and a second side 4-CS2, the first side 4-CS1 faces the casing 4-102, the second side 4-CS2 faces the base 4-112, and the leading wire 4-WL2 extends from the second side 4-CS2.

Figure 41:
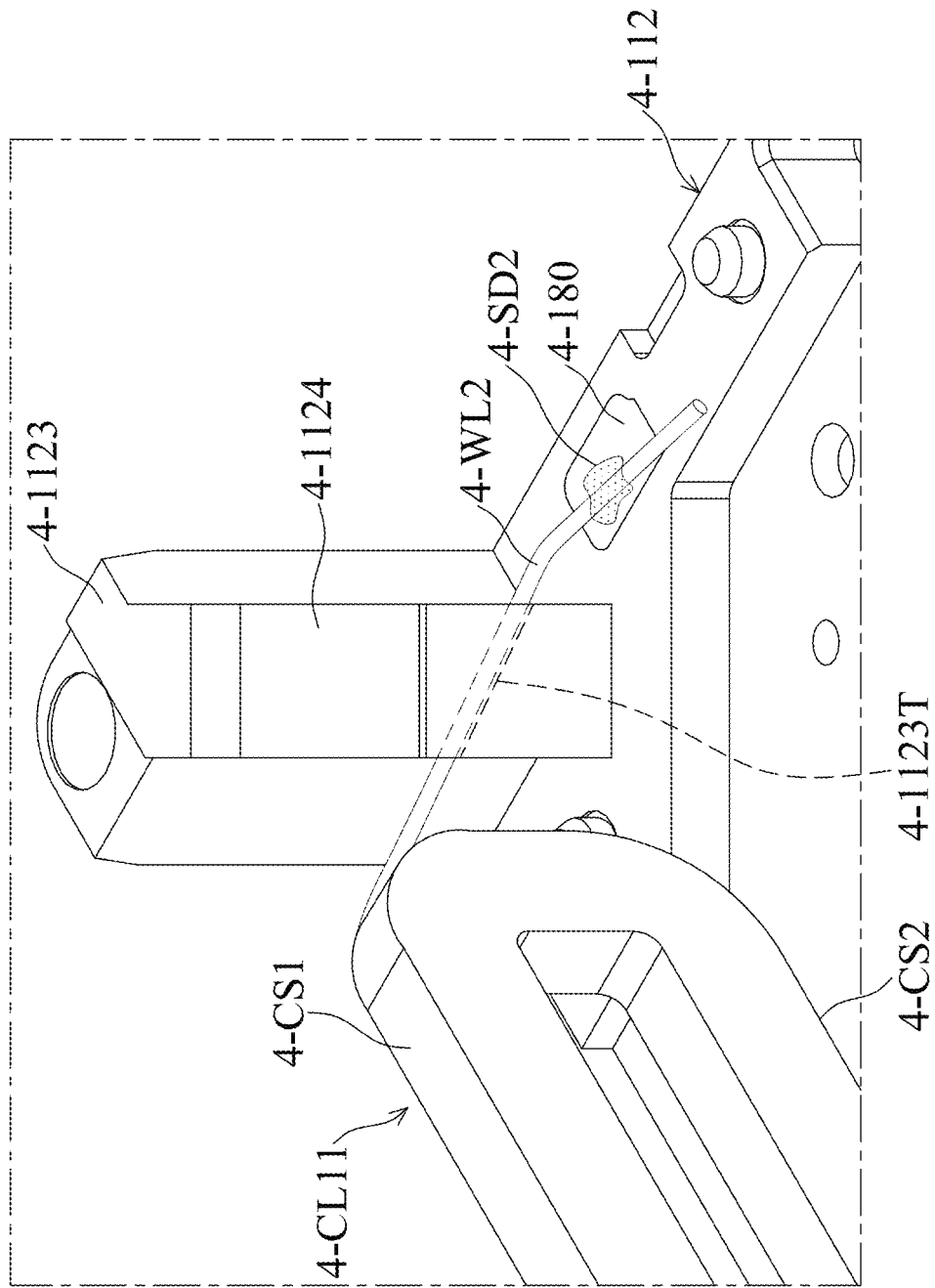
FIG. 41 is a partial structural diagram of the optical element driving mechanism 4-100 according to another embodiment of the present disclosure.

Please refer to FIG. 41, which is a partial structural diagram of the optical element driving mechanism 4-100 according to another embodiment of the present disclosure. In this embodiment, a plurality of protruding columns 4-1123 and a guiding groove 4-1123T are formed on the base 4-112, and the guiding groove 4-1123T is disposed on one of the protruding columns 4-1123 and configured to guide the leading wire 4-WL2.

The protruding column 4-1123 has a side surface 4-1124 which is parallel to the optical axis 4-O and faces the lens holder 4-108. When viewed in a direction that is perpendicular to the side surface 4-1124, the guiding groove 4-1123T is neither perpendicular nor parallel to the optical axis 4-O (the Z-axis). In addition, in this embodiment, the leading wire 4-WL2 extends from the first side 4-CS1, so that the leading wire 4-WL2 can be guided to the circuit member 4-180 more smoothly.

Figure 42:
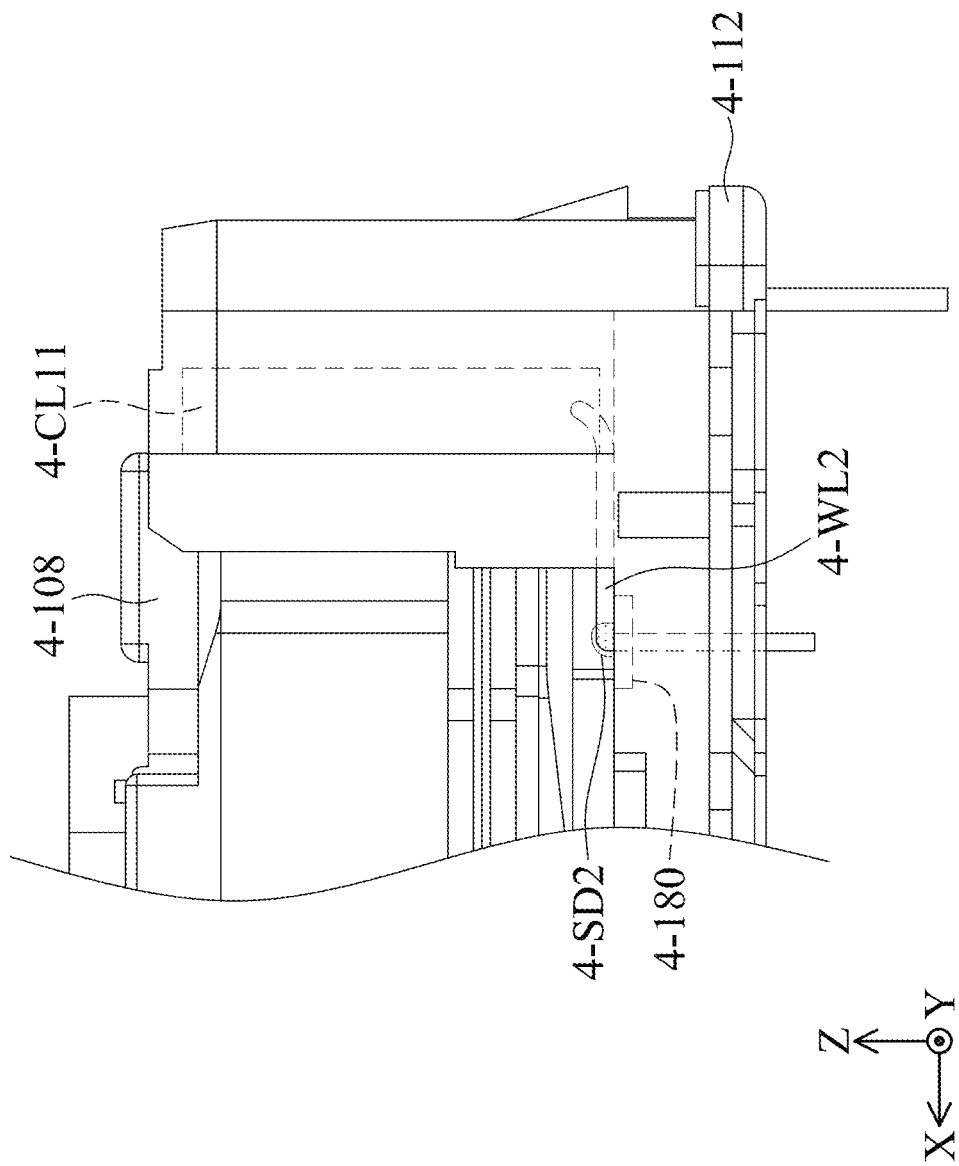
FIG. 42 is a side view of the optical element driving mechanism 4-100 according to another embodiment of the present disclosure.

Please refer to FIG. 42, which is a side view of the optical element driving mechanism 4-100 according to another embodiment of the present disclosure. In this embodiment, at least a portion of the circuit member 4-180 is disposed in the base 4-112, and the leading wire 4-WL2 passes through the circuit member 4-180 and the base 4-112. Based on this structural design, the problem of separation of leading wire 4-WL2 from the circuit member 4-180 can be avoided.

Figure 43:
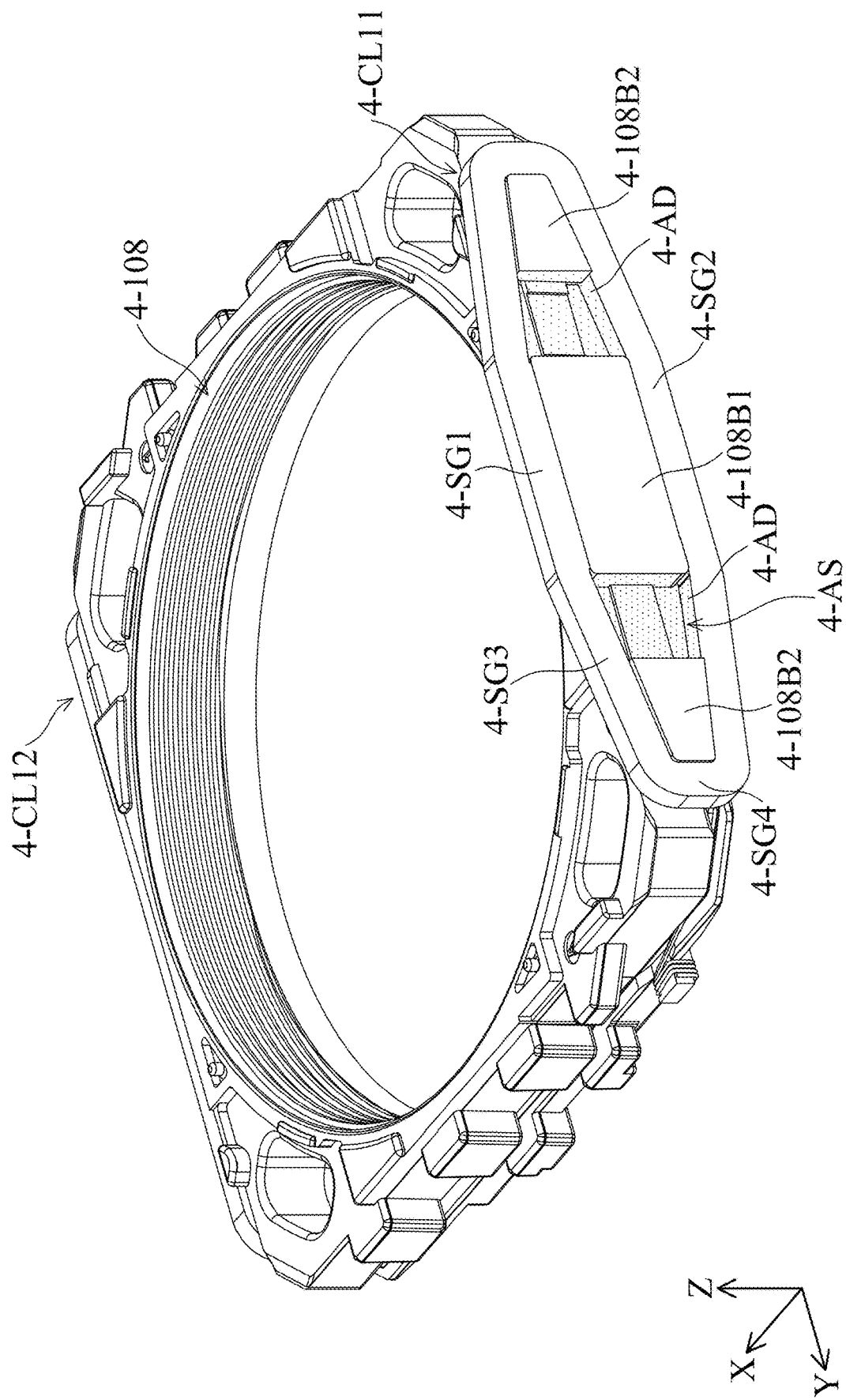
FIG. 43 is a perspective view of the lens holder 4-108 and the first coil 4-CL11 according to another embodiment of the present disclosure.
Figure 44:
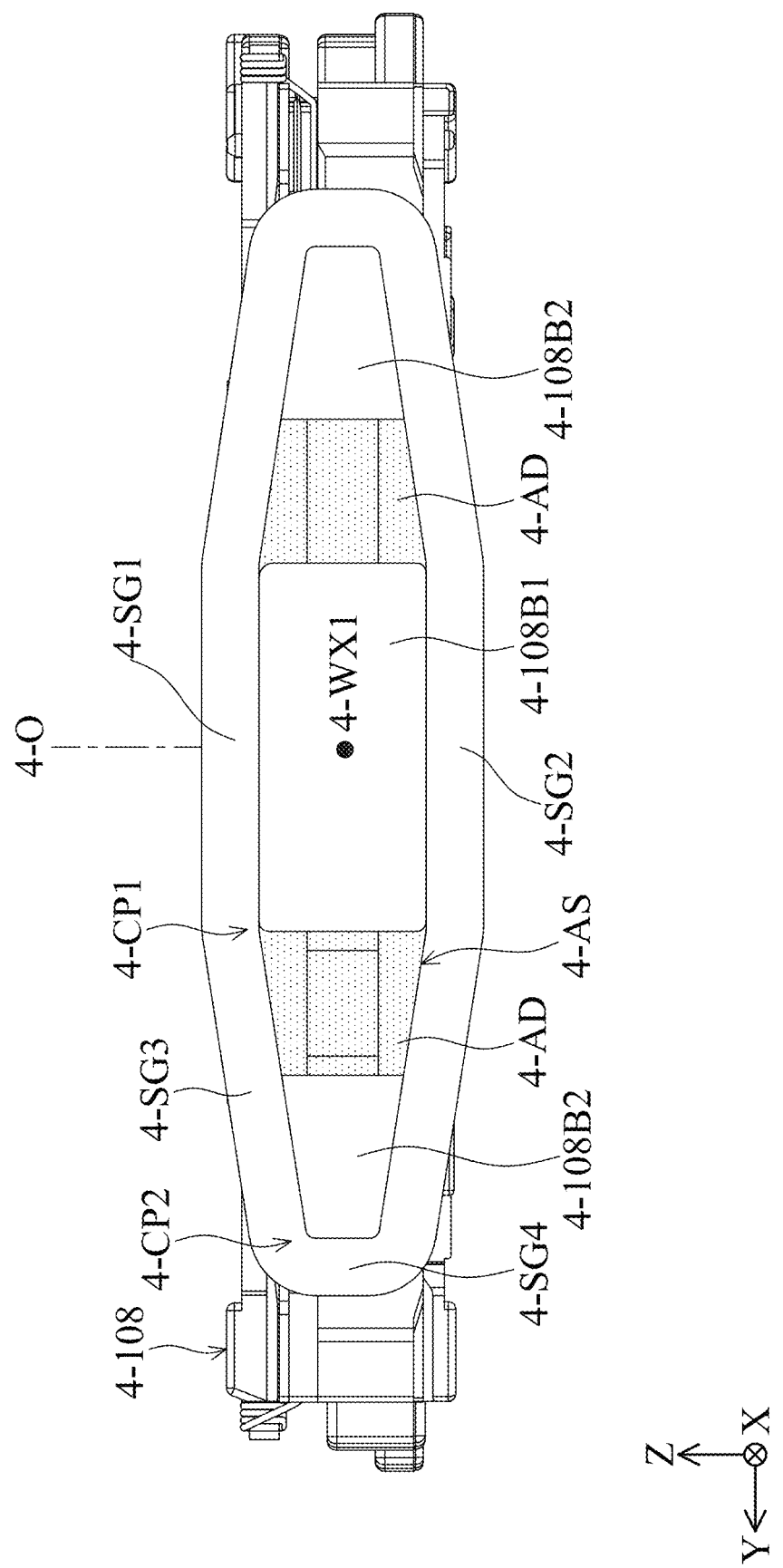
FIG. 44 is a side view of the lens holder 4-108 and the first coil 4-CL11 according to another embodiment of the present disclosure.

Please refer to FIG. 43 and FIG. 44, FIG. 43 is a perspective view of the lens holder 4-108 and the first coil 4-CL11 according to another embodiment of the present disclosure, and FIG. 44 is a side view of the lens holder 4-108 and the first coil 4-CL11 according to another embodiment of the present disclosure. In this embodiment, as shown in the figures, the first coil 4-CL11 includes a first segment 4-SG1, a second segment 4-SG2, and a third segment 4-SG3, each having a linear structure. The first segment 4-SG1 is parallel to the second segment 4-SG2, and the third segment 4-SG3 is not parallel and not perpendicular to the first segment 4-SG1.

The lens holder 4-108 may include a first positioning protrusion 4-108B1, the first segment 4-SG1 and the second segment 4-SG2 are disposed on opposite sides of the first positioning protrusion 4-108B1, and a junction 4-CP1 of the first segment 4-SG1 and the third segment 4-SG3 is in contact with a corner of the first positioning protrusion 4-108B1 (the upper left corner in FIG. 44).

The lens holder 4-108 may further include a second positioning protrusion 4-108B2, and the first coil 4-CL11 may further include a fourth segment 4-SG4 configured to be in contact with the second positioning protrusion 4-108B2. In this embodiment, the maximum height of the second positioning protrusion 4-108B2 along the optical axis 4-O is shorter than the maximum height of the first positioning protrusion 4-108B1 along the optical axis 4-O.

Furthermore, the fourth segment 4-SG4 is connected to the third segment 4-SG3, the third segment 4-SG3 is also in contact with the second positioning protrusion 4-108B2, and a junction 4-CP2 of the fourth segment 4-SG4 and the third segment 4-SG3 is in contact with a corner (the upper left corner) of the second positioning protrusion 4-108B2.

In addition, it should be noted that the lens holder 4-108 may include two second positioning protrusions 4-108B2, and as shown in FIG. 44, the first coil 4-CL11 and the two second positioning protrusions 4-108B2 are mirror symmetry (relative to the optical axis 4-O).

The lens holder 4-108 may further include a receiving groove 4-AS formed between the first positioning protrusion 4-108B1 and the second positioning protrusion 4-108B2, and the receiving groove 4-AS is configured to accommodate an adhesive element 4-AD, such as glue. When viewed along the winding axis 4-WX1 of the first coil 4-CL11, as shown in FIG. 44, the second positioning protrusion 4-108B2 has a trapezoidal structure.

Based on the design of the aforementioned lens holder 4-108, the first coil 4-CL11 can be more stably wound on the first positioning protrusion 4-108B1 and the second positioning protrusion 4-108B2 without being loosened.

Figure 45:
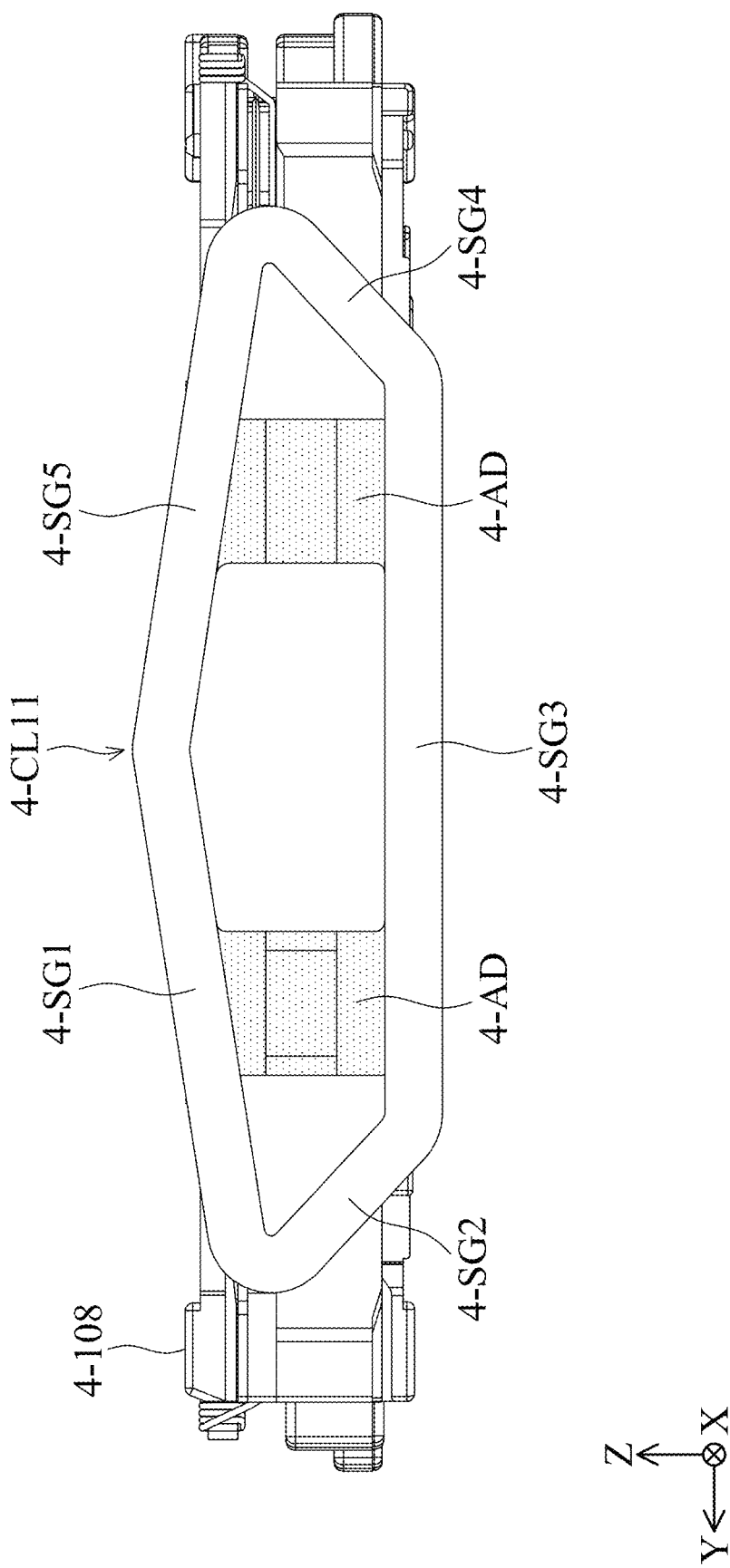
FIG. 45 is a schematic diagram of the lens holder 4-108 and the first coil 4-CL11 according to another embodiment of the present disclosure.

Please refer to FIG. 45, which is a schematic diagram of the lens holder 4-108 and the first coil 4-CL11 according to another embodiment of the present disclosure. The first coil 4-CL11 (the driving coil) includes a first segment 4-SG1, a second segment 4-SG2, a third segment 4-SG3, a fourth segment 4-SG4, and a fifth segment 4-SG5, each having a linear structure, and the first segment 4-SG1 to the fifth segment 4-SG5 are not parallel and not perpendicular to each other. Specifically, the first coil 4-CL11 has a polygonal structure, such as a pentagonal structure, but it is not limited to this embodiment.

Based on the design of the aforementioned lens holder 4-108, the first coil 4-CL11 can be wound on the lens holder 4-108 more stably without loosening.

The present disclosure provides an optical element driving mechanism 4-100, having a lens holder 4-108, driving coils (the first coil 4-CL11 and the second coil 4-CL12) disposed thereon, and a second elastic member 4-110. The leading wire 4-WL1 of the driving coil is wound on the winding column 4-108P of the lens holder 4-108, and the wire end 4-WLE of the leading wire 4-WL1 passes through the second elastic member 4-110 and is electrically connected to the second elastic member 4-110 through the electrical connecting element 4-SD1.

Based on the structural design of the present disclosure, the connection strength between the driving coils and the second elastic member 4-110 can be increased. In addition, in some embodiments, the positioning protrusions of the lens holder 4-108 are not rectangular, so that the driving coil forms a polygonal structure when wound on the positioning protrusions, thereby preventing the problem that the driving coil is easy to loosen when the optical element driving mechanism 4-100 is impacted.

The Fifth Embodiment Group

Figure 46:
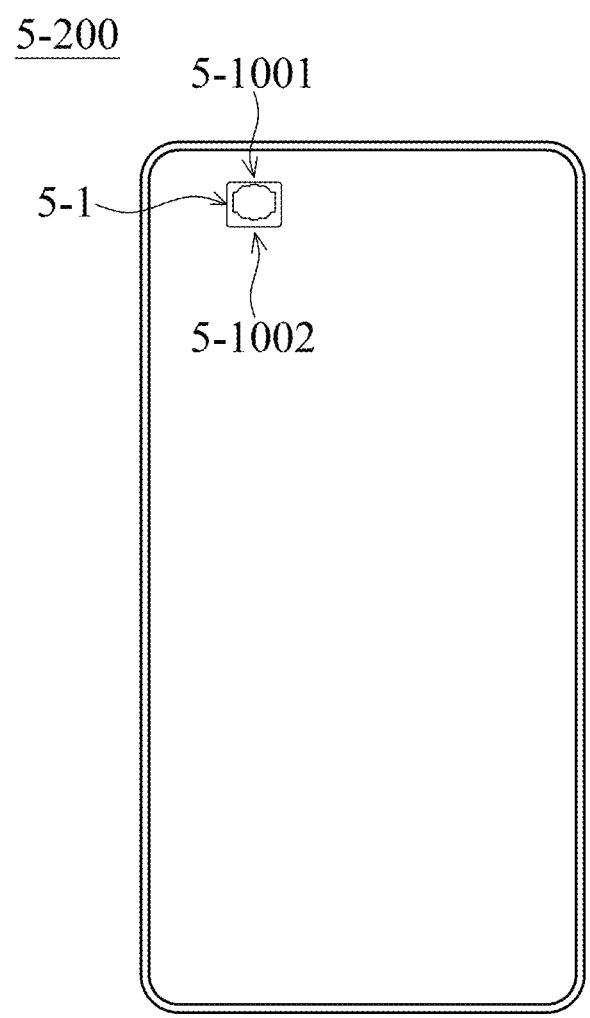
FIG. 46 is a schematic view of the electronic device and the optical element driving mechanism.

FIG. 46 is a schematic view of an electronic device 5-200 and an optical element driving mechanism 5-1. The electronic device 5-200 may be a smart phone, a tablet computer, etc. The optical element driving mechanism 5-1 is generally disposed on the top region of the electronic device 5-200 to achieve a higher screen-to-body ratio.

For clear illustration, the side of the optical element driving mechanism 5-1 that is closer to the top edge than the bottom edge of the electronic device 5-200 is defined as a first side 5-1001 while the side opposite the first side 5-1001 is defined as the second side 5-1002. The second side 5-1002 is parallel with the first side 5-1001.

Figure 47:
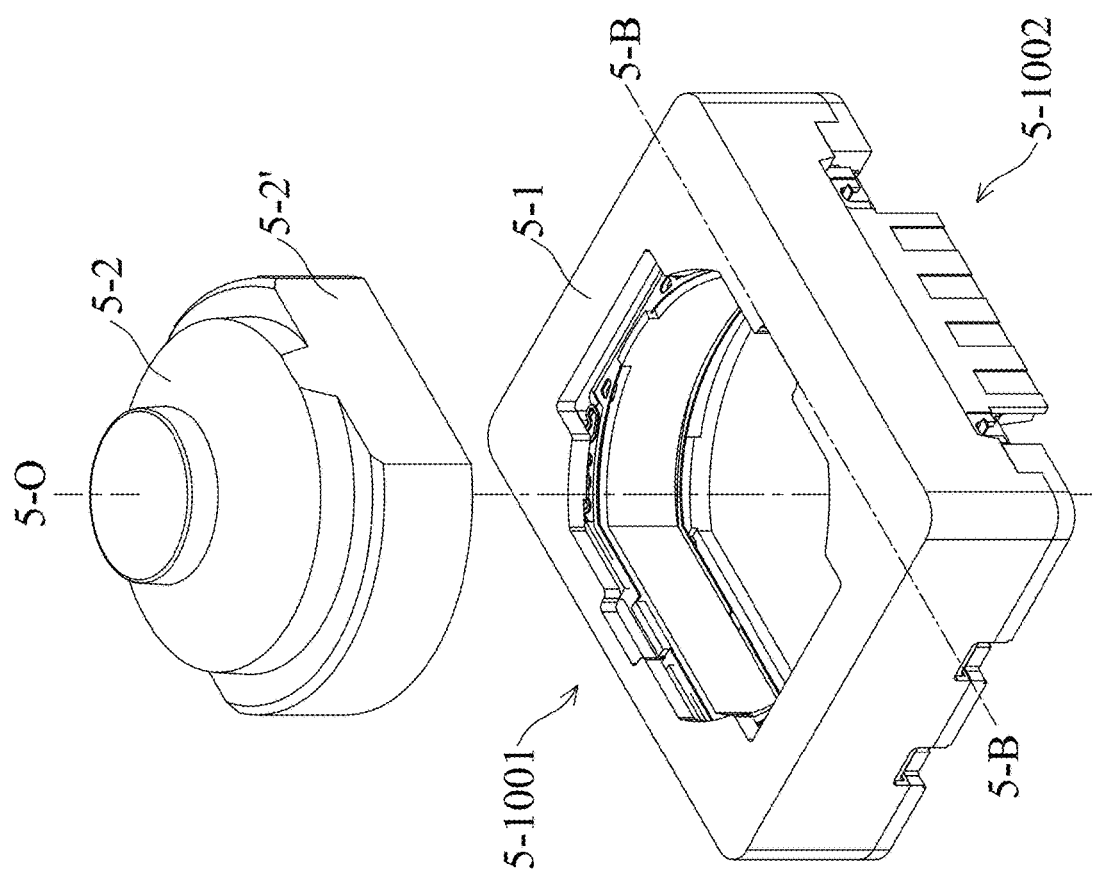
FIG. 47 is a schematic view of the optical element driving mechanism and the optical element.

FIG. 47 is a schematic view of the optical element driving mechanism 5-1 and an optical element 5-2. The optical element driving mechanism 5-1 may hold the optical element 5-2 and may drive the optical element 5-2 to move, so that the position of the optical element 5-2 is adjusted to capture clear images or video. In this technical field, the optical element driving mechanism 5-1 may be referred to as a voice coil motor (VCM).

The optical element 5-2 may be a camera lens, such as a lens. The optical element 5-2 may be made of plastic or glass. To reduce manufacture cost, reduce the weight of the optical element, to match the optical element driving mechanism 5-1, and the like, the optical element 5-2 may include two cut portions 5-2' formed on opposite sides of the optical element. The cut portions 5-2' may be formed by cutting.

The optical element 5-2 has an optical axis 5-O. The optical axis 5-O is an imaginary axis that passes through the center of the optical element 5-2.

When the optical element 5-2 is located inside the optical element driving mechanism 5-1, the distance between the first side 5-1001 and the center of the optical element 5-2 is different from the distance between the second side 5-1002 and the center of the optical element 5-2. In detail, the optical element 5-2 is closer to the first side 5-1001. The optical element driving mechanism 5-1 and the optical element 5-2 are eccentric structure.

A screen limit boundary line 5-B-5-B is illustrated in FIG. 47. The screen limit boundary line 5-B-5-B is closer to the second side 5-1002 and is substantially flush with the edge of the optical element 5-2. The screen limit boundary line 5-B-5-B illustrates the limit of the boundary that the screen may represent. That is, as for the optical element driving mechanism 5-1, the screen may represent over the portion between the screen limit boundary line 5-B-5-B and the second side 5-1002. Therefore, the electronic device 5-200 may achieve a high screen-to-body ratio, such as higher than 80% or 90% or even higher.

Figure 48:
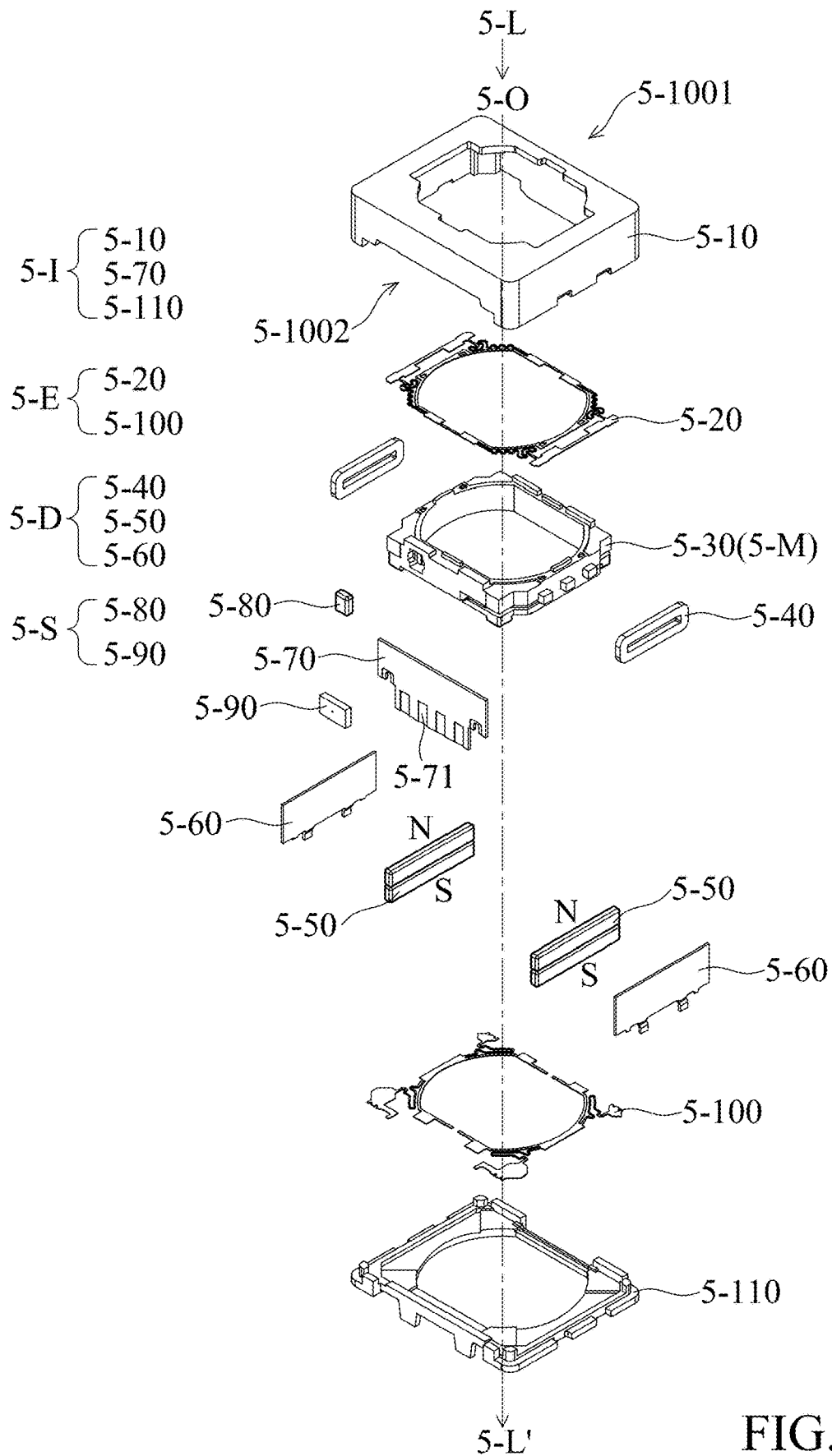
FIG. 48 is an exploded view of the optical element driving mechanism.

FIG. 48 is an exploded view of the optical element driving mechanism 5-1. The optical element driving mechanism 5-1 includes an immovable part 5-I, a movable part 5-M, an elastic assembly 5-E, a drive assembly 5-D, and a sensing assembly 5-S. The movable part 5-M holds the optical element 5-2. The movable part 5-M is movable relative to the immovable part 5-I. The drive assembly 5-D drives the movable part 5-M to move relative to the immovable part 5-I. The sensing assembly 5-S senses the movement of the movable part 5-M relative to the immovable part 5-I.

The optical element driving mechanism 5-1 has a central axis (not shown) that passes through the center of the optical element driving mechanism 5-1. It should be noted that when the optical element 5-2 and the optical element driving mechanism 5-1 are aligned, the optical axis 5-O of the optical element 5-2 coincides with the central axis of the optical element driving mechanism 5-1. Therefore, in the drawings and in the following, some features of the optical element driving mechanism 5-1 are illustrated with the optical axis 5-O. It should be noted that movement, vibration, rotation, or tilt of the movable part 5-M may cause the optical axis 5-O of the optical element 5-2 to not coincide with the central axis of the optical element driving mechanism 5-1 because the optical element 5-2 is disposed in the movable part 5-M.

In this embodiment, the immovable part 5-I includes a case 5-10, a circuit assembly 5-70, and a bottom 5-110. The movable part 5-M includes a holder 5-30. The case 5-10, the holder 5-30, and the bottom 5-110 are arranged along the optical axis 5-O sequentially. The elastic assembly 5-E includes an upper elastic element 5-20 and a lower elastic element 5-100. The drive assembly 5-D includes two coils 5-40, two magnetic elements 5-50, and two magnetically-permeable elements 5-60. The sensing assembly 5-S includes a reference element 5-80 and a sensing element 5-90. It should be noted that the elements may be added or omitted according to the requirements of the users. In the following, the immovable part 5-I, the movable part 5-M, the elastic assembly 5-E, the drive assembly 5-D, and the sensing assembly 5-S are explained in detail.

Figure 49:
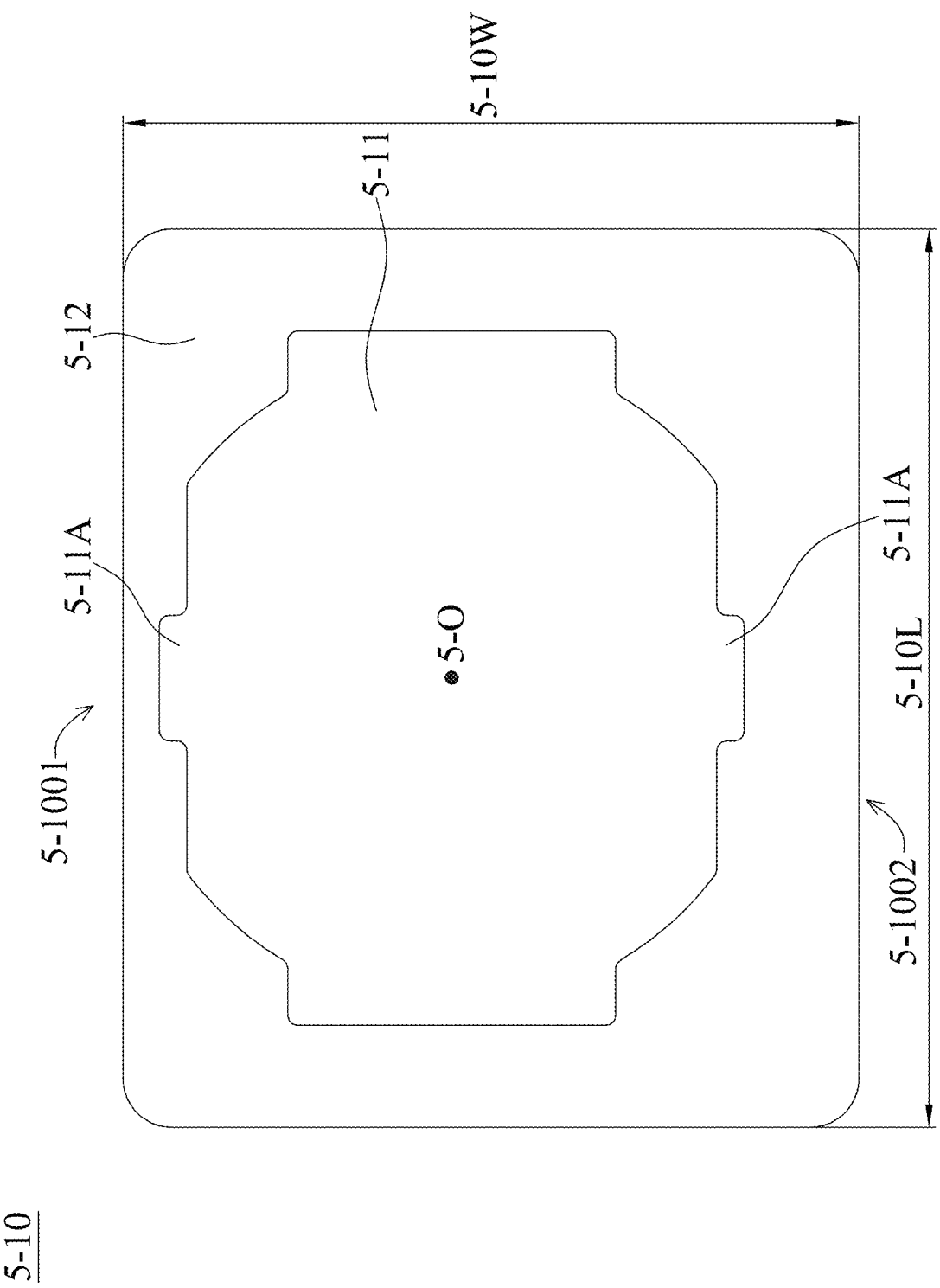
FIG. 49 is a top view of the case.
Figure 50:
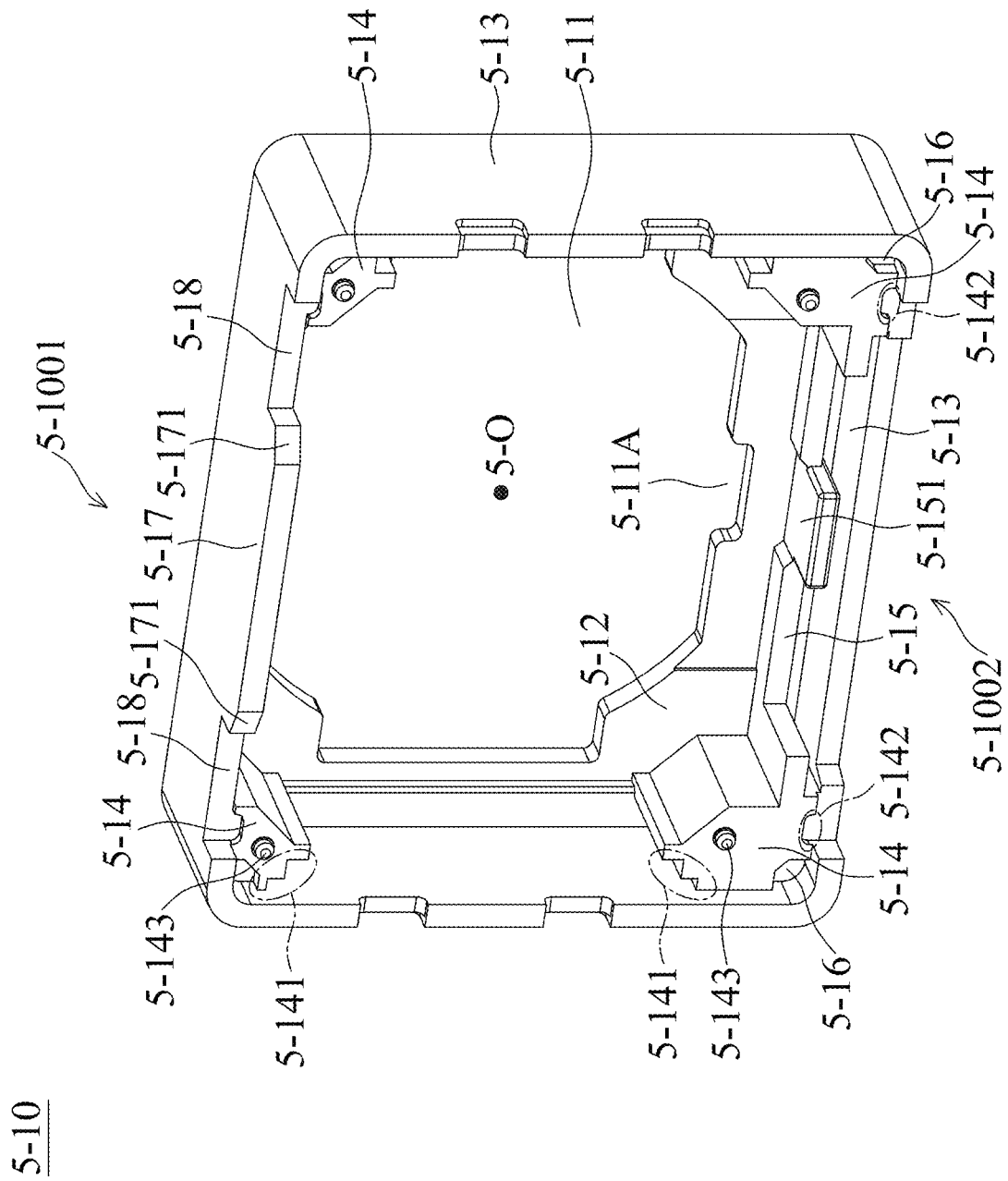
FIG. 50 is a perspective view of the case.
Figure 51:
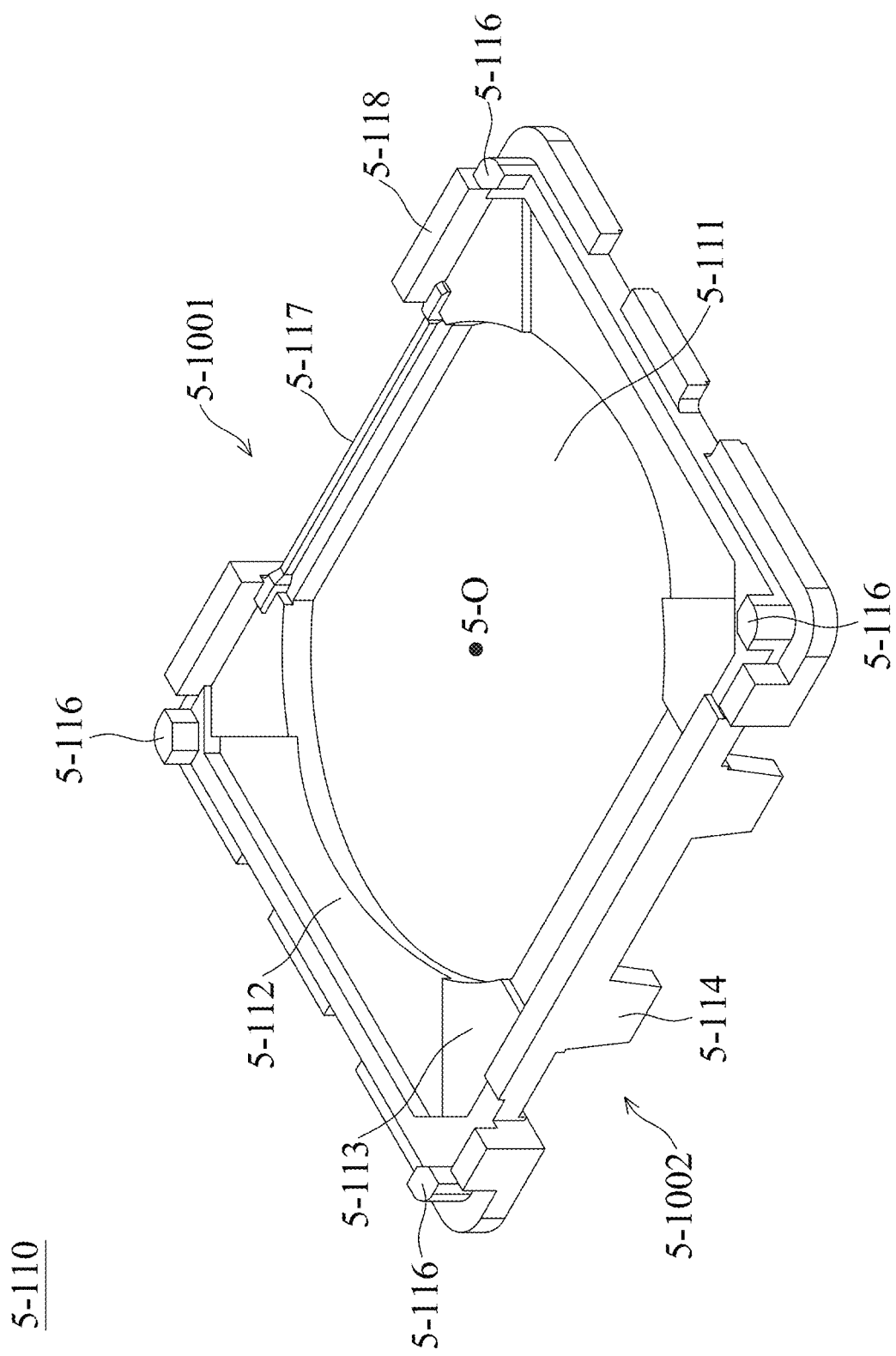
FIG. 51 is a perspective view of the bottom.
Figure 52:
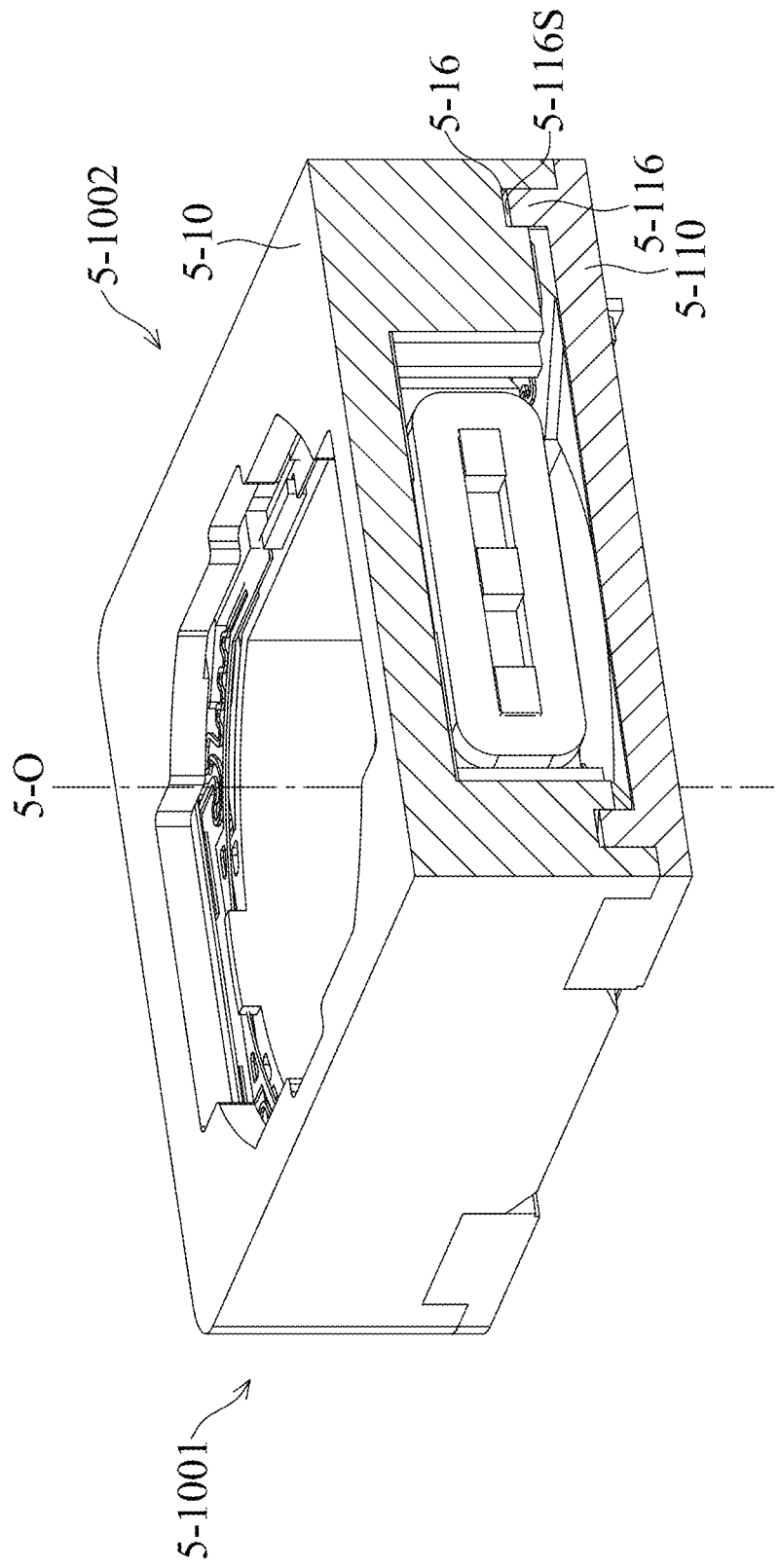
FIG. 52 is a cross-sectional view of part of the optical element driving mechanism.

Please refer to FIG. 49 to FIG. 52 to understand the immovable part 5-I. FIG. 49 is a top view of the case 5-10. FIG. 50 is a perspective view of the case 5-10. FIG. 51 is a perspective view of the bottom 5-110. FIG. 52 is a cross-sectional view of part of the optical element driving mechanism 5-1. The case 5-10 is connected to the bottom 5-110 via adhesion, welding, etc. After the case 5-10 is connected to the bottom 5-110, the space formed therein may accommodate the circuit assembly 5-70, the movable part 5-M, the elastic assembly 5-E, the drive assembly 5-D, and the sensing assembly 5-S, and the like.

The case 5-10 may be made of a metal material or a non-metal material such as plastics. The case 5-10 made of a non-metal material may isolate electromagnetic wave. In this way, the electromagnetic wave interference generated by an electromagnetic device (not shown) (such as a receiver or an antenna) close to the optical element driving mechanism 5-1 may be reduced.

The case 5-10 made of plastics is usually manufactured by injection molding. Corresponding molds are designed according to the actual requirements, such as the structure of the case 5-10. The case 5-10 is manufactured by operations including assembling the molds to generate high pressure (closing the molds), injecting high-temperature melting plastic (injection), maintaining pressure (pressure-maintenance), decreasing the temperature to make the product shaped (cooling), opening the molds, and ejecting the product (ejection). During the process of injection molding, the parameters including the flow properties of the material, the amount of material, the melting temperature, etc. should be taken into account.

The case 5-10 includes a case opening 5-11, a top wall 5-12, at least one sidewall 5-13, at least one pillar 5-14, a receiving structure 5-15, at least one receiving hole 5-16, a protrusion 5-17, at least one recession 5-18. The profile of the case 5-10 is rectangular, including two opposite long sides 5-10L and two opposite short sides 5-10W.

An entering light (an incident light) 5-L outside the optical element driving mechanism 5-1 enters the optical element driving mechanism 5-1 via the case opening 5-11. The top wall 5-12 surrounds the case opening 5-11. The top wall 5-12 is perpendicular to the optical axis 5-O. Each sidewall 5-13 extends from the outer edge (far away from the optical axis 5-O) of the top wall 5-12 along the optical axis 5-O. The case opening 5-11 includes two concaved portions 5-11A. Each concaved portion 5-11A is substantially located at the center of the one of the sides of the case opening 5-11.

The pillar 5-14 is disposed on the corner of the interior case. The pillar 5-14 is in contact with the top wall 5-12 and the sidewall 5-13. The pillar 5-14 is used for placing the lower elastic element 5-10. The details will be described with reference to the discussion of the elastic assembly 5-E. Since the portion of the optical element driving mechanism 5-1 that is closer to the first side 5-1001 is less than the portion of the optical element driving mechanism 5-1 that is closer to the second side 5-1002, the elements disposed on the portion of the optical element driving mechanism 5-1 that is closer to the first side 5-1001 may be restricted. Therefore, the pillar 5-14 that is closer to the first side 5-1001 is less than the pillar 5-14 that is closer to the second side 5-1002.

Each pillar 5-14 includes a step-like structure 5-141, a bending portion 5-142, and a bump 5-143. The step-like structure 5-141 is located on the edge of the pillar 5-14. The step-like structure 5-141 may affix the magnetic elements 5-50 and the magnetically-permeable elements 5-60. The bending portion 5-142 is located on the edge of the pillar 5-14. The bending portion 5-142 and the step-like structure 5-141 are located on different sides of the pillar 5-14. The excess portion of the lower elastic element 5-100 may be removed via the bending portion 5-142. The details will be described later. The bump 5-143 is located on the surface of the pillar 5-14. The bump 5-143 may improve the connection between the lower elastic element 5-100 and the pillar 5-14.

The receiving structure 5-15 extends along the optical axis 5-O from the top wall 5-12 of the case 5-10. The circuit assembly 5-70 may be received in the space formed between the receiving structure 5-15 and the sidewall 5-13. The receiving structure 5-15 includes a narrow portion 5-151. The distance between the narrow portion 5-151 and the sidewall 5-13 is less than the remaining parts of the receiving structure 5-15 and the sidewall 5-13. The connection of the narrow portion 5-151 and the circuit assembly 5-70 may reach a close fit, so that the circuit assembly 5-70 is affixed solidly.

The narrow portion 5-151 is advantageous for increasing the structural strength of the molds during the shaping of the product. It is because that molds with specific shape are required to form the receiving structure 5-15. If there is no narrow portion 5-151 formed on the receiving structure 5-15, then the space between the receiving structure 5-15 and the sidewall 5-13 is substantially cuboid, the molds for forming the receiving structure 5-15 should also be cuboid. The cuboid molds may be more likely to break or become damaged with repeated use. However, if the molds are not cuboid-shaped, but are shaped like the shape between the receiving structure 5-15 and the sidewall 5-13 shown in FIG. 50, such molds have stronger strength.

The receiving hole 5-16 is formed between the sidewall 5-13 and the pillar 5-14. The protrusion 5-17 and the recession 5-18 are located on the first side 5-1001. There are two inclined surfaces 5-171 formed on the edge of the protrusion 5-17.

As shown in FIG. 51, the bottom 5-110 includes a bottom opening 5-111, a base plate 5-112, at least one stopping portion 5-113, at least one support member 5-114, at least one column 5-116, at least one notch 5-117, and at least one engagement portion 5-118.

The entering light 5-L may pass through the optical element driving mechanism 5-1 via the bottom opening 5-111 and then becomes an exit light 5-L'. That is, the optical axis 5-O passes through the bottom opening 5-111. The base plate 5-112 is defined as the plane of the part of the bottom 5-110 that is the most farther away from the top wall 5-12 in the optical axis 5-O. The base plate 5-112 is located on the plane that is perpendicular to the optical axis 5-O.

The stopping portion 5-113 is disposed on the base plate 5-112. The height of the stopping portion 5-113 is higher than the base plate 5-112. The stopping portion 5-113 may restrict the range of movement of the holder 5-30. When the holder 5-30 reaches the limit, the holder 5-30 is in contact with the stopping portion 5-113, so that the holder 5-30 may not keep moving toward the bottom 5-110.

The support member 5-114 is located on the second side 5-1002. The support member 5-114 extends toward a direction that is far away from the top wall 5-12 of the case 5-10. In the optical axis 5-O, the farther away from the top wall 5-12 of the case 5-10, the narrower the width of the support member 5-114 is. However, the shape of the support member 5-114 is not limited hereto. Two support members 5-114 are spaced apart from each other. The support member 5-114 is used for being contact with and supporting the circuit assembly 5-70, thereby preventing the circuit assembly 5-70 from deformation. For example, the circuit assembly 5-70 may be a flexible printed circuit (FPC) and thus be flexible. Please refer to FIG. 61 temporarily, the support member 5-114 at least partially overlaps the circuit assembly 5-70 when viewed from a direction that is perpendicular to the optical axis 5-O. The size of the support member 5-114 in the optical axis 5-O is less than the size of the circuit assembly 5-70 in the optical axis 5-O, so that the circuit assembly 5-70 may be cut according to actual needs.

The column 5-116 is disposed on the corner of the bottom 5-110. The column 5-116 is received in the receiving hole 5-16 of the case 5-10. The notch 5-117 is formed on the first side 5-1001. The protrusion 5-17 of the case 5-10 is received in the notch 5-117. The engagement portion 5-118 is disposed on the first side 5-1001. The engagement portion 5-118 is received in the recession 5-18 of the case 5-10.

The connection between the receiving hole 5-16 and the column 5-116, the connection between the protrusion 5-17 and the notch 5-117, and the connection between the recession 5-18 and the engagement portion 5-118 may improve the connection between the case 5-10 and the bottom 5-110, so that the connection strength is increased, thereby preventing the case 5-10 or the bottom 5-110 from dropping off. It should be noted that, as shown in FIG. 52, a surface 5-116S of the column 5-116 that faces the receiving hole 5-16 is not in contact with the case 5-10.

As described above, the circuit assembly 5-70 is disposed in the space between the receiving structure 5-15 of the case 5-10 and the sidewall 5-13. The circuit assembly 5-70 is closer to the second side 5-1002. The circuit assembly 5-70 may be a circuit board, such as a FPC or a rigid-flex board. Electronic elements may be disposed on the circuit assembly 5-70, such as capacitance, resistance, inductance, etc. The circuit assembly 5-70 includes a plurality of pins 5-71. The current with different directions may flow into or flow out the optical element driving mechanism 5-1 via the pins 5-71. The direction of the current is controlled according to the movement of the holder 5-30, i.e. toward the top wall 5-12 of the case 5-10 or toward the bottom 5-110.

In this embodiment, there are six pins 5-71, four of them are electrically connected to the sensing element 5-90, and the other two pins 5-71 may transmit the signals about the displacement to be compensated to the drive assembly 5-D. Among the four pins 5-71, two of them are for power input while the other two pins 5-71 are for signal output.

Figure 53:
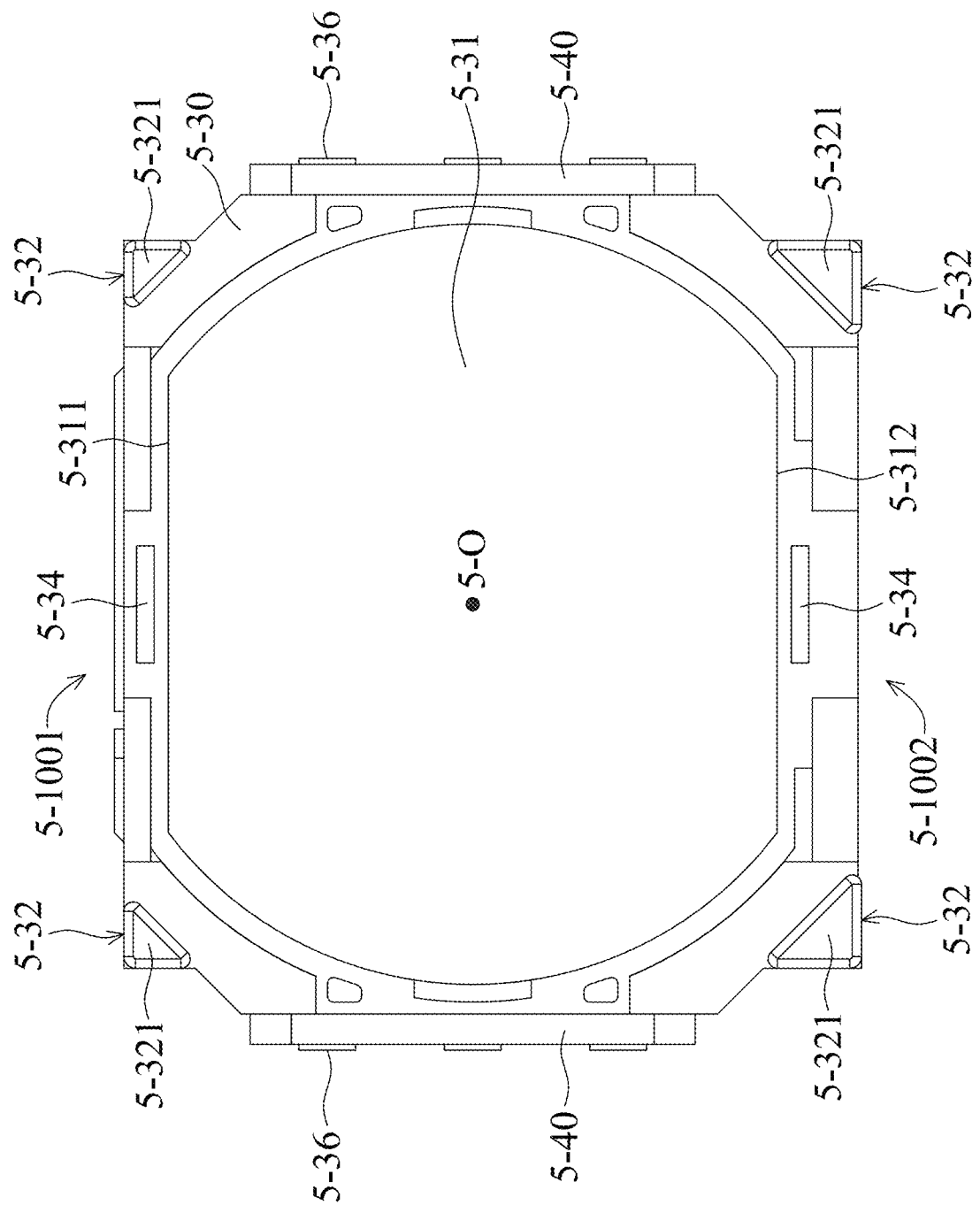
FIG. 53 is a top view of the holder and the coil.
Figure 54:
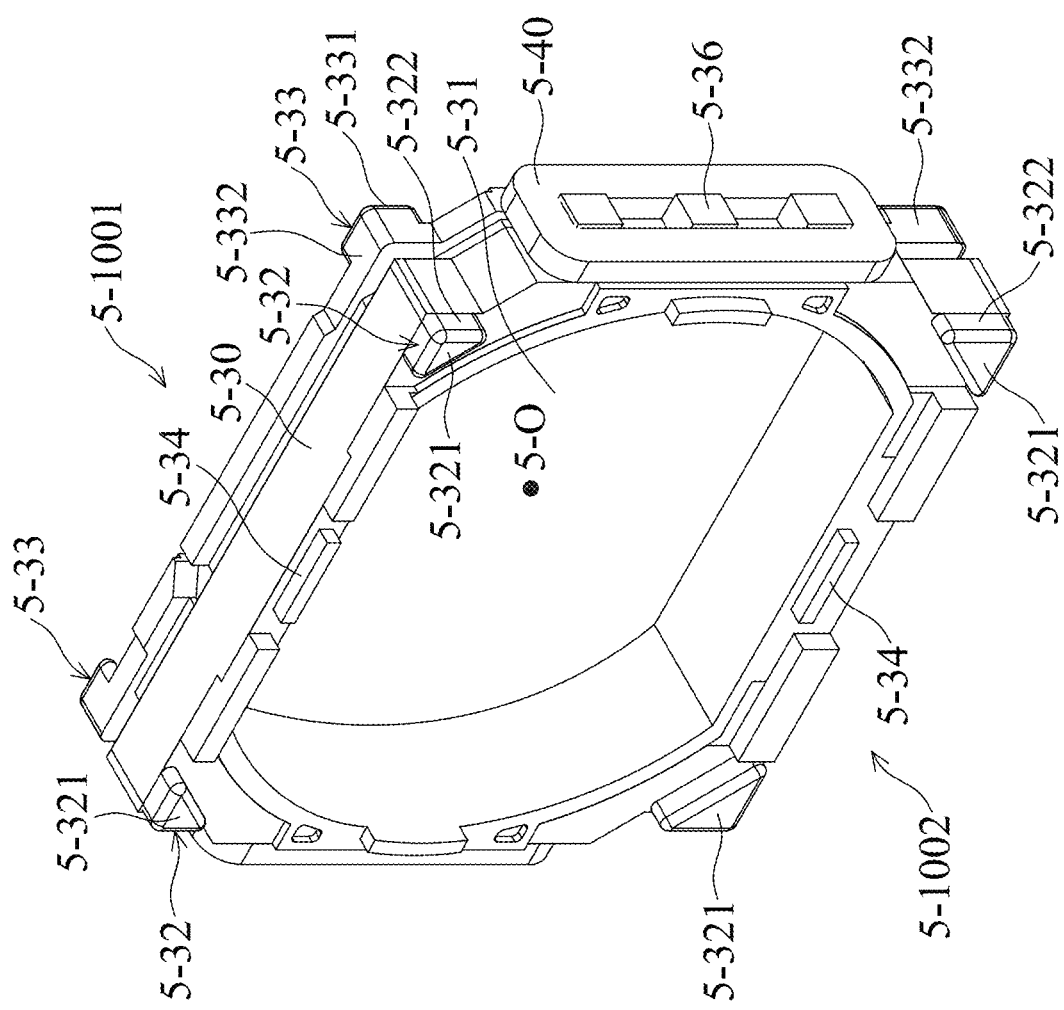
FIG. 54 is a perspective view of the holder and the coil.
Figure 55:
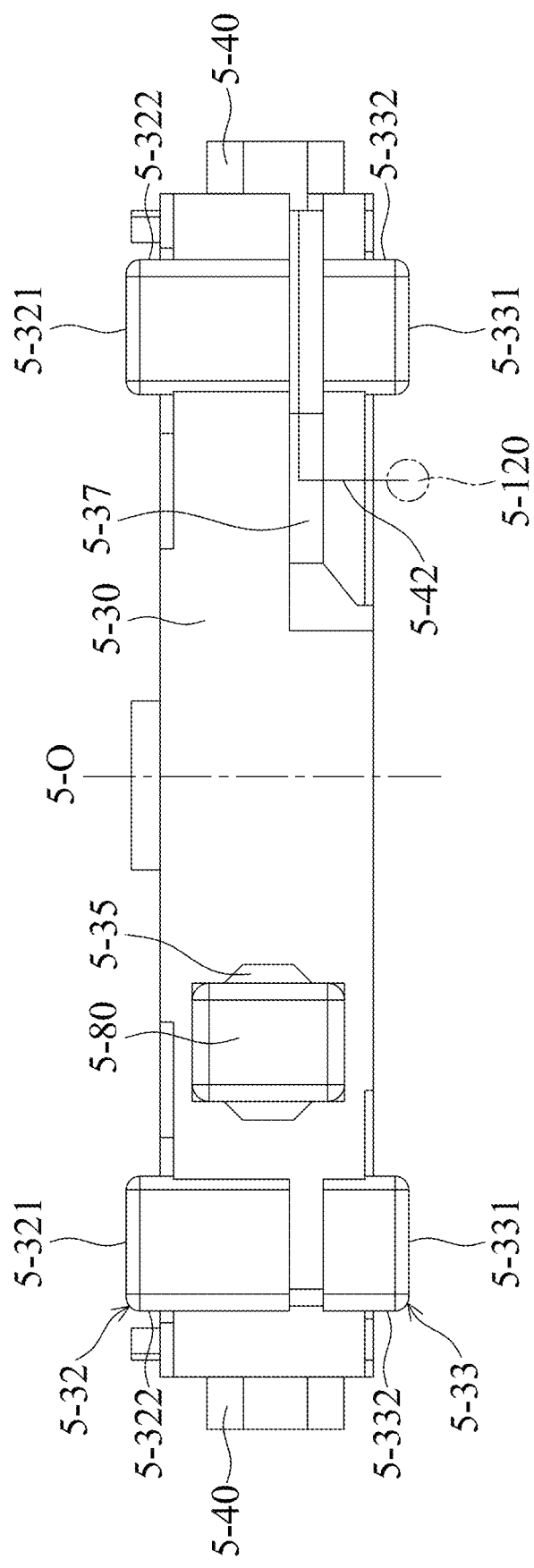
FIG. 55 is a side view of the holder, the coil, and the reference element.

Next, please refer to FIG. 53 to FIG. 55 to understand the movable part 5-M. FIG. 53 is a top view of the holder 5-30 and the coil 5-40. FIG. 54 is a perspective view of the holder 5-30 and the coil 5-40. FIG. 55 is a side view of the holder 5-30, the coil 5-40, and the reference element 5-80.

The holder 5-30 includes a through hole 5-31, at least one upper protruding portion 5-32, at least one lower protruding portion 5-33, at least one upper connection portion 5-34, at least one receiving portion 5-35, at least one coil placement portion 5-36, and at least one guidance groove 5-37.

The through hole 5-31 passes through the whole holder 5-30 for holding the optical element 5-2. Threaded structure may be configured between the through hole 5-31 and the optical element 5-2, so that the optical element 5-2 may be affixed in the holder 5-30. The through hole 5-31 includes a first straight line segment 5-311 and a second straight line segment 5-312 opposite each other. The first straight line segment 5-311 and the second straight line segment 5-312 are parallel with the long side 5-10L of the case 5-10. The first straight line segment 5-311 is close to the first side 5-1001 while the second straight line segment 5-312 is close to the second side 5-1002. The distance between the first straight line segment 5-311 and the sidewall 5-13 of the case 5-10 that is close to the first straight line segment 5-311 is less than the distance between the second straight line segment 5-312 and the sidewall 5-13 of the case 5-10 that is close to the second straight line segment 5-312.

Additionally, the first straight line segment 5-311 and the second straight line segment 5-312 may be substantially flush with the cut portion 5-2' of the optical element 5-2. In other embodiments, the through hole 5-31 may be circular. However, compared to the circular through hole 5-31, the through hole 5-31 including the first straight line segment 5-311 and the second straight line segment 5-312 may reduce the length of the optical element driving mechanism 5-1 in the direction of the short side 5-10W of the case 5-10. Therefore, the cost is reduced, the weight is reduced, and the like.

The upper protruding portion 5-32 and the lower protruding portion 5-33 are disposed on the corner of the holder 5-30. The upper protruding portion 5-32 and the lower protruding portion 5-33 may restrict the range of movement and the range of rotation of the holder 5-30. The volume of the upper protruding portion 5-32 that is close to the first straight line segment 5-311 is less than the volume of the upper protruding portion 5-32 that is close to the second straight line segment 5-312. The volume of the lower protruding portion 5-33 that is close to the first straight line segment 5-311 is less than the volume of the lower protruding portion 5-33 that is close to the second straight line segment 5-312.

Figure 56:
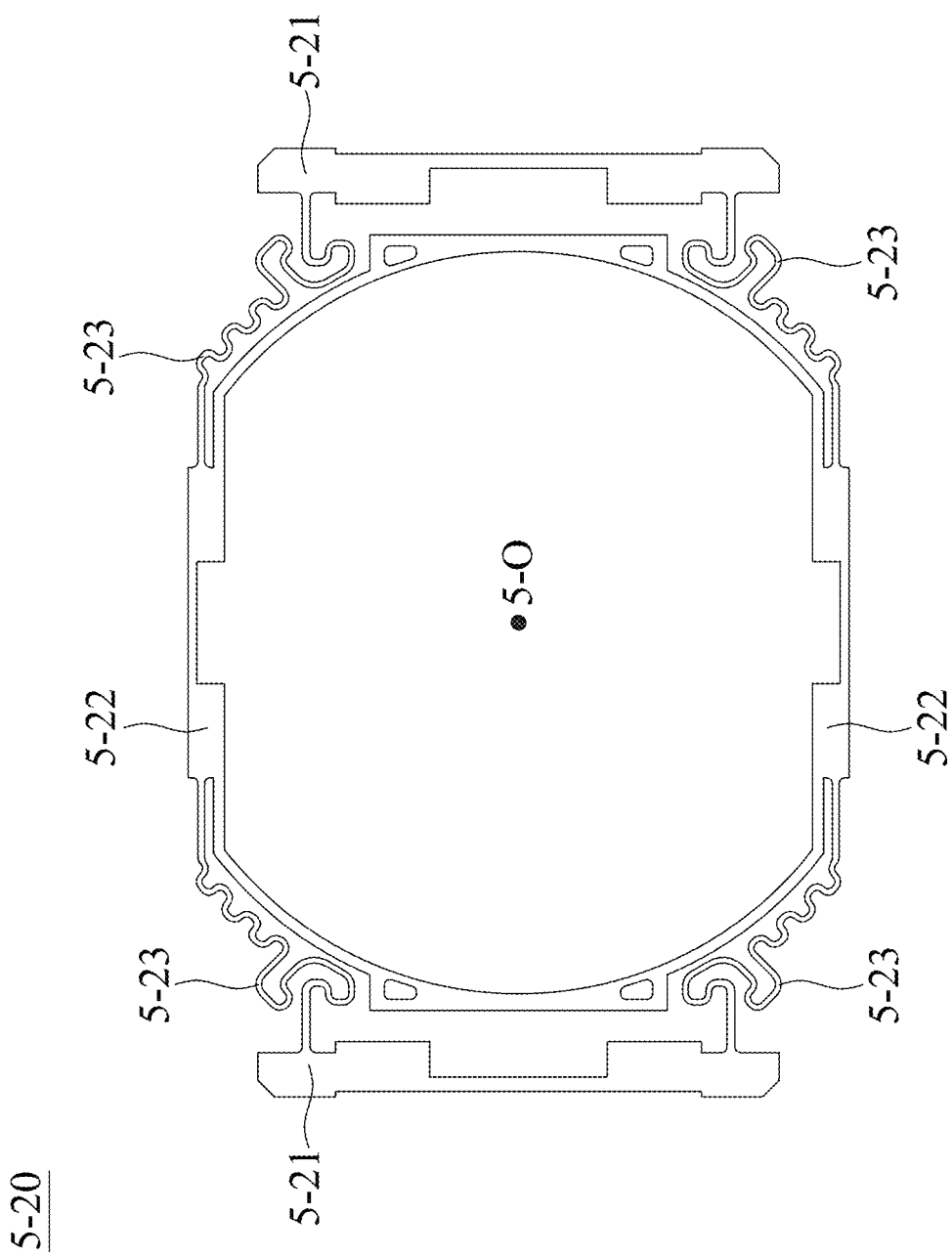
FIG. 56 is a top view of the upper elastic element.
Figure 57:
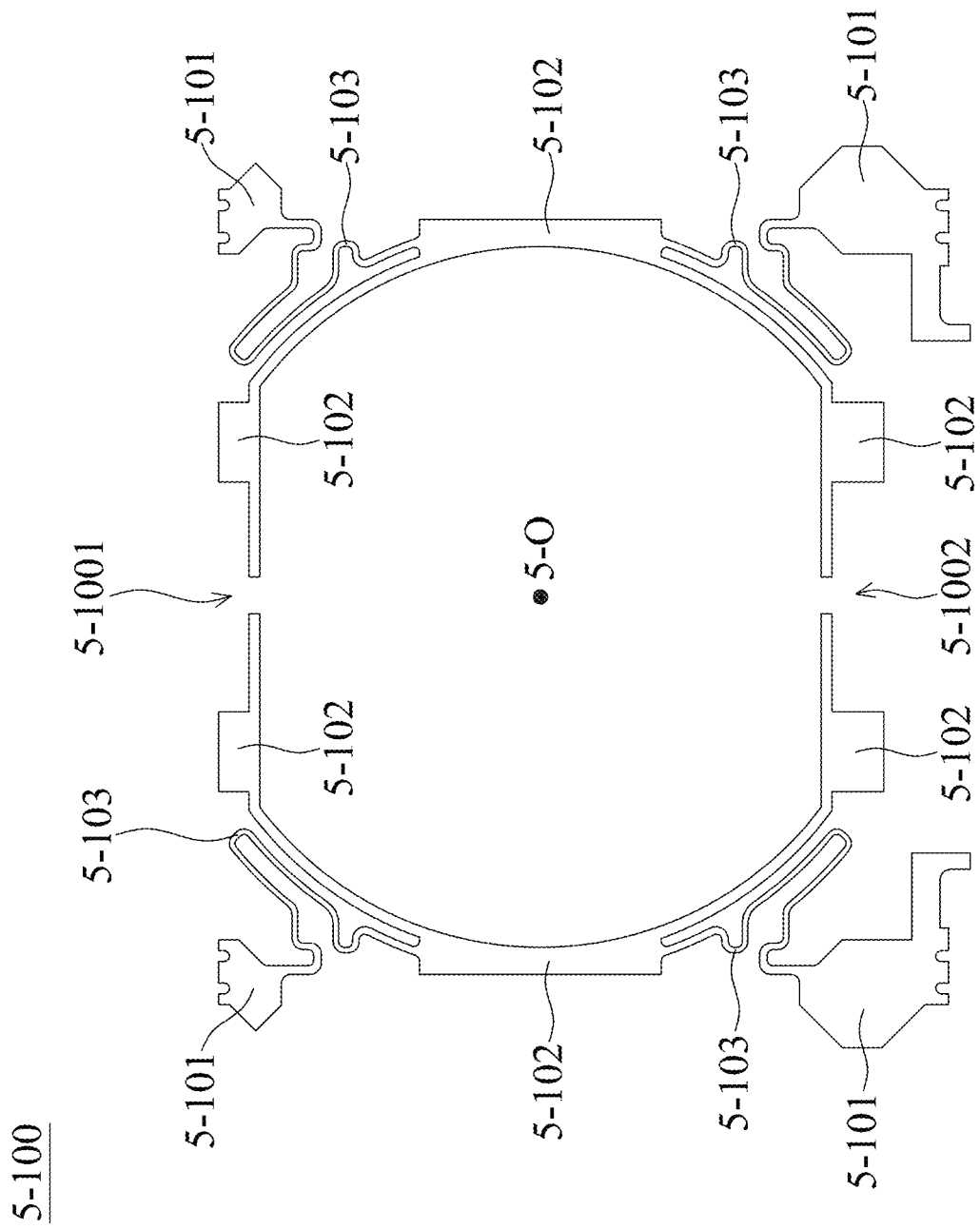
FIG. 57 is a top view of the lower elastic element.

Any one of the upper protruding portions 5-32 at least partially overlaps one of the lower protruding portions 5-33 when viewed from the optical axis 5-O. Since the upper elastic element 5-20 and the lower elastic element 5-100 have to avoid the upper protruding portion 5-32 and the lower protruding portion 5-33, the configuration that the upper protruding portion 5-32 at least partially overlaps the lower protruding portion 5-33 in the direction that is parallel with the optical axis 5-O may simplify the design of the upper elastic element 5-20 and the lower elastic element 5-100. In detail, the shape of the upper elastic element 5-20 may be similar to the shape of the lower elastic element 5-100. As shown in FIG. 56 and FIG. 57, both the upper elastic element 5-20 and the lower elastic element 5-100 are mirror symmetric.

The upper protruding portion 5-32 includes at least one first stopping assembly 5-321 for restricting the movement of the holder 5-30 along the optical axis 5-O. Additionally, the upper protruding portion 5-32 includes at least one second stopping assembly 5-322 for restricting the range of rotation of the holder 5-30 around the optical axis 5-O. Similarly, the lower protruding portion 5-33 includes at least one first stopping assembly 5-331 for restricting the movement of the holder 5-30 along the optical axis 5-O. Additionally, the lower protruding portion 5-33 includes at least one second stopping assembly 5-322 for restricting the range of rotation of the holder 5-30 around the optical axis 5-O.

The first stopping assembly 5-321 is located on the top surface of the upper protruding portion 5-32. When viewed from the optical axis 5-O, the first stopping assembly 5-321 is the part of the whole holder 5-30 that is closest to the top wall 5-12 of the case 5-10. When the holder 5-30 moves along the optical axis 5-O toward the top wall 5-12 of the case 5-10 and reaches the limit, the first stopping assembly 5-321 may be in contact with the top wall 5-12 of the case 5-10, so that the holder 5-30 may not keep moving toward the top wall 5-12 of the case 5-10. The first stopping assembly 5-331 is located on the bottom surface (facing the bottom 5-110) of the lower protruding portion 5-33. The first stopping assembly 5-331 is the part of the whole holder 5-30 that is closest to the bottom 5-110. When the holder 5-30 moves along the optical axis 5-O toward the bottom 5-110 and reaches the limit, the first stopping assembly 5-331 may be in contact with the bottom 5-110, so that the holder 5-30 may not keep moving toward the bottom 5-110.

The second stopping assembly 5-322 is located on the side surface of the upper protruding portion 5-32 that faces the sidewall 5-13 of the case 5-10. The second stopping assembly 5-322 is located on the side surface of the lower protruding portion 5-33 that faces the sidewall 5-13 of the case 5-10. When viewed from the optical axis 5-O, the second stopping assembly 5-322 and the second stopping assembly 5-322 are the parts of the upper protruding portion 5-32 and the lower protruding portion 5-33 that are closest to the sidewall 5-13 of the case 5-10, respectively. When the holder 5-30 rotates around the optical axis 5-O and reaches the limit, the second stopping assembly 5-322 and the second stopping assembly 5-322 may be in contact with the sidewall 5-13 of the case 5-10, so that the holder 5-30 may not keep rotating around the optical axis 5-O.

Therefore, the first stopping assembly 5-321, the first stopping assembly 5-331, the second stopping assembly 5-322, and the second stopping assembly 5-322 may effectively attribute collision force and enhance the stability of the overall optical element driving mechanism 5-1. Furthermore, the number and the positions of the upper protruding portion(s) 5-32 and the lower protruding portion(s) 5-33 may be adjusted according to actual needs.

The upper connection portion 5-34 is disposed close to the first straight line segment 5-311 and the second straight line segment 5-312 of the through hole 5-31. Part of the upper elastic element 5-20 is immovably disposed on the top surface of the holder 5-30 and the upper connection portion 5-34 may strengthen the connection between the upper elastic element 5-20 and the top surface of the holder 5-30.

The receiving portion 5-35 is formed on the side surface of the holder 5-30. Since the part of the holder 5-30 that is close to the second side 5-1002 has more space than the part of the holder 5-30 that is close to the first side 5-1001, the receiving portion 5-35 is formed on the side that is close to the second side 5-1002. The reference element 5-80 is disposed in the receiving portion 5-35.

The two coil placement portions 5-36 are disposed on opposite sides of the holder 5-30 for placing and affixing the two coils 5-40. The guidance groove 5-37 may protect a start lead 5-42 extending from an end of the coil 5-40.

In the present disclosure, the start lead 5-42 passes through the guidance groove 5-37 of the holder 5-30 and extends downwardly (toward the bottom 5-110) until is in direct contact with the lower elastic element 5-100. The start lead 5-42 is electrically connected to the lower elastic element 5-100 via an electrical connection element 5-120 (only schematically shown in FIG. 55). The electrical connection element 5-120 may be any material that may make any elements be electrically connected to other elements, such as metal. According to some embodiments, if the electrical connection element 5-120 is round-shaped, the electrical connection element 5-120 may be disposed on the lower elastic element 5-100 more conveniently and more solidly. For example, the electrical connection element 5-120 may be a solder ball.

It should be noted that, for some conventional optical element driving mechanisms, the holder includes a coil winding portion and the start lead winds around the coil winding portion. Also, the electrical connection element may be applied on the coil winding portion, so that the start lead is electrically connected to the lower elastic element. However, in this disclosure, the holder 5-30 does not need "a coil winding portion" and the start lead does not have to wind around the coil winding portion, so that the design is simplified.

Figure 58:
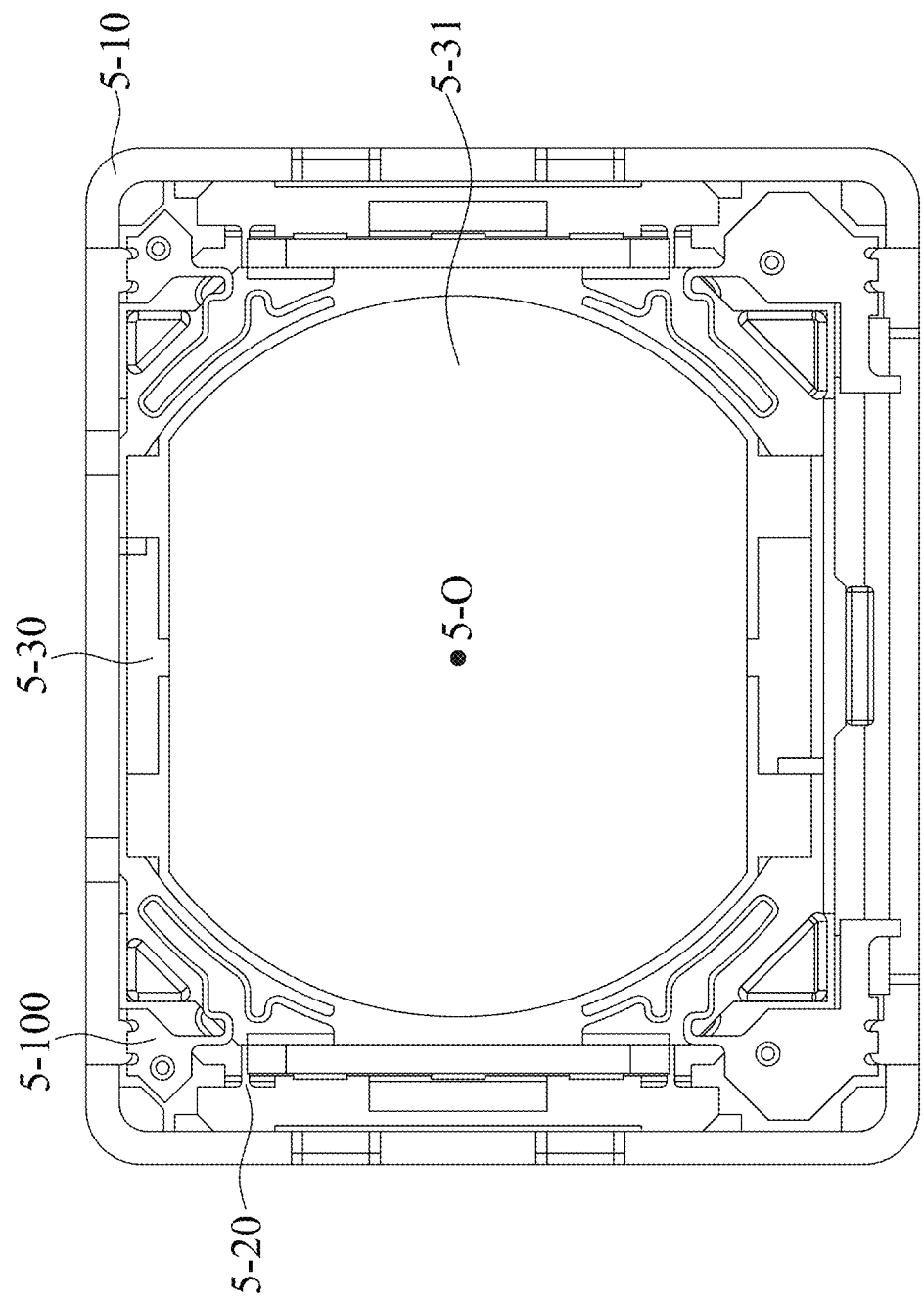
FIG. 58 is a bottom view of the case, the upper elastic element, the holder, the lower elastic element.

Next, please refer to FIG. 56 to FIG. 58 to understand the elastic assembly 5-E. FIG. 56 is a top view of the upper elastic element 5-20. FIG. 57 is a top view of the lower elastic element 5-100. FIG. 58 is a bottom view of the case 5-10, the upper elastic element 5-20, the holder 5-30, and the lower elastic element 5-100. The upper elastic element 5-20, the holder 5-30, and the lower elastic element 5-100 are arranged along the optical axis 5-O sequentially. The holder 5-30 is movably connected to the case 5-10 via the upper elastic element 5-20 and the lower elastic element 5-100.

When viewed from the optical axis 5-O, the upper elastic element 5-20 and the lower elastic element 5-100 are not exposed from the through hole 5-31 of the holder 5-30, thereby preventing the upper elastic element 5-20 and the lower elastic element 5-100 from being damaged. The upper elastic element 5-20 and the lower elastic element 5-100 are made of elastic material or ductile material such as metal. In this technical field, the upper elastic element 5-20 and the lower elastic element 5-100 may be known as "spring", "leaf spring", "plate spring", etc.

The upper elastic element 5-20 connects the movable part 5-M and the case 5-10 directly. As shown in FIG. 56, the upper elastic element 5-20 includes at least one immovable part connection portion 5-21, at least one movable part connection portion 5-22, and at least one deformation portion 5-23. The immovable part connection portion 5-21 is immovably disposed on the immovable part 5-I. For example, the immovable part connection portion 5-21 is disposed on the top wall 5-12 of the case 5-10. The movable part connection portion 5-22 is immovably disposed on the movable part 5-M. For example, the movable part connection portion 5-22 is disposed on the top surface of the holder 5-30. The deformation portion 5-23 connects the immovable part connection portion 5-21 and the movable part connection portion 5-22. When viewed from a direction that is perpendicular to the optical axis 5-O, the deformation portion 5-23 is located between the top wall 5-12 of the case and the holder 5-30.

Similarly, the lower elastic element 5-100 connects the movable part 5-M and the case 5-10 directly. As shown in FIG. 57, each of the lower elastic element 5-100 includes at least one immovable part connection portion 5-101, at least one movable part connection portion 5-102, and at least one deformation portion 5-103. The immovable part connection portion 5-101 is immovably disposed on the immovable part 5-I. For example, the immovable part connection portion 5-101 is disposed on the pillar 5-14 of the case 5-10. Since the volume of the pillar 5-14 that is close to the first side 5-1001 is less than the volume of the pillar 5-14 that is close to the second side 5-1002, the volume of the immovable part connection portion 5-101 that is close to the first side 5-1001 is less than the volume of the immovable part connection portion 5-101 that is close to the second side 5-1002. The movable part connection portion 5-102 is immovably disposed on the movable part 5-M. For example, the movable part connection portion 5-102 is disposed on the bottom surface of the holder 5-30. The deformation portion 5-103 connects the immovable part connection portion 5-101 and the movable part connection portion 5-102. When viewed from a direction that is perpendicular to the optical axis 5-O, the deformation portion 5-103 is located between the holder 5-30 and the bottom 5-110.

The holder 5-30 is held elastically by the upper elastic element 5-20 and the lower elastic element 5-100 by elongation and shrinkage of the deformation portion 5-23 and the deformation portion 5-103. From Hooke's law, the magnitude of deformation is proportional to the applied force within particular range. The ratio of the applied force to the magnitude of deformation is defined as the elastic coefficient. That is, the elastic coefficient is the force needed for deformation per unit length. If the elastic coefficient is large, the object is less likely to deform.

The deformation portion 5-23 and the deformation portion 5-103 both have axial elastic coefficient and lateral elastic coefficient. The axial elastic coefficient is defined as the elastic coefficient along the optical axis 5-O while the lateral elastic coefficient is defined as the elastic coefficient in a direction that is perpendicular to the optical axis 5-O. The lateral elastic coefficient is designed to be greater than the axial elastic coefficient, so that the upper elastic element 5-20 and the lower elastic element 5-100 tend to deform in a direction that is parallel with the optical axis 5-O rather than in a direction that is perpendicular to the optical axis 5-O. Using this design, the immovable part 5-I and the movable part 5-M may be stably connected to each other and the upper elastic element 5-20 and the lower elastic element 5-100 do not break easily.

As described above, the upper elastic element 5-20 and the lower elastic element 5-100 may elongate or shrink, driving the holder 5-30 to move relative to the immovable part 5-I. Furthermore, the range of movement of the holder 5-30 is restricted by the upper elastic element 5-20 and the lower elastic element 5-100. The holder 5-30 and the optical element 5-2 therein do not get damaged because of collision with the case 5-10 or the bottom 5-110 when the optical element driving mechanism 5-1 moves or is impacted.

It should be noted that, for some conventional optical element driving mechanisms, the upper elastic element is connected to the case while the lower elastic element is connected to the bottom. However, for the present disclosure, the upper elastic element 5-20 and the lower elastic element 5-100 are both connected to the case 5-10. That is, the upper elastic element 5-20 and the lower elastic element 5-100 are not in contact with the bottom 5-110.

Figure 59:
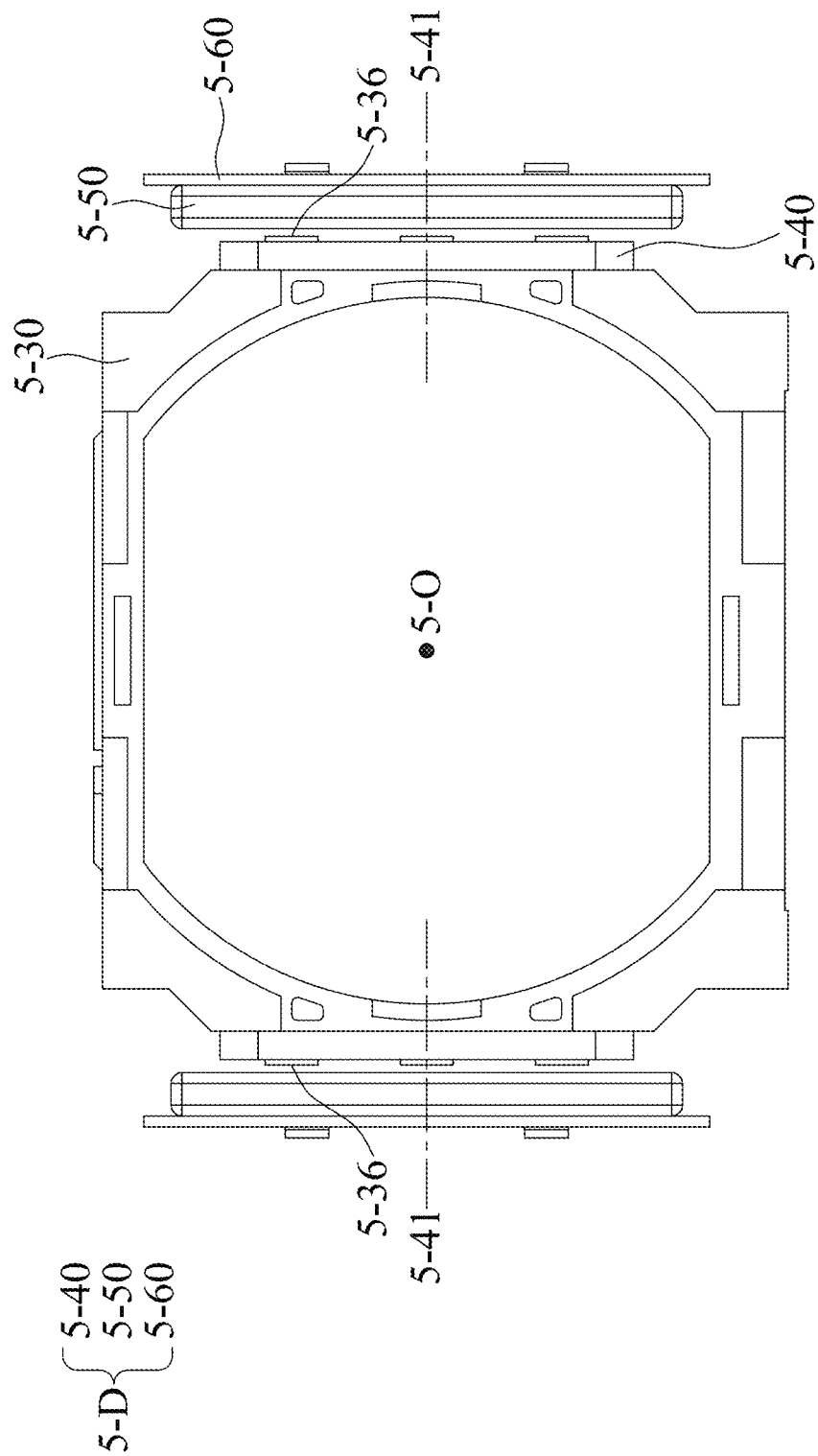
FIG. 59 is a top view of the holder and the drive assembly.
Figure 60:
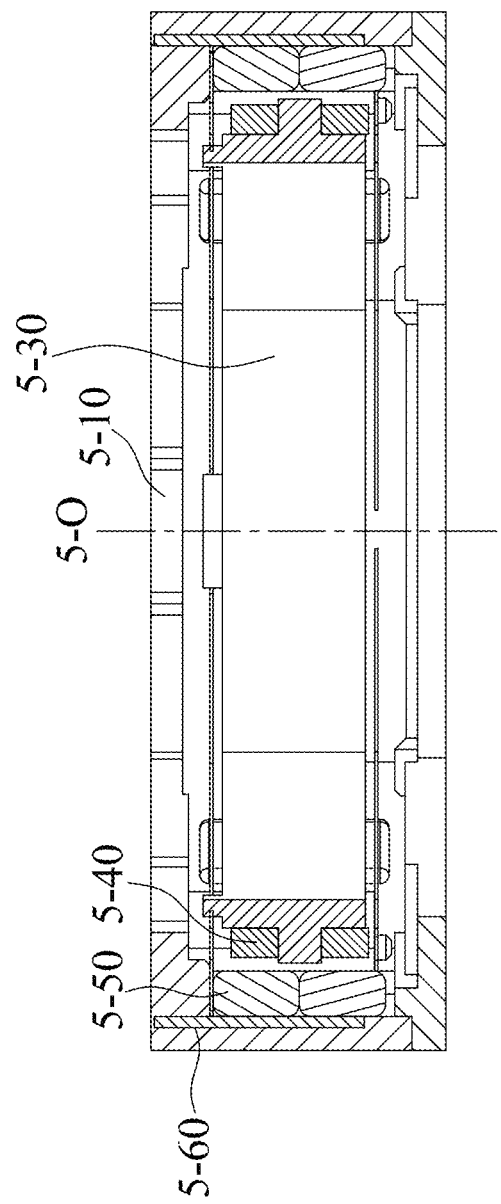
FIG. 60 is a cross-sectional view of the optical element driving mechanism.

Next, please refer to FIG. 59 and FIG. 60 to understand the drive assembly 5-D. FIG. 59 is a top view of the holder 5-30 and the drive assembly 5-D. FIG. 60 is a cross-sectional view of the optical element driving mechanism 5-1. As described above, the coils 5-40 is disposed on the coil placement portions 5-36 of the holder 5-30 and the magnetic elements 5-50 and the magnetically-permeable elements 5-60 are disposed between two adjacent step-like structures 5-141 of the pillars 5-14 of the case 5-10. As shown in FIG. 59 and FIG. 60, when viewed from a direction that is perpendicular to the optical axis 5-O, the magnetically-permeable element 5-60, the magnetic element 5-50, the coil 5-40, and the holder 5-30 at least overlap each other to reduce the size of the optical element driving mechanism 5-1 in the optical axis 5-O, thereby achieving miniaturization.

The coil 5-40 is oval-like, including a winding axis 5-41 passing through the center of the coil 5-40. The winding axis 5-41 is perpendicular to the optical axis 5-O. The magnetic element 5-50 is rectangular. The long side of the coil 5-40 corresponds to the long side of the magnetic element 5-50. The magnetic element 5-50 may be magnet such as a permanent magnet. The arrangement direction of the pair of magnetic poles (N-pole and S-pole) of the magnetic element 5-50 is parallel with the optical axis 5-O. The magnetic poles illustrated here is only for illustration and the present disclosure is not limited thereto. That is, the magnetic field generated by the magnetic element 5-50 sensed by the long side of the coil 5-40 is substantially in a direction that is perpendicular to the optical axis 5-O.

When the current is supplied to the coil 5-40, magnetic force may be generated between the magnetic elements 5-50 and the coils 5-40 for driving the holder 5-30 and the optical element 5-2 therein to move along the optical axis 5-O, thereby achieving autofocus.

The magnetically-permeable element 5-60 is made of a material with magnetic permeability, such as ferromagnetic material, including iron (Fe), nickel (Ni), cobalt (Co), or an alloy thereof. The magnetically-permeable element 5-60 may focus and the magnetic force generated by the coils 5-40 and the magnetic elements 5-50.

Figure 61:
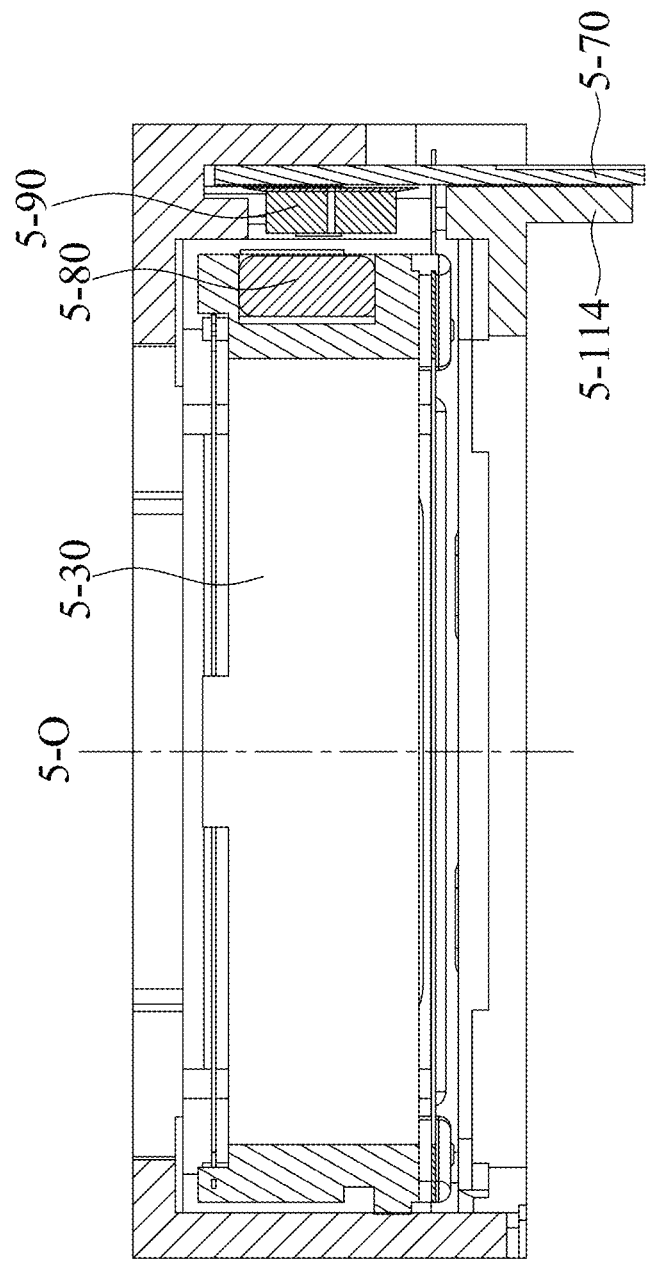
FIG. 61 is a cross-sectional view of the optical element driving mechanism from a different perspective.

Next, please also refer to FIG. 61 to understand the sensing assembly 5-S. FIG. 61 is a cross-sectional view of the optical element driving mechanism 5-1. The position of the reference element 5-80 corresponds to the position of the sensing element 5-90. The reference element 5-80 is disposed in the receiving portion 5-35 on the side surface of the holder 5-30. The sensing element 5-90 is mounted to the circuit assembly 5-70 by methods such as surface mount technology. The reference element 5-80 may be a magnetic element such as a permanent magnet or a multi-poles magnet. The sensing element 5-90 may be a Hall sensor, a giant magneto resistance (GMR) sensor, a tunneling magneto resistance (TMR) sensor, and the like. Compared to the Hall sensor, the magneto resistance sensors have better accuracy and lower power consumption.

When the holder 5-30 moves, the reference element 5-80 disposed on the holder 5-30 also moves relative to the sensing element 5-90, so that the change of the magnetic field (including the density change of the magnetic lines of force and/or the direction change of the magnetic lines of force) of the reference element 5-80 may be sensed by the sensing element 5-90. As described above, the sensing assembly 5-S may sense the movement of the holder 5-30, correct the drive signals of the drive assembly 5-D, and further control the drive assembly 5-D, thereby achieving closed-loop feedback. Therefore, good displacement correction, good displacement compensation, and the like are achieved.

Figure 62:
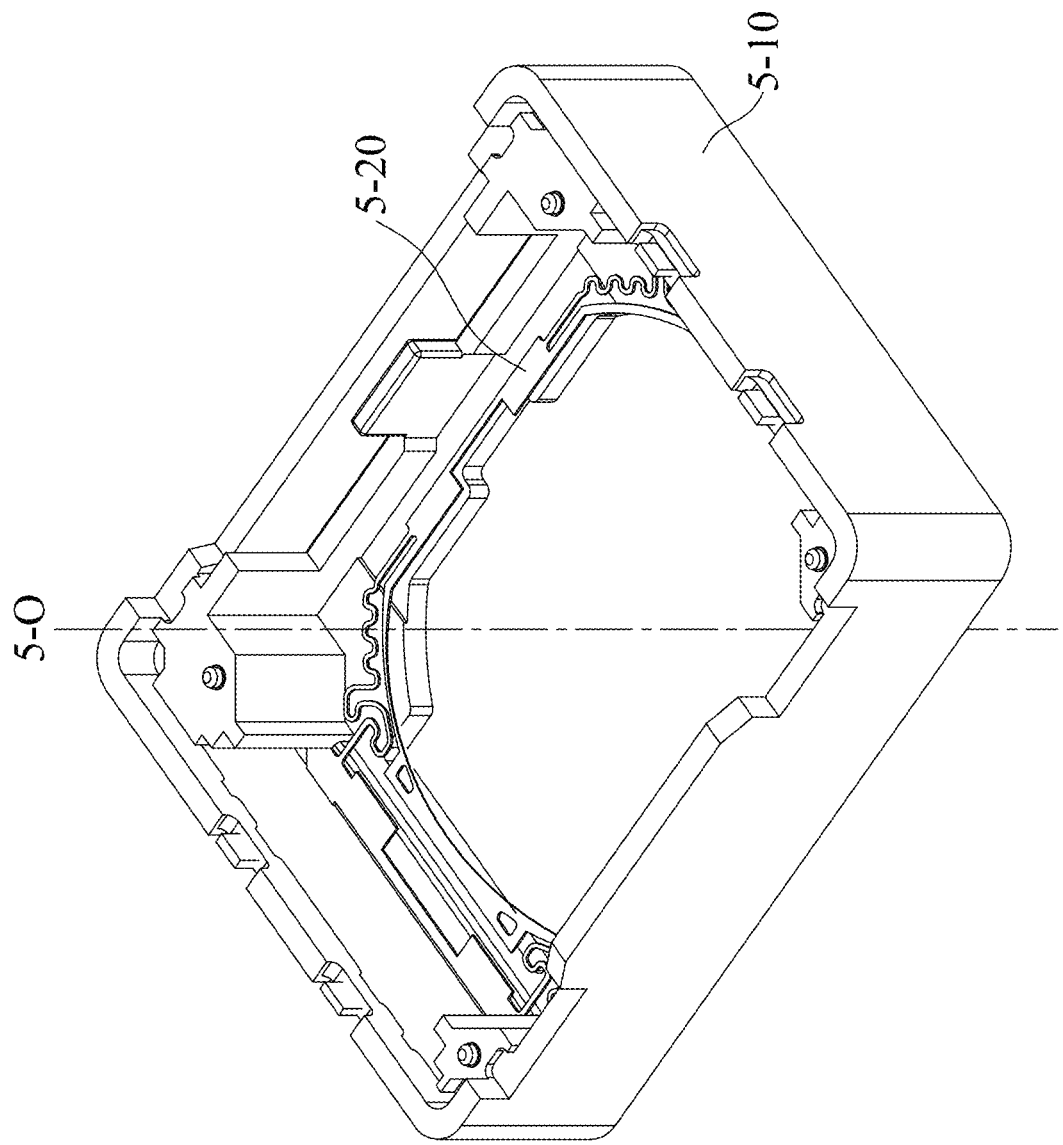
FIG. 62, FIG. 63, FIG. 64, FIG. 65, FIG. 66, and FIG. 67 are schematic views of the optical element driving mechanism at different assembling stages.
Figure 63:
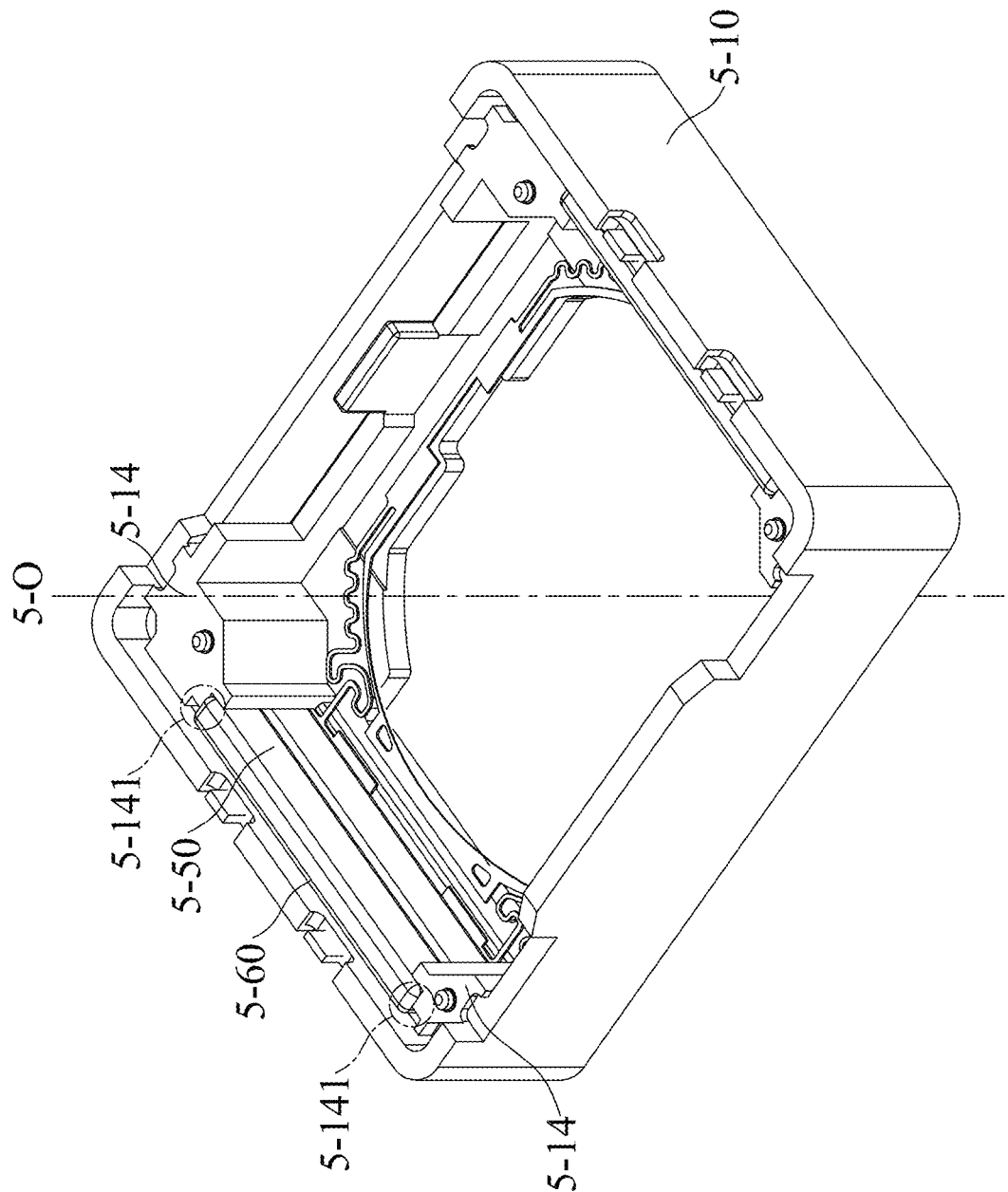
Figure 64:
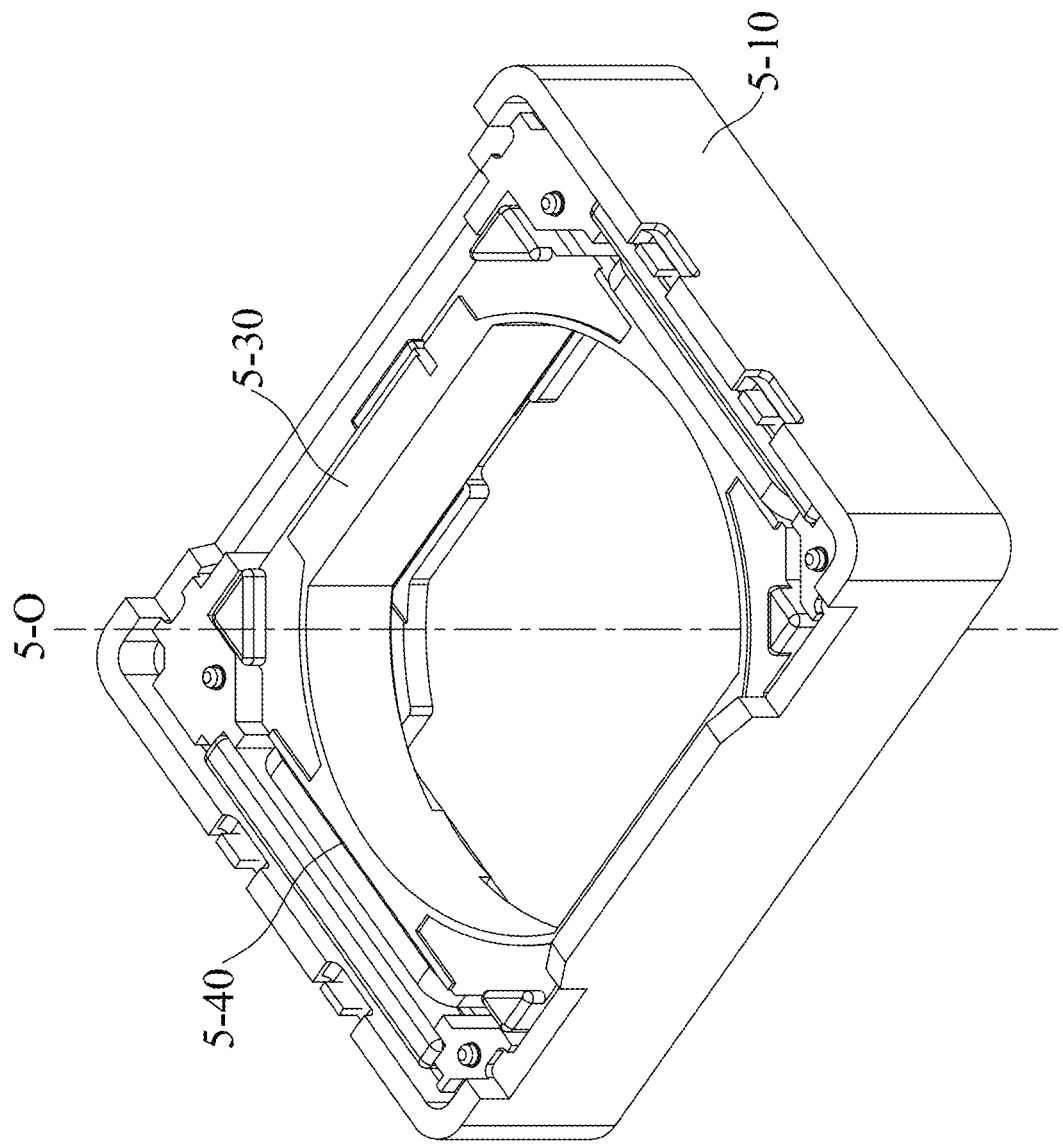

Next, please refer to FIG. 62 to FIG. 67 to understand how the optical element driving mechanism 5-1 is assembled. FIG. 62, FIG. 63, FIG. 64, FIG. 65, FIG. 66, and FIG. 67 are schematic views of the optical element driving mechanism 5-1 at different assembling stages. First, as shown in FIG. 62, the upper elastic element 5-20 is mounted to the case 5-10. Then, as shown in FIG. 63, the magnetic elements 5-50 and the magnetically-permeable elements 5-60 are mounted to the adjacent step-like structures 5-141 of the pillars 5-14 of the case 5-10. Then, each of the coils 5-40 is disposed in the coil placement portion 5-36 of the holder 5-30, and the reference element 5-80 is disposed in the receiving portion 5-35 of the holder 5-30 (as shown in FIG. 55). Then, as shown in FIG. 64, the holder 5-30 with the coils 5-40 and the reference element 5-80 mounted is disposed in the inside of the case 5-10.

Next, a damping element (not shown) is disposed between the case 5-10 and the holder 5-30. The damping element is made of a material that may absorb shock and may inhibit vibration, such as a gel. When the optical element driving mechanism 5-1 is impacted by an external force, the damping element may prevent a severe collision between the movable part 5-M and the immovable part 5-I. Furthermore, the damping element may help the holder 5-30 to return to its original position quickly when it is impacted and may prevent the optical element 5-2 in the holder 5-30 from being unstable. Therefore, the damping element may improve the reaction time and the accuracy of the holder 5-40 during its movement.

Figure 65:
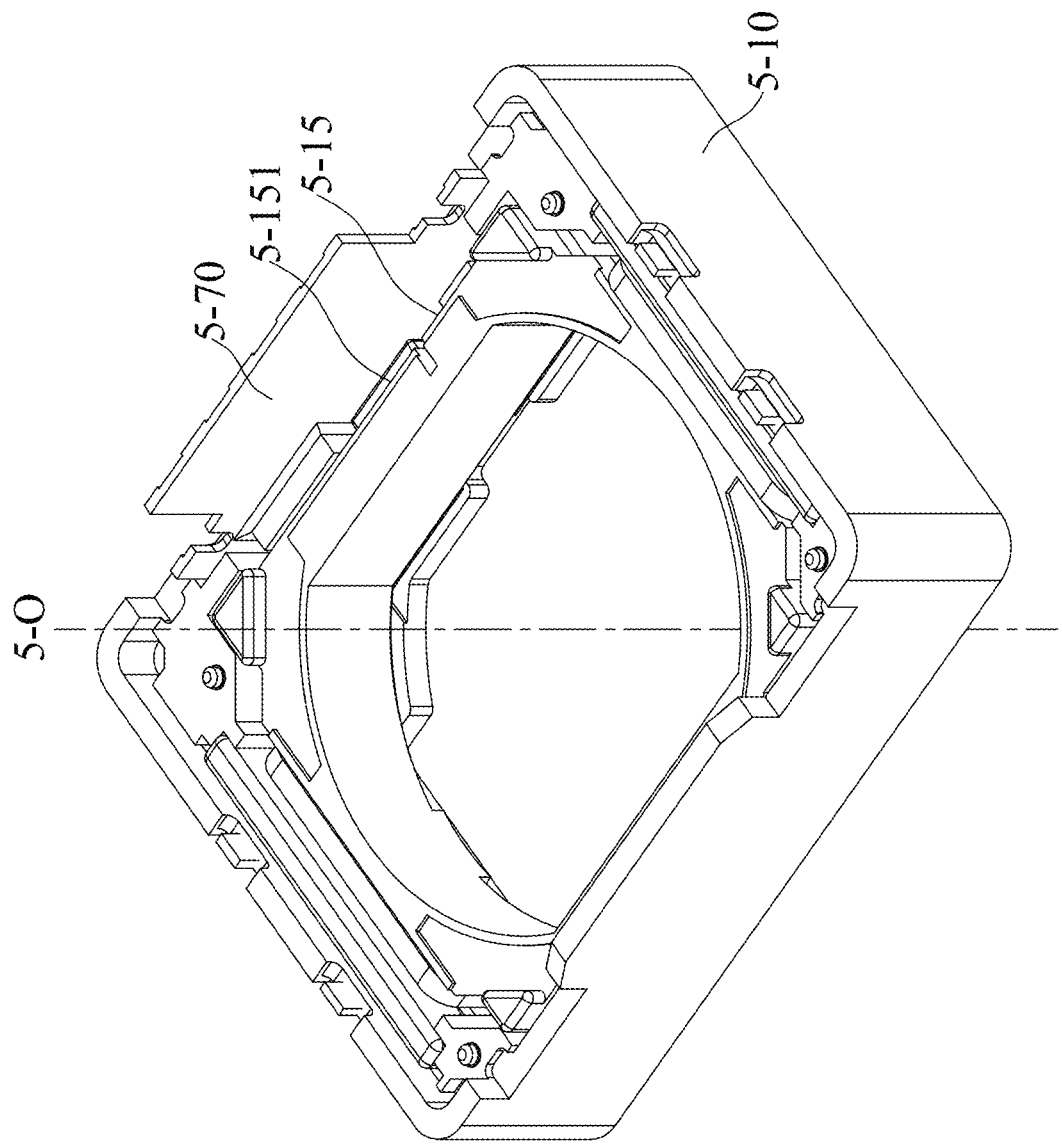
Figure 66:
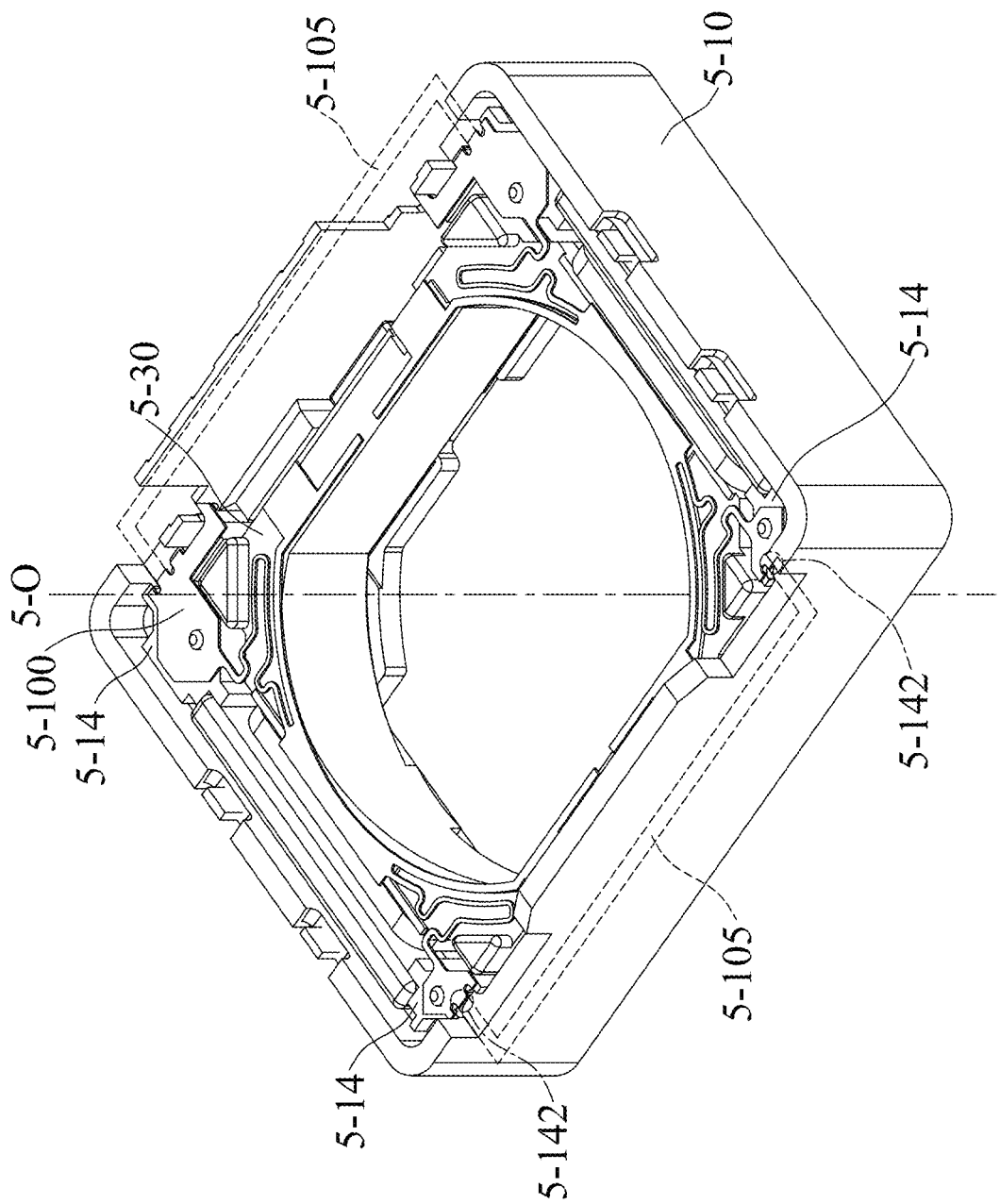

Then, as shown in FIG. 65, the circuit assembly 5-70 is disposed between the receiving structure 5-15 of the case 5-10 and the sidewall 5-13 of the case 5-10, and the connection of the narrow portion 5-151 and the circuit assembly 5-70 reaches a close fit. Then, as shown in FIG. 66, the lower elastic element 5-100 is disposed on the bottom surface of the pillar 5-14 of the case 5-10 and the holder 5-30. It should be noted that, when manufacturing the lower elastic element 5-100, to prevent the lower elastic element 5-100 from being damaged, multiple lower elastic elements 5-100 may be connected to each other via an excess portion 5-105 (schematically illustrated in dotted lines). After the lower elastic element 5-100 is placed, the excess portion 5-105 is pressed downwardly (toward the top wall 5-12 of the case 5-10) manually or mechanically, so that the excess portion 5-105 of the lower elastic element 5-100 is separated from the lower elastic element 5-100 via the bending portion 5-142 of the pillar 5-14. Finally, as shown in FIG. 67, the bottom 5-110 is connected to the case 5-10.

It should be noted that, after the optical element driving mechanism 5-1 is assembled, reliability test(s) and the like may be conducted to ensure the stability of the elements of the optical element driving mechanism 5-1, for example, the optical element driving mechanism 5-1 may be flipped upside down. These tests may make the movable part 5-M move, rotate, or the like relative to the immovable part 5-I. Also, the upper elastic element 5-20 and the lower elastic element 5-100 may deform. Since the lower elastic element 5-100 of the present disclosure is not connected to the bottom 5-110, when the lower elastic element 5-100 deforms, the lower elastic element 5-100 is not in contact with the bottom 5-110, so that the damage caused by the collision between the elements is prevented and the spot on images or video caused by the particles or debris generated by the collision between the elements is prevented.

Figure 67:
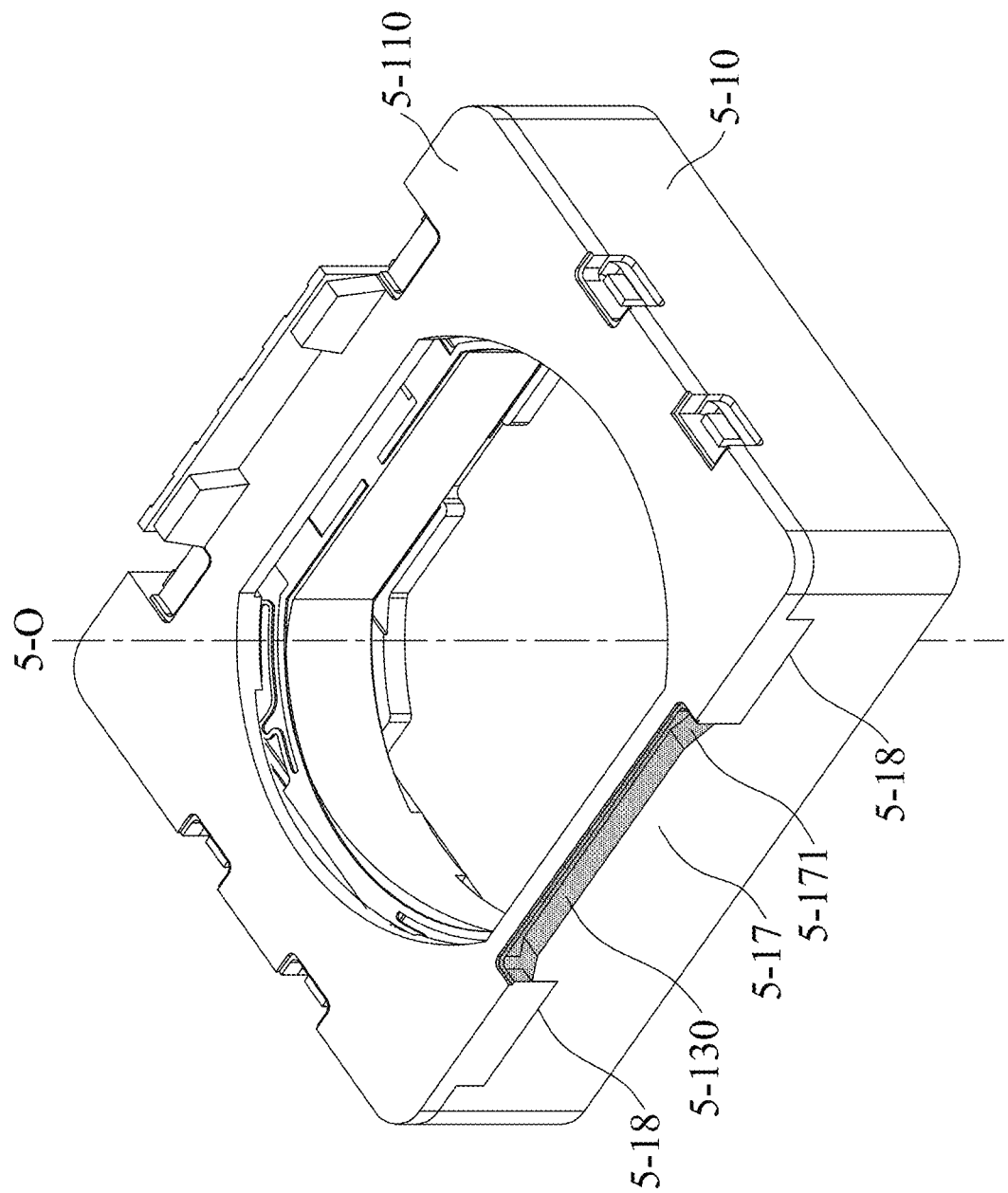

In some embodiments, the optical element driving mechanism 5-1 further includes an adhesion element 5-130 (only schematically shown in FIG. 67). The adhesion element 5-130 may be made of an adhesion material, a conductive material, or an insulation material, such as resin, optical glue, and the like. Different elements may be adhered to each other by the adhesion element 5-130, and thus the connection between different elements is strengthened. Furthermore, the adhesion element 5-130 generally has good elasticity and good covering ability and thus the adhesion element 5-130 may protect the element(s). Additionally, the adhesion element 5-130 may reduce the probability of particles such as dust or mist entering the element(s). If the adhesion element 5-130 is made of insulation material, insulation may be achieved. The steps for applying the adhesion element 5-130 is generally referred to as "glue dispensing", which may be conducted manually or mechanically.

For example, to strengthen the connection of the case 5-10 and the bottom 5-110, the adhesion element 5-130 may be disposed between the case 5-10 and the bottom 5-110. For example, the adhesion element 5-130 may be disposed between the receiving hole 5-16 of the case 5-10 and the surface 5-116S of the column 5-116 of the case 5-110. Also, the adhesion element 5-130 may be disposed on the protrusion 5-17. Since the adhesion element 5-130 is able to flow and the inclined surface 5-171 is inclined, the adhesion element 5-130 may flow to the inclined surface 5-171 or further flow to the recession 5-18. The recession 5-18 may receive the adhesion element 5-130. Furthermore, if the amount of the adhesion element 5-130 is too much, the adhesion element 5-130 may be accumulated on the inclined surface 5-171 and the recession 5-18. The excess adhesion element 5-130 may be removed manually or mechanically.

In some embodiments, to strengthen the connection between the upper elastic element 5-20 and the holder 5-30, the adhesion element 5-130 may be applied via the concaved portion 5-11A of the case 5-10. In some embodiments, to strengthen the connection between the magnetically-permeable element(s) 60 and the case 5-10, the adhesion element 5-130 may be applied between the magnetically-permeable element(s) 60 and the case 5-10, so that the case 5-10, the magnetically-permeable element(s) 60, and the bottom 5-110 adhere to each other via the adhesion element 5-130.

As described above, an optical element driving mechanism is provided. Since the case is rectangular, optical element driving mechanism and the optical element are eccentric structure, the movable part include opposite straight line segments, and the like, so that high screen-to-body ratio of the electronic device is achieved. The first stopping assembly is located on the top surface of the upper protruding portion or the bottom surface of the lower protruding portion, so that the movement of the holder along the optical axis is restricted. Additionally, the second stopping assembly is located on the side surface of the protruding portion that faces the sidewall of the case, so that the rotation of the holder around the optical axis is restricted. The configuration of the upper protruding portion at least partially overlaps the lower protruding portion in the direction that is parallel with the optical axis may simplify the design of the upper elastic element and the lower elastic element.

The Sixth Embodiment Group

Figure 68:
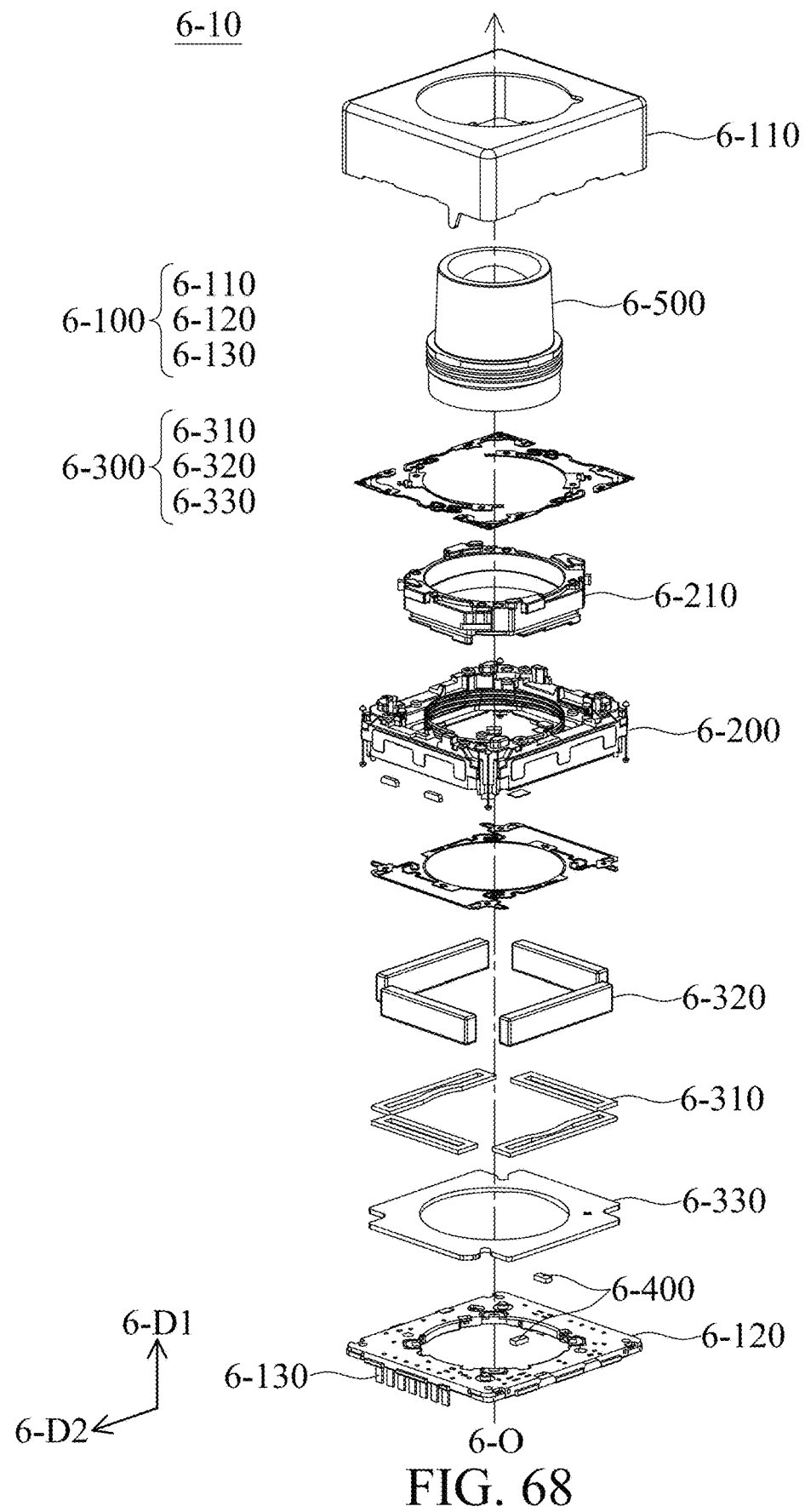
FIG. 68 is an exploded view of an optical element driving mechanism, according to some embodiments of the present disclosure.

Firstly, referring to FIG. 68, FIG. 68 is an exploded view of an optical element driving mechanism 6-10, according to some embodiments of the present disclosure. As shown in FIG. 68, in some embodiments, the optical element driving mechanism 6-10, which is for driving an optical element 6-500, mainly includes a fixed portion 6-100, a movable portion 6-200, a driving assembly 6-300, and two sensing elements 6-400. The movable portion 6-200 includes a lens holder 6-210 that may be connected to the optical element 6-500. The movable portion 6-200 and the optical element 6-500 are driven by the driving assembly 6-300 to move relative to the fixed portion 6-100. The movable portion 6-200 and the optical element 6-500 move, for example, along the optical axis 6-O in the first direction 6-D1, achieving the functions of auto focusing or optical image stabilization.

The fixed portion 6-100 includes a cover 6-110, a bottom 6-120, and a conductive component 6-130. In some embodiments of the present disclosure, the conductive component 6-130 is disposed at the bottom 6-120 by, for example, insert molding. The conductive component 6-130 may be made of metal or other electrically conductive materials. By being connected to an external circuit assembly (not shown), the conductive component 6-130 may provide electrical power to the optical element driving mechanism 6-10 for controlling etc. In the embodiment shown in FIG. 68, the two sensing elements 6-400 of the optical element driving mechanism 6-10 are both disposed at the bottom 6-120, connected to the conductive component 6-130, so that electrical power is provided to the sensing elements 6-400 for sensing the movable portion 6-200. In some embodiments, the sensing elements 6-400 are used for sensing the positions of the movable portion 6-200 and the optical element 6-500. The optical element driving mechanism 6-10 is then controlled based on the sensing result to achieve auto focusing or optical image stabilization. The aforementioned sensing elements 6-400 may be, for example, a Hall sensor, a MR sensor, a fluxgate, an optical position sensor, an optical encoder, or the like. The position sensing assembly 6-400 detects the amount of displacement of the optical element 6-500 to perform auto focusing or optical image stabilization.

Figure 69:
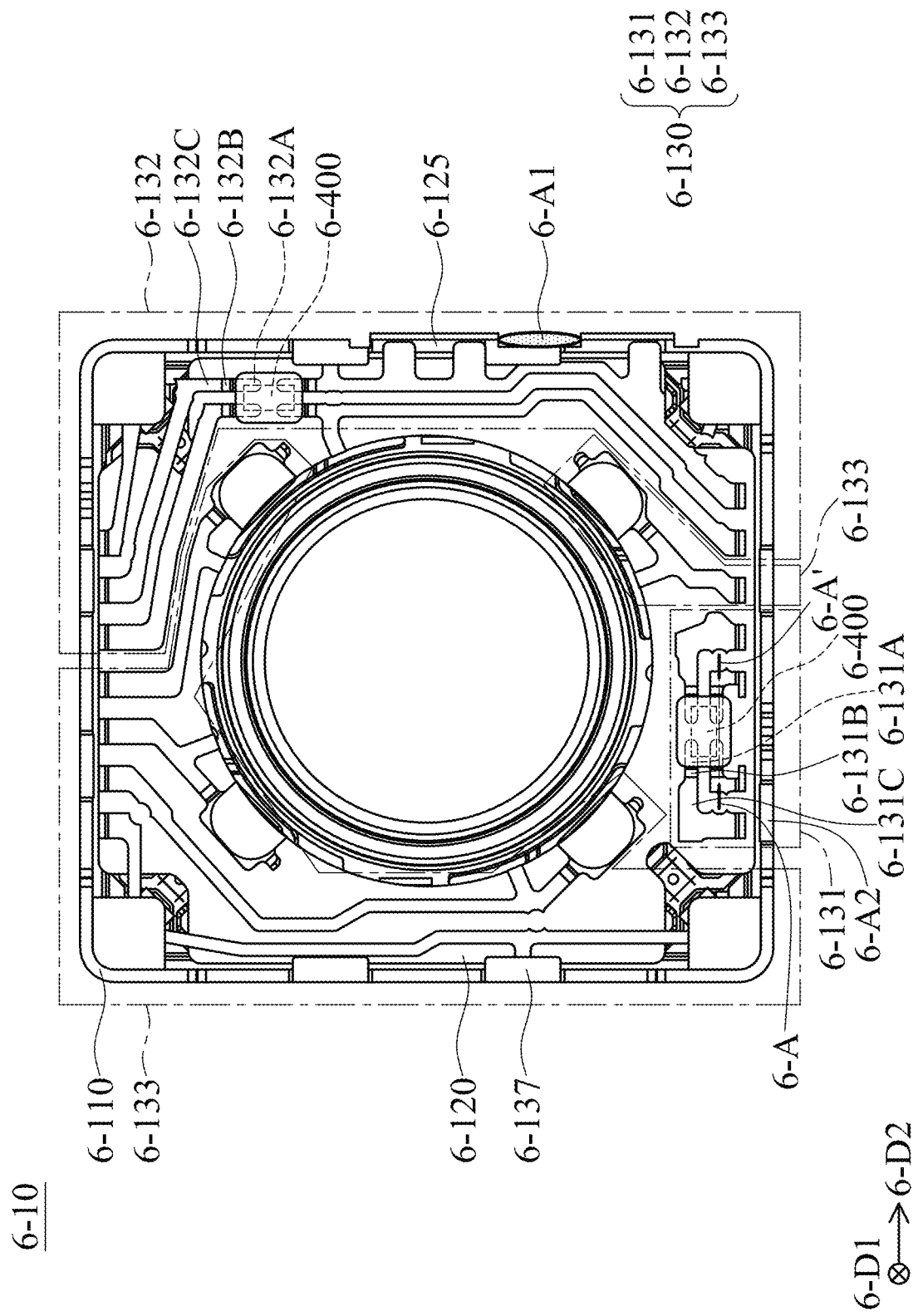
FIG. 69 is a bottom view of an optical element driving mechanism, according to some embodiments of the present disclosure.

Next, referring to FIG. 69, FIG. 69 is a bottom view of an optical element driving mechanism 6-10, according to some embodiments of the present disclosure. As shown in FIG. 69, the conductive component 6-130 includes a first electrical connection assembly 6-131, a second electrical connection assembly 6-132, and a third electrical connection assembly 6-133. The first electrical connection assembly 6-131 and the second electrical connection assembly 6-132 may be respectively electrically connected to a sensing element 6-400. The third electrical connection assembly 6-133 may be electrically connected to the driving assembly 6-300. As shown in FIG. 69, one of the ends of the third electrical connection assembly 6-133 may be exposed at the opening that is in the center of the bottom 6-120, thereby it is electrically connected to the driving assembly 6-300 (e.g. the coil component 6-310 in FIG. 72).

The first electrical connection assembly 6-131, the second electrical connection assembly 6-132, and the third electrical connection assembly 6-133 may be electrically independent from each other. However, in some other embodiments, there may be an electrical relation between the first electrical connection assembly 6-131, the second electrical connection assembly 6-132, and the third electrical connection assembly 6-133. For example, the first electrical connection assembly 6-131 and the second electrical connection assembly 6-132 may have a common connection to an external circuit (not shown) or the like.

Figure 70:
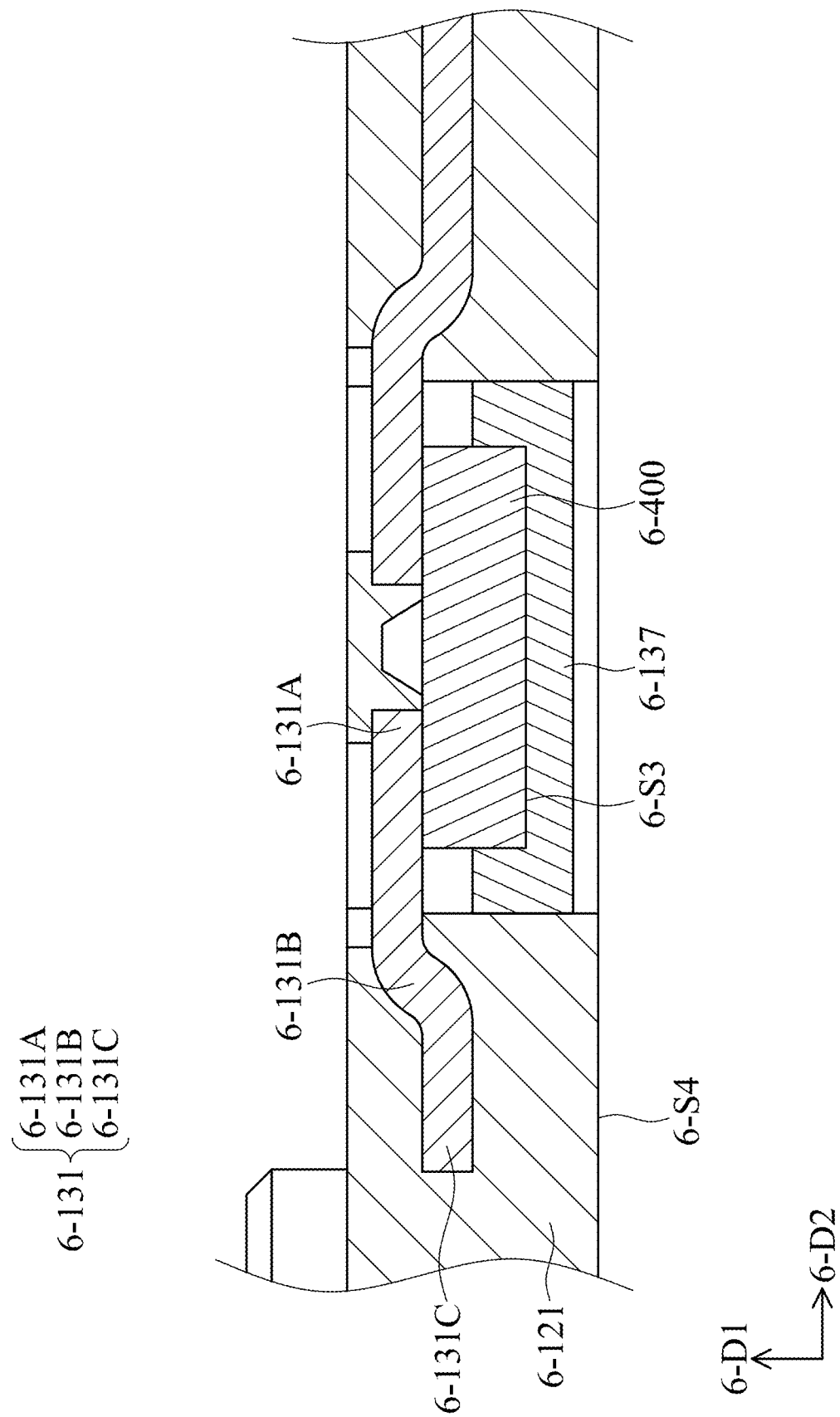
FIG. 70 is a cross-sectional view of an sensing element that is disposed in the bottom along a line 6-A-6-A' in FIG. 69, according to some embodiments of the present disclosure.

Referring to FIG. 70, FIG. 70 is a cross-sectional view of an sensing element 6-400 that is disposed in the body 6-121 of the bottom 6-120 along a line 6-A-6-A' in FIG. 69, according to some embodiments of the present disclosure. As shown in FIG. 70, in the first direction 1-D1, the sensing element 6-400 has a third surface 6-S3 on the side that is facing away from the movable portion 6-200, and the body 6-121 of the bottom 6-120 has a fourth surface 6-S4 on the side that is facing away from the movable portion 6-200. When viewed along the second direction 6-D2, the distance between the third surface 6-S3 and the movable portion 6-200 and the distance between the fourth surface 6-S4 and the movable portion 6-200 are different. In some embodiments of the present disclosure, the third surface 6-S3 of the sensing element 6-400 is closer to the movable portion 6-200 than the fourth surface 6-S4 of the body 6-121. It should be noted that the two sensing elements 6-400 in some embodiments of the present disclosure are both disposed in the aforementioned manner. In some other embodiments, the two sensing elements 6-400 may be disposed in different manners.

Furthermore, FIG. 70 illustrates the disposal relation between the first electrical connection assembly 6-131 of the conductive component 6-130 and one of the sensing elements 6-400. The first electrical connection assembly 6-131 may have a connecting portion 6-131A, a raising portion 6-131B, and an extending portion 6-131C. The connecting portion 6-131A is located at the end that is closer to the sensing element 6-400, and is electrically connected to the sensing element 6-400. The raising portion 6-131B is located between the connecting portion 6-131A and the extending portion 6-131C. The two ends of the raising portion 6-131B are connected to the connecting portion 6-131A and the extending portion 6-131C, respectively. The extending portion 6-131C may be electrically connected to an external circuit (not shown), for example. As shown in FIG. 70, when viewed along a second direction 6-D2 that is perpendicular to the first direction 6-D1, the connecting portion 6-131A does not overlap the extending portion 6-131C. That is, the connecting portion 6-131A and the extending portion 6-131C are located on different planes. The connecting portion 6-131A of the first electrical connection assembly 6-131 is raised to a different plane from the extending portion 6-131C in coordination with the disposal of the sensing element 6-400, so that the possible contact between the sensing element 6-400 and the other module (not shown) that may be disposed under the bottom 6-120 may be avoided, thereby avoiding any possible interference. As shown in FIG. 70, when viewed along the second direction 6-D2, the raising portion 6-131B and the sensing element 6-400 at least partially overlap each other, the extending portion 6-131C and the sensing element 6-400 also at least partially overlap each other, while the connecting portion 6-131A does not overlap the sensing element 6-400.

According to some embodiments of the present disclosure, the disposal relation between the other sensing element 6-400 and the second electrical connection assembly 6-132 are the same as the relation between the first electrical connection assembly 6-131 and the sensing element 6-400, as shown in FIG. 70. The second electrical connection assembly 6-132 may have a connecting portion 6-132A, a raising portion 6-132B, and an extending portion 6-132C. The connecting portion 6-132A is located at the end that is closer to the other sensing element 6-400, and is electrically connected to the other sensing element 6-400. The raising portion 6-132B is located between the connecting portion 6-132A and the extending portion 6-132C. The two ends of the raising portion 6-132B are connected to the connecting portion 6-132A and the extending portion 6-132C, respectively. When viewed along the second direction 6-D2 that is perpendicular to the first direction 6-D1, the connecting portion 6-132A does not overlap the extending portion 6-132C, the raising portion 6-132B and the other sensing element 6-400 at least partially overlap each other, the extending portion 6-132C and the other sensing element 6-400 also at least partially overlap each other, while the connecting portion 6-132A does not overlap the other sensing element 6-400.

In addition, as shown in FIG. 69, in some embodiments of the present disclosure, the first electrical connection assembly 6-131 and the second electrical connection assembly 6-132 may each include four sets of connecting portions 6-131A and 6-132A, raising portions 6-131B and 6-132B, and extending portions 6-133A and 6-133B. All of the connecting portions, the raising portions, and the extending portions are electrically connected to the sensing elements 6-400, providing controls in different axes or on different electrodes.

Referring to both FIG. 69 and FIG. 70, in some embodiments of the present disclosure, a plurality of insulated elements 6-137 are disposed at the bottom 6-120. Some of the insulated elements 6-137 are disposed on ends of the third electrical connection assembly 6-133 that are closer to the exterior of the optical element driving mechanism 6-10. In addition to preventing the third electrical connection assembly 6-133 from contacting other external assemblies (not shown) and therefore causing interference, the insulated elements 6-137 also provide connection between the cover 6-110 and the bottom 6-120. The other insulated elements 6-137 are disposed on the third surface 6-S3 of the sensing elements 6-400, providing connection between the sensing elements 6-400 and the bottom 120, also preventing the sensing elements 6-400 from being interfered by other assemblies. When viewed along the second direction 6-D2, the insulated elements 6-137 that are disposed on the third surface 6-S3 of the sensing elements 6-400 overlap the sensing elements 6-400. As shown in FIG. 70, the insulated elements 6-137 do not protrude beyond the bottom 6-120, which is advantageous for the miniaturization of the optical element driving mechanism 6-10. In such embodiments, the insulated elements 6-137 may be materials that do not conduct electricity, such as glue or adhesives, etc. The disposal of the insulated elements 6-137 may be helpful in preventing short circuits in the optical element driving mechanism 6-10.

Figure 71:
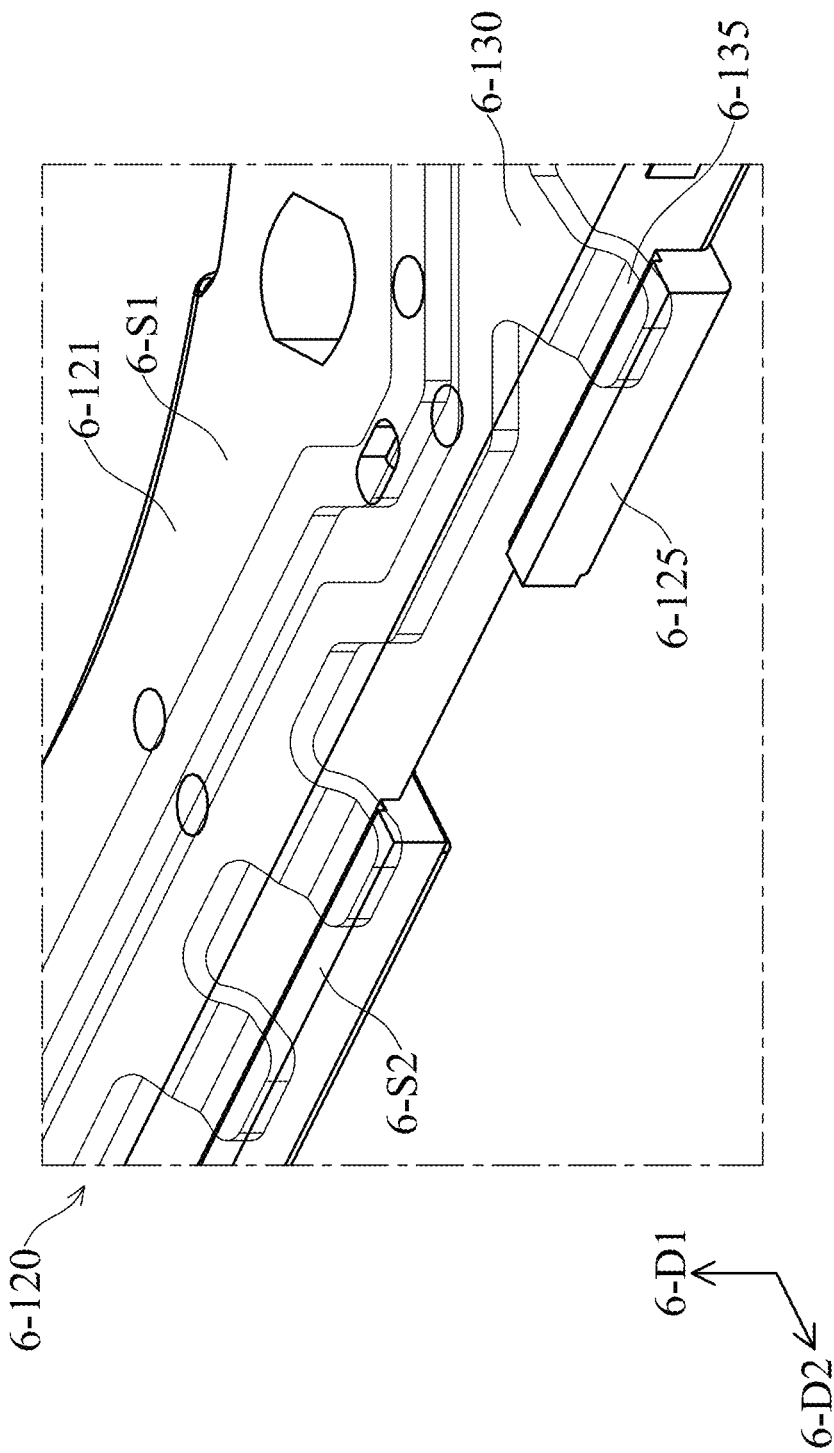
FIG. 71 is a partial schematic view of the bottom and the conductive component, according to some embodiments of the present disclosure.

Referring to FIG. 71, FIG. 71 is a partial schematic view of the bottom 6-120 and the conductive component 6-130, according to some embodiments of the present disclosure. In the embodiments shown in FIG. 71, the bottom 6-120 includes a body 6-121 and a plurality of protruding structures 6-125. The body 6-121 of the bottom 6-120 is integral with the protruding structures 6-125. The bottom 120 may be made of, for example, plastics. As shown in FIG. 71, in the first direction 6-D1, the body 6-121 of the bottom 6-120 has a first surface 6-S1 on the side facing the movable portion 6-200, and the protruding structures 6-125 has a second surface 6-S2 on the side facing the movable portion 6-200. When viewed along the second direction 6-D2, the distance between the first surface 6-S1 and the movable portion 6-200 and the distance between the second surface 6-S2 and the movable portion 6-200 are different. In some embodiments of the present disclosure, the first surface 6-S1 of the body 6-121 is closer to the movable portion 6-200 than the second surface 6-S2 of the protruding structures 6-125. In some embodiments, the bottom 6-120 is connected to the cover 6-110 via the protruding structures 6-125. For example, as shown in FIG. 69, the adhesive element 6-A1 (the first adhesive element) may be used for adhering the protruding structures 6-125 with the cover 6-110. In some embodiments of the present disclosure, the adhesive element 6-A1 may be solder tins or other suitable materials.

The conductive component 6-130 includes a plurality of extending structures 6-135 that may extend from the parts of the first electrical connection assembly 6-131, the second electrical connection assembly 6-132, and/or the third electrical connection assembly 6-133 that is closure to the exterior of the optical element driving mechanism 6-10. In some embodiments of the present disclosure, the extending structures 6-135 are not exposed from the protruding structures 6-125 of the bottom 6-120. For example, the extending structures 6-135 may bend downward following the shape of the protruding structures 6-125, so that the extending structures 6-135 may be completely embedded inside the protruding structures 6-125. In some embodiments, when viewed along the first direction 6-D1, the extending structures 6-135 at least partially overlap the protruding structures 6-125. According to some embodiments of the present disclosure, the bottom 120 that is made of, such as, plastics may be strengthened by extending the extending structures 6-135 of the conductive component 6-130 that is made of, such as, metal into the protruding structures 6-125 of the bottom 120. As a result, the optical element driving mechanism 6-10 will not be broken or damaged at the protruding structures 6-125 of the bottom 120 when enduring a collision or an impact.

It should be noted that, as shown in FIG. 69, an adhesive element 6-A2 (the second adhesive element) may be filled in the gap between the cover 6-110 and the bottom 6-120 in addition to the connection between the protruding structures 6-125 and the cover 6-110 by the adhesive element 6-A1. The adhesive element 6-A2 and the adhesive element 6-A1 are made of different materials. For example, the adhesive element 6-A2 may have a higher flowability that is advantageous for filing the gap between the cover 6-110 and the bottom 6-120. After the adhesive element 6-A2 is solidified, a higher sealability and dust prevention may be achieved, so that the dust or foreign substances, which may affect the operation and the optical effects, may not enter the optical element driving mechanism 6-10.

Figure 72:
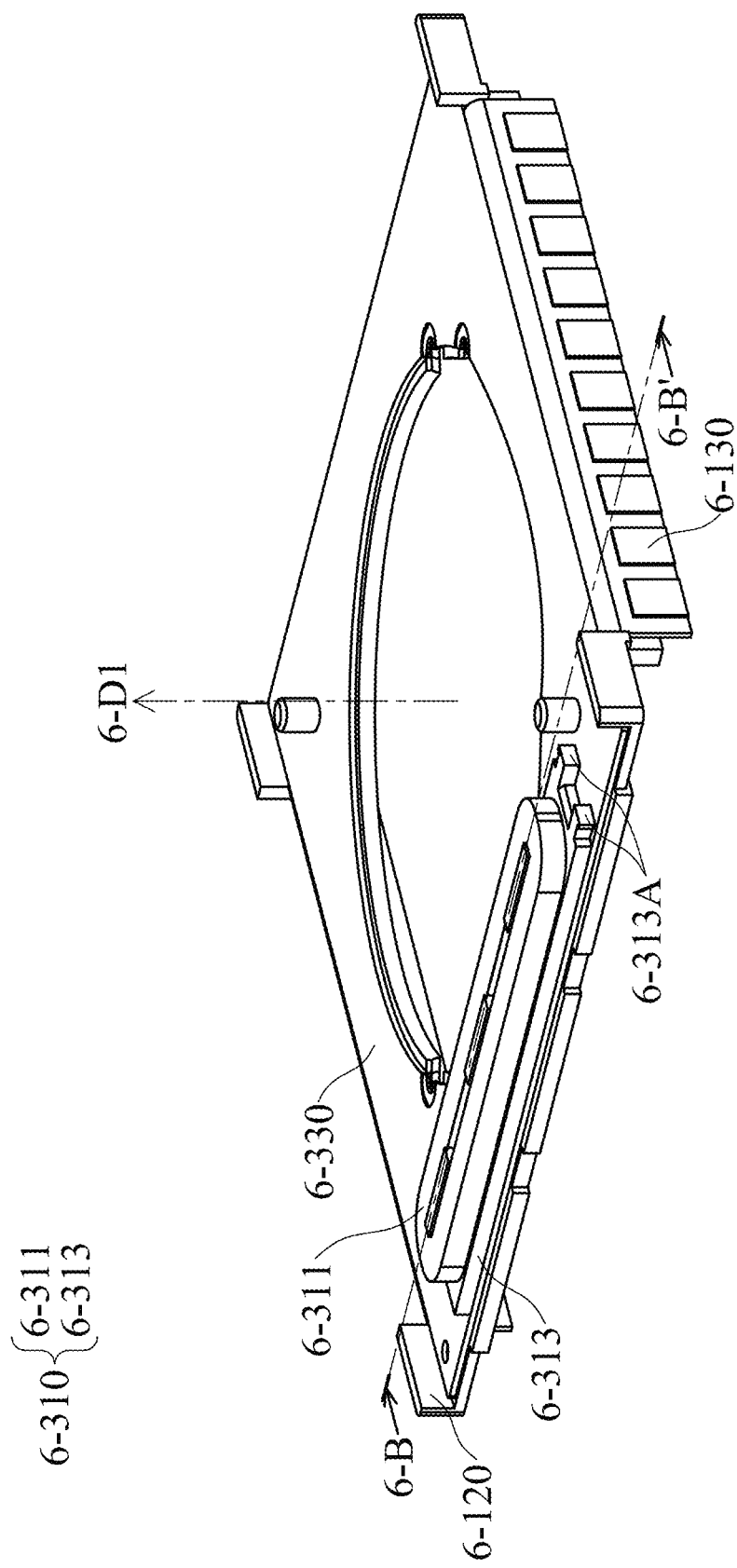
FIG. 72 is a schematic view of a coil component disposed on the bottom, according to some embodiments of the present disclosure.

Next, referring to FIG. 68 and FIG. 72, as shown in FIG. 68, the driving assembly 6-300 includes a coil component 6-310, a driving magnetic element 6-320, and a circuit board 6-330. FIG. 72 is a schematic view of a coil component 6-310 disposed on the bottom 6-120, according to some embodiments of the present disclosure. As shown in FIG. 72, the coil component 6-310 may include a coil 6-311 and a coil holder 6-313, on which the coil 6-310 is disposed. In some embodiments of the present application, the coil component 6-310 is connected to the circuit board 6-330 via the coil holder 6-313. The coil 6-311 is electrically connected to the circuit board 6-330. The coil holder 6-313 may be connected to the circuit board 6-330 by glue or other similar adhesives. In some other embodiments, the coil holder 6-313 may be directly disposed on the bottom 6-120 of the fixed portion 6-100 (e.g. by glue or other similar adhesives). The coil 6-311 may be electrically connected to the conductive component 6-130 on the bottom 6-120. For example, the coil 6-311 may be electrically connected to the third electrical connection assembly 6-133 of the conductive component 6-130. The electrical connection of the coil 6-311 may be achieved by soldering or via the electrically conductive silver paste. For example, the coil 6-311 may be soldered to the circuit board 6-330 or the conductive component 6-130.

In the embodiments illustrated in FIG. 72, the coil holder 6-313 has two coil winding pillars 6-313A. It should be understood that the amount of the coil winding pillars 6-313A does not intend to be a limitation. In some other embodiments, the coil holder 6-313 may have one, three, or any other suitable amount of coil winding pillars 6-313A. The ends of the coil 6-311 may wind around the coil winding pillars 6-313A. For example, the start and the terminal ends of the coil 6-311 may wind around the two coil winding pillars 6-313A, respectively. The coil 6-311 may be soldered to the conductive component 6-130 that is disposed at the bottom 6-120 or to the circuit board 6-330 at the part that winds around the coil winding pillars 6-313A. In some embodiments of the present disclosure, the two coil winding pillars are disposed on the same side of the coil holder 6-313, and the two coil winding pillars are parallel to each other. In some other embodiments, the coil winding pillars 6-313A may be disposed on different sides of the coil holder 6-313. The coil winding pillars 6-313A may not be parallel to each other. Furthermore, in the embodiments illustrated in FIG. 72, the winding direction of the coil 6-311 on the coil winding pillars 6-313A is about the second direction 6-D2. In some other embodiments, the winding direction of the coil 6-311 on the coil winding pillars 6-313A is about the first direction 6-D1. In addition, in the embodiments that has multiple coil winding pillars 6-313A, the winding direction of each coil winding pillars 6-313A may be the same. In other embodiments that has multiple coil winding pillars 6-313A, the winding direction of each coil winding pillars 6-313A may not be the same.

In the embodiments shown in FIG. 72, the optical element driving mechanism 6-10 only has a single coil component 6-310 that is substantially rectangular. It should be understood that the amount and the shape of the coil component 6-310 do not intend to be limiting. In some other embodiments, the optical element driving mechanism 6-10 may include one or more coil components 6-310, and those coil components 6-310 may have different shapes. For example, in some embodiments, there may be two coil components 6-310 that are disposed on opposing sides or adjacent sides of the bottom 6-120 or the circuit board 6-330. In some other embodiments, there may be four coil components 6-310 that are disposed on four sides of the bottom 6-120 or the circuit board 6-330. In addition, in some embodiments, the coil component 6-310 may be in a L-shape, disposed on two adjacent sides of the bottom 6-120 or the circuit board 6-330. In other words, suitable solutions for different practical needs may be provided by altering the amount or the shape of the coil holder 6-313 of the coil component 6-310. Moreover, the coil holder 6-313 may be made of, for example, plastics, thereby the design of the coil holder 6-313 may be easily modified without an overly complicated manufacturing process.

Figure 73:
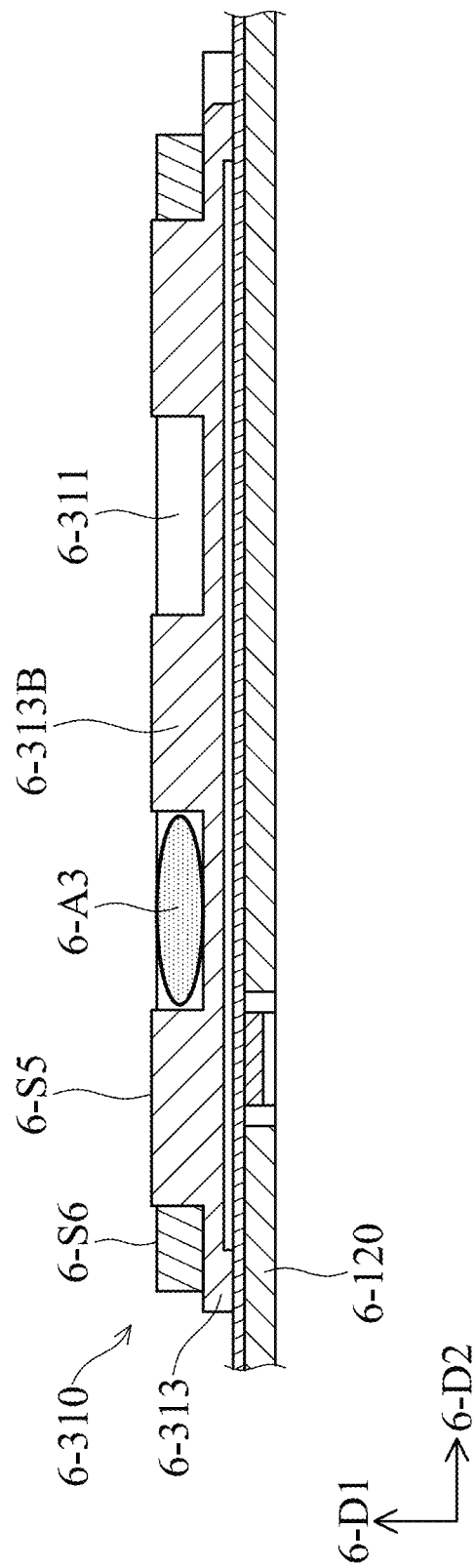
FIG. 73 is a cross-sectional view of a coil component along a line 6-B-6-B' in FIG. 72, according to some embodiments of the present disclosure.

Next, referring to FIG. 73, FIG. 73 is a cross-sectional view of a coil component 6-310 along a line 6-B-6-B' in FIG. 72, according to some embodiments of the present disclosure. In the embodiments shown in FIG. 73, the coil holder 6-313 of the coil component 6-310 has a coil winding structure 6-313B. The coil 6-311 may wind around the coil winding structure 6-313B in any suitable directions. In the first direction 6-D1, the coil winding structure 6-313B has a fifth surface 6-S5 on the side that faces the movable portion 6-200, and the coil 6-311 has a sixth surface 6-S6 on the side that faces the movable portion 6-200. When viewed in the second direction 6-D2, the distance between the fifth surface 6-S5 and the movable portion 6-200 and the distance between the sixth surface 6-S6 and the movable portion 6-200 are different. In some embodiments of the present disclosure, the fifth surface 6-S5 of the coil winding structure 6-313B is closer to the movable portion 6-200 than the sixth surface 6-S6 of the coil 6-311. In such embodiments, for example, when the driving magnetic element 6-320 that is connected to the movable portion 6-200 moves relative to the fixed portion 6-100 (and therefore relative to the coil component 6-310 that is secured to the fixed portion 6-100), even if the driving magnetic element 6-320 is in a position that is the closest to the coil component 6-310, the driving magnetic element 6-320 would not collide with the coil 6-311, but it would only contact the part of the coil winding structure 6-313B that protrudes beyond the coil 6-311. As a result, undesired friction and collision may be avoided, maintaining the coil 6-311 to be intact during the operation, and the stability and the durability of the optical element driving mechanism 6-10 may be improved. In some embodiments, the coil 6-311 is made of metal wires or other suitable materials.

As shown in FIG. 73, in the embodiments of the present disclosure, the coil winding structure 6-313B has three bump structures that have gaps between them. The adhesive element 6-A3 may be filled in the gaps mentioned above. The coil winding structure 6-313B and the coil 6-311 winding outside may be secured by the adhesive element 6-A3. When viewed in the second direction 6-D2, the adhesive element 6-A3, the coil winding structure 6-313B, and the coil 6-311 at least partially overlap each other. It should be understood that although the coil winding structure 6-313B in FIG. 73 is illustrated to have three bump structures, in some other embodiments, the coil winding structure 6-313B may have one, two, or any suitable amount of bump structures.

According to some embodiments of the present disclosure, the manufacturing cost may be lowered by disposing the coil 6-311 on the coil holder 6-313. For example, in comparison with the coils that are etched on a flexible printed circuit (FPC), the cost for the coils that wind around the coil holder 6-313 is lower. In addition, since the coil 6-311 of the present disclosure does not need an etching process, the wire diameter of the coil 6-311 is more consistent. Therefore, the number of turns of the coil 6-311 may increase, lowering the electrical resistance. In the case of lower electrical resistance, the driving force of the motor may be improved, reaching a better efficiency for the optical element driving mechanism 6-10. Furthermore, in some embodiments of the present disclosure, during the assembling process, the coil 6-311 is disposed on the coil holder 6-313 before the coil holder 6-313 is disposed on the bottom 6-120 or the circuit board 6-330. The complicated winding process of directly disposing or winding the coil 6-311 on the bottom 6-120 or the circuit board 6-330 may be avoided, improving a better assembling efficiency. In addition, the shape or the design of the coil holder 6-313 may be modified, providing coils 6-311 of different sizes or shapes for advantageous solutions to different needs.

In summary, in the optical element driving mechanism 6-10 of the present disclosure, the sensing elements 6-400 are disposed on a different plane from the bottom 6-120, the extending structures 6-135 of the conductive component 6-130 are extended into the protruding structures 6-125 of the bottom 6-120, and the coil component 6-310 is designed to have a coil holder 6-313. These features may not only prevent the short circuits in the optical element driving mechanism 6-10, enhance the overall structural strength, they also provide suitable solutions based on different practical needs. Thus, the objectives of improving the stability and the durability of the optical element driving mechanism 6-10 are achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
    a fixed assembly;
    a movable assembly, configured to be connected to an optical element, wherein the movable assembly is movable relative to the fixed assembly, and the optical element has an optical axis;
    a driving assembly, configured to drive the movable assembly to move relative to the fixed assembly; and
    wherein the fixed assembly includes a base, the base has a first side wall, the movable assembly has a winding structure, and when viewed in a second direction perpendicular to the optical axis, the winding structure overlaps the first side wall;
    wherein the optical element driving mechanism further includes a first elastic member connected to the fixed assembly and the movable assembly, the first elastic member includes four separate spring sheets, and when viewed along the optical axis, these spring sheets are rotationally symmetrical.

2. The optical element driving mechanism as claimed in claim 1, wherein the optical element driving mechanism further includes a positioning structure which is disposed on the first side wall, the optical element driving mechanism further includes a circuit assembly, and the circuit assembly is positioned on the first side wall by the positioning structure.

3. The optical element driving mechanism as claimed in claim 2, wherein when viewed along the optical axis, at least a part of the circuit assembly overlaps the positioning structure, and the positioning structure overlaps a bottom wall of the base.

4. The optical element driving mechanism as claimed in claim 2, wherein the winding structure extending in a first direction perpendicular to the optical axis, the first side wall has a recess, and the winding structure is located in the recess, wherein when viewed in the second direction perpendicular to the optical axis, the winding structure overlaps at least a part of the first side wall.

5. The optical element driving mechanism as claimed in claim 2, wherein the first side wall has a first protruding portion that protrudes toward a light-exiting end of the optical element driving mechanism, the circuit assembly includes a second protruding portion, and the first protruding portion supports the second protruding portion.

6. The optical element driving mechanism as claimed in claim 5, wherein when viewed in a first direction perpendicular to the optical axis, the first protruding portion overlaps at least a part of the second protruding portion.

7. The optical element driving mechanism as claimed in claim 1, wherein the winding structure extends along the optical axis, the first side wall has a recess, and when viewed in a first direction perpendicular to the optical axis, the winding structure overlaps the recess.

8. The optical element driving mechanism as claimed in claim 7, wherein the base has a bottom wall connected to the first side wall, and the base further has a groove which is formed from the bottom wall along the optical axis.

9. The optical element driving mechanism as claimed in claim 8, wherein when viewed along the optical axis, the winding structure overlaps at least a part of the groove, wherein when viewed in the first direction, the recess does not overlap the groove.

10. The optical element driving mechanism as claimed in claim 9, wherein when viewed in the second direction perpendicular to the optical axis, the winding structure does not overlap the first side wall, and the first direction is perpendicular to the second direction.

11. The optical element driving mechanism as claimed in claim 1, wherein the movable assembly has a slot structure configured to be engaged with an engaging portion of the optical element, the slot structure has a first surface and a second surface, when viewed along the optical axis, the first surface partially overlaps the second surface, and a size of the engaging portion is smaller than a size of the first surface.

12. The optical element driving mechanism as claimed in claim 11, wherein when the engaging portion is engaged with the slot structure, the first surface partially overlaps the engaging portion, and the second surface partially overlaps the engaging portion.

13. The optical element driving mechanism as claimed in claim 12, wherein the slot structure has a third surface and a fourth surface, the third surface is connected to the first surface, the fourth surface is connected to the second surface, and a distance between the engaging portion and the third surface is different from a distance between the engaging portion and the fourth surface.

14. The optical element driving mechanism as claimed in claim 13, wherein the distance between the engaging portion and the third surface is greater than the distance between the engaging portion and the fourth surface.

15. The optical element driving mechanism as claimed in claim 1, wherein the optical element driving mechanism further includes a circuit assembly and a circuit member, the circuit assembly includes a plurality of circuits and is affixed to the fixed assembly, and the circuit assembly is positioned on the first side wall, and the circuit member protrudes from the base and electrically connected to the circuit assembly, wherein when viewed in a first direction perpendicular to the optical axis, a shortest distance between the circuit member and the circuit assembly in the second direction is less than a shortest distance between the circuit member and the base in the second direction, wherein the first direction is perpendicular to the second direction.

16. The optical element driving mechanism as claimed in claim 15, wherein the circuit member has a first side surface and a second side surface, the first side surface does not face the circuit assembly, the second side surface faces the circuit assembly, and the first side surface and the second side surface face in opposite directions.

17. The optical element driving mechanism as claimed in claim 16, wherein the circuit assembly has an electrical connecting element, and the circuit member has a third side surface which faces the electrical connecting element.

18. The optical element driving mechanism as claimed in claim 1, wherein each of the spring sheets includes a fixed connecting portion which is fixedly connected to the movable assembly by an adhesive element, the fixed connecting portion has a first notch, and the movable assembly has an accommodating groove corresponding to the first notch, wherein when viewed along the optical axis, the accommodating groove is exposed from the first notch, and the adhesive element is disposed in the accommodating groove and the first notch.

19. The optical element driving mechanism as claimed in claim 18, wherein the fixed connecting portion further includes a second notch and a pressed area, the second notch is located between the first notch and the pressed area, and the second notch is configured to accommodate at least a part of the adhesive element, so as to prevent the adhesive element from entering the pressed area.

20. An optical element driving mechanism, comprising:
a fixed assembly;
a movable assembly, configured to be connected to an optical element, wherein the movable assembly is movable relative to the fixed assembly, and the optical element has an optical axis;
a driving assembly, configured to drive the movable assembly to move relative to the fixed assembly; and
wherein the fixed assembly includes a base, the base has a first side wall, the movable assembly has a winding structure, and when viewed in a second direction perpendicular to the optical axis, the winding structure overlaps the first side wall;
wherein the winding structure extends along the optical axis, the first side wall has a recess, and when viewed in a first direction perpendicular to the optical axis, the winding structure overlaps the recess.

21. An optical element driving mechanism, comprising:
a fixed assembly;
a movable assembly, configured to be connected to an optical element, wherein the movable assembly is movable relative to the fixed assembly, and the optical element has an optical axis;
a driving assembly, configured to drive the movable assembly to move relative to the fixed assembly; and
wherein the fixed assembly includes a base, the base has a first side wall, the movable assembly has a winding structure, and when viewed in a second direction perpendicular to the optical axis, the winding structure overlaps the first side wall;
wherein the movable assembly has a slot structure configured to be engaged with an engaging portion of the optical element, the slot structure has a first surface and a second surface, when viewed along the optical axis, the first surface partially overlaps the second surface, and a size of the engaging portion is smaller than a size of the first surface.

* * * * *